(12) United States Patent
Yoshida et al.

(10) Patent No.: US 11,148,450 B2
(45) Date of Patent: Oct. 19, 2021

(54) THERMAL TRANSFER SHEET, COATING LIQUID FOR RELEASE LAYER, AND METHOD FOR PRODUCING THERMAL TRANSFER SHEET

(71) Applicant: Dai Nippon Printing Co., Ltd., Tokyo (JP)

(72) Inventors: Kazuya Yoshida, Tokyo (JP); Tomohiko Imoda, Tokyo (JP); Yoshihiro Imakura, Tokyo (JP); Yasuyuki Shouji, Tokyo (JP); Daisuke Fukui, Tokyo (JP); Ryoji Hattori, Tokyo (JP); Koichiro Kuroda, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 16/768,365

(22) PCT Filed: Jan. 31, 2019

(86) PCT No.: PCT/JP2019/003355
§ 371 (c)(1),
(2) Date: May 29, 2020

(87) PCT Pub. No.: WO2019/151391
PCT Pub. Date: Aug. 8, 2019

(65) Prior Publication Data
US 2020/0369012 A1      Nov. 26, 2020

(30) Foreign Application Priority Data

Jan. 31, 2018  (JP) .............. JP2018-015583
Jan. 31, 2018  (JP) .............. JP2018-015584
Jun. 29, 2018  (JP) .............. JP2018-125383

(51) Int. Cl.
| | | |
|---|---|---|
| B41M 5/44 | (2006.01) | |
| B41M 5/52 | (2006.01) | |
| B41M 5/382 | (2006.01) | |
| B41M 7/00 | (2006.01) | |
| B41M 5/40 | (2006.01) | |

(52) U.S. Cl.
CPC ........ B41M 5/443 (2013.01); B41M 5/38214 (2013.01); B41M 5/405 (2013.01); B41M 5/52 (2013.01); B41M 7/0027 (2013.01); B41M 5/382 (2013.01); B41M 2205/10 (2013.01); B41M 2205/38 (2013.01)

(58) Field of Classification Search
CPC .. B41M 5/382; B41M 5/38214; B41M 5/405; B41M 5/443; B41M 5/52; B41M 7/0027; B41M 2205/10; B41M 2205/38; B32B 7/06
See application file for complete search history.

(56) References Cited

U.S. PATENT DOCUMENTS

| | | | |
|---|---|---|---|
| 2018/0141307 A1 | 5/2018 | Yoshida et al. | |
| 2018/0147813 A1 | 5/2018 | Yoshida et al. | |
| 2019/0143641 A1 | 5/2019 | Imakura et al. | |

FOREIGN PATENT DOCUMENTS

| | | | |
|---|---|---|---|
| JP | H07-186514 A1 | | 7/1995 |
| JP | 2007216615 A | * | 8/2007 |
| JP | 2011-068047 A1 | | 4/2011 |
| JP | 2016-064505 A1 | | 4/2016 |
| JP | 2016-190373 A1 | | 11/2016 |
| WO | 2015/004868 A1 | | 1/2015 |
| WO | 2016/190426 A1 | | 12/2016 |
| WO | 2016/190427 A1 | | 12/2016 |
| WO | 2017/170963 A1 | | 10/2017 |

OTHER PUBLICATIONS

International Search Report and Written Opinion (Application No. PCT/JP2019/003355) dated May 7, 2019.

* cited by examiner

Primary Examiner — Gerard Higgins
(74) Attorney, Agent, or Firm — Burr & Brown, PLLC

(57) ABSTRACT

To provide a coating liquid for release layer with which a release layer having a small variation in the performance difference can be stably formed, to provide a method for producing a thermal transfer sheet using this coating liquid for release layer, and to provide a thermal transfer sheet having stable releasability.

A thermal transfer sheet having a substrate 1, a release layer 2 provided on the substrate 1, and a transfer layer 10 provided on the release layer 2, wherein the transfer layer 10 is provided peelably from the release layer 2, and the release layer 2 contains a silsesquioxane.

2 Claims, 8 Drawing Sheets

THERMAL TRANSFER SHEET, COATING LIQUID FOR RELEASE LAYER, AND METHOD FOR PRODUCING THERMAL TRANSFER SHEET

TECHNICAL FIELD OF THE INVENTION

The present invention relates to a thermal transfer sheet, a coating liquid for release layer, and a method for producing a thermal transfer sheet.

BACKGROUND OF THE INVENTION

In order to protect the surface of a transfer receiving article, for example, in order to protect an image formed on a thermal transfer image-receiving sheet or an image formed on a card substrate, a thermal transfer sheet (also referred to as a protective layer transfer sheet in some cases) comprising a transfer layer of a single-layer structure or a layered structure including a protective layer (also referred to as a peel layer in some cases) is used to transfer the transfer layer onto a transfer receiving article. Transfer receiving articles onto which a transfer layer has been transferred are used in a wide variety of applications such as ID cards, for example, identity cards, driver's licenses, and membership cards. A thermal transfer sheet (also referred to as an intermediate transfer medium in some cases) provided with a transfer layer of a single-layer structure or a layered structure including a receiving layer and the like are also known. Transfer of the transfer layer onto a transfer receiving article is conducted by superposing a thermal transfer sheet comprising the transfer layer on a transfer receiving article, applying energy on the thermal transfer sheet to transfer the transfer layer onto the transfer receiving article, and then, peeling this transfer layer from the side of the substrate of the thermal transfer sheet.

Such a thermal transfer sheet is required to have good durability of the transfer layer and a good peel property (also referred to as releasability in some cases) when the transfer layer transferred onto the transfer receiving article is peeled from the side of the substrate of the thermal transfer sheet.

Various studies have been conducted on durability of a transfer layer. For example, Patent Literature 1 suggests a thermal transfer sheet in which, as a transfer layer, an peel layer and a stress relaxation layer are provided on a substrate, and the peel layer is formed from an ionizing radiation curable resin. According to the thermal transfer sheet suggested in Patent Literature 1, it is supposed that high durability can be imparted to the transfer layer by enhancing the hardness of the peel layer with the ionizing radiation curable resin.

However, the peel property of the transfer layer and the durability of the transfer layer are in a trade-off relationship. Thus, when the hardness of the transfer layer is enhanced in order to improve the durability of the transfer layer, the peel property of the transfer layer tends to decrease. Particularly, when durability has been imparted to the transfer layer, the peel property at the peel head portion of the transfer layer decreases. Thus, untransfer of the head portion of the transfer layer (hereinafter referred to as head untransfer) is likely to occur. In the head untransfer, the transfer layer, which originally should be transferred onto the transfer receiving article side and be peeled from the side of the substrate of the thermal transfer sheet, is not peeled from the side of the substrate and remains on the side of the thermal transfer sheet. Additionally, when the hardness of the transfer layer is lowered with focusing on the peel property of the transfer layer, the durability of the transfer layer tends to decrease. Note that, when the peel property of the transfer layer decreases, untransfer of the transfer layer, tailing, and the like are likely to occur.

As a thermal transfer sheet allowing the peel property of the transfer layer to be satisfactory, a thermal transfer sheet and the like also have been suggested in which a release layer is provided between the substrate and the transfer layer and the interface between the release layer and the transfer layer is used as a transfer interface. Note that the release layer referred to herein is a layer that remains on the side of the substrate when the transfer layer is transferred.

Such a release layer is formed by dissolving or dispersing a component having releasability in a suitable solvent to prepare a coating liquid, applying this coating liquid onto a substrate, followed by drying. The component for imparting releasability to the release layer is susceptible to the external environment when the coating liquid containing the component is applied and dried to form a release layer, and inherently includes a problem in that a variation in the performance of the releasability is likely to occur, the releasability being imparted to the release layer finally formed.

CITATION LIST

Patent Literature

Patent Literature 1: Japanese Patent Laid-Open No. 7-186514

SUMMARY OF THE INVENTION

Technical Problem

The present invention has been made in view of such situations, and the present invention aims principally to provide a thermal transfer sheet capable of inhibiting occurrence of head untransfer when a transfer layer is transferred onto a transfer receiving article and capable of imparting durability to a print obtained by transferring the transfer layer onto the transfer receiving article.

The present invention also aims principally to provide a coating liquid for release layer with which a release layer having a small variation in the performance difference can be stably formed, to provide a method for producing a thermal transfer sheet using this coating liquid for release layer, and to provide a thermal transfer sheet having stable releasability.

Solution to Problem

A thermal transfer sheet according to an embodiment of the present disclosure for solving the above problems has a substrate, a release layer provided on the substrate, and a transfer layer provided on the release layer. The transfer layer is provided peelably from the release layer, and the release layer contains a silsesquioxane.

Additionally, a thermal transfer sheet according to an embodiment of the present disclosure for solving the above problems is a thermal transfer sheet having a substrate, a release layer provided on the substrate, and a transfer layer provided on the release layer, wherein the transfer layer is provided peelably from the release layer, the release layer contains a silsesquioxane, the initial breakage peeling-off force when the transfer layer is peeled under conditions of a peeling-off temperature of 20° C. or more and 40° C. or less and a peeling-off angle of 90° is 5 mN/m or less, and the initial breakage peeling-off force when the transfer layer is peeled under conditions of a peeling-off temperature of 20° C. or more and 70° C. or less and a peeling-off angle of 60° or more is 1.97 mN/m or less, and the scratch hardness (a sapphire needle having a tip radius of 0.1 mm is used) when the face located on the side of the substrate of the transfer layer is measured by a method in compliance with JIS-K-5600-5-5 is 200 g or more.

Additionally, a thermal transfer sheet according to an embodiment of the present disclosure for solving the above problems has a substrate, a release layer provided on the substrate, and a transfer layer provided on the release layer. The transfer layer is provided peelably from the release layer, and the release layer has a reaction product of a silsesquioxane having an epoxy group and a resin having a carboxyl group.

Additionally, in the above thermal transfer sheet, the acid value of the resin having a carboxyl group may be 10 mgKOH/g or more.

Additionally, a coating liquid for release layer according to an embodiment of the present disclosure for solving the above problems is a coating liquid for release layer for forming a release layer of a thermal transfer sheet, and contains a silsesquioxane.

Additionally, in the above coating liquid for release layer, the coating liquid for release layer may further contain a resin having a carboxyl group, and the silsesquioxane may be a silsesquioxane having an epoxy group.

Additionally, in the above coating liquid for release layer, the acid value of the resin having a carboxyl group may be 10 mgKOH/g or more.

Additionally, a method for producing a thermal transfer sheet according to an embodiment of the present disclosure for solving the above problems includes forming a release layer on a substrate and forming a transfer layer on the release layer, wherein forming a release layer comprises applying the above coating liquid for release layer, followed by drying.

Additionally, a thermal transfer sheet according to an embodiment of the present disclosure for solving the above problems is a thermal transfer sheet having a substrate and a transfer layer provided on the substrate, wherein the initial breakage peeling-off force when the transfer layer is peeled under conditions of a peeling-off temperature of 20° C. or more and 40° C. or less and a peeling-off angle of 90° is 5 mN/m or less, and the scratch hardness (a sapphire needle having a tip radius of 0.1 mm is used) when the face located on the side of the substrate of the transfer layer is measured by a method in compliance with JIS-K-5600-5-5 is 200 g or more.

Additionally, a thermal transfer sheet according to an embodiment of the present disclosure for solving the above problems is a thermal transfer sheet having a substrate and a transfer layer provided on the substrate, wherein the transfer layer has a single-layer structure consisting of a protective layer or a layered structure including a protective layer, the protective layer contains a cured product of an active ray-curable resin, and the initial breakage peeling-off force when the transfer layer is peeled under conditions of a peeling-off temperature of 20° C. or more and 40° C. or less and a peeling-off angle of 90° is 5 mN/m or less.

Additionally, in the above thermal transfer sheet, a release layer directly contacting the transfer layer may be located between the substrate and the transfer layer, and the surface roughness (SRa) of the surface located on the side of the transfer layer of the release layer may be 0.05 µm or more and 0.08 µm or less.

Additionally, in the above thermal transfer sheet, a release layer directly contacting the transfer layer may be located between the substrate and the transfer layer, the release layer may contain a filler in an amount of 0.5% by mass or more and 1.5% by mass or less based on the total mass of the release layer, and the volume average particle size of the filler may be 2 µm or more and 5 µm or less.

Additionally, in the above thermal transfer sheet, a glossiness (measurement angle: 20°) when the surface of the transfer layer after transferred onto a transfer receiving article is measured by a method in compliance with JIS-Z-8741 may be 55% or more.

Additionally, a thermal transfer sheet according to an embodiment of the present disclosure for solving the above problems is a thermal transfer sheet having a substrate and a transfer layer provided on the substrate, wherein the transfer layer has a single-layer structure or layered structure including a protective layer, the protective layer contains a cured product of an active ray-curable resin, and the initial breakage peeling-off force when the transfer layer is peeled under conditions of a peeling-off temperature of 20° C. or more and 70° C. or less and a peeling-off angle of 60° or more is 1.97 mN/m or less.

In the above thermal transfer sheet, the scratch hardness (a sapphire needle having a tip radius of 0.1 mm is used) when the face located on the side of the substrate of the transfer layer is measured by a method in compliance with JIS-K-5600-5-5 may be 200 g or more.

In the above thermal transfer sheet, the protective layer may further contain a first filler having a volume average particle size of 0.1 µm or more and 2 µm or less and a second filler having a volume average particle size of 40 nm or less.

Advantageous Effects of Invention

According to the thermal transfer sheet according to the embodiment of the present disclosure, it is possible to inhibit occurrence of head untransfer when the transfer layer is transferred onto a transfer receiving article and impart durability to a print obtained by transferring the transfer layer onto the transfer receiving article. Additionally, according to the coating liquid for release layer according to the embodiment of the present disclosure, it is possible to stably form a release layer having a small variation in the performance difference. Additionally, according to the method for producing the thermal transfer sheet according to the embodiment of the present disclosure, it is possible to stably produce a thermal transfer sheet having a small variation in the performance difference in releasability. Additionally, according to the thermal transfer sheet according to the embodiment of the present disclosure, it is possible to impart stable releasability to the release layer.

BRIEF DESCRIPTION OF THE DRAWINGS

FIGS. 11A to 11C are all schematic sectional views.

DETAILED DESCRIPTION OF THE INVENTION

Figure 1A:
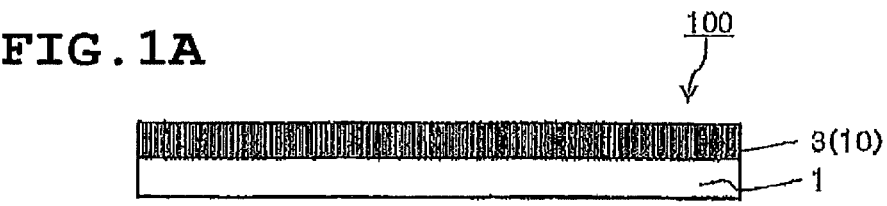
FIGS. 1A and 1B are sectional schematic views illustrating one example of a thermal transfer sheet according to the embodiment of the present disclosure.

Hereinafter, the present invention will be described with reference to the drawings. The present invention may be embodied in many different aspects and should not be construed as being limited to the description of the exemplary embodiments below. In the drawings, components may be shown schematically regarding the width, thickness, shape and the like, compared with actual aspects, for the sake of clearer illustration. The schematic drawings are merely examples and do not limit the interpretations of the present invention in any way. In the specification and the drawings, components that have substantially the same functions as those described before with reference to a previous drawing(s) bear the identical reference signs thereto, and detailed descriptions thereof may be omitted. Unless otherwise specifically specified, each layer to be described in the following may contain one of components to be exemplified for each layer or may contain two or more of the components. Each layer may contain other components than those exemplified.

Thermal Transfer Sheet of First Embodiment

Figure 2A:
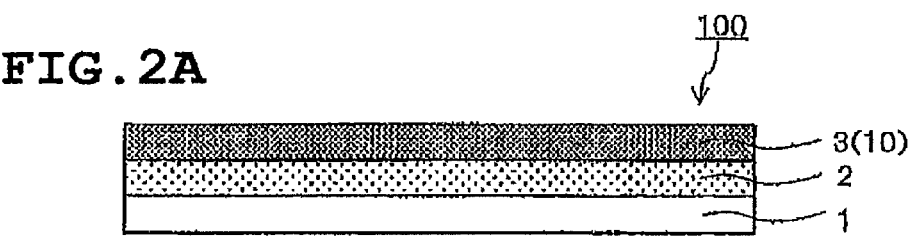
FIGS. 2A and 2B are sectional schematic views illustrating one example of a thermal transfer sheet according to the embodiment of the present disclosure.
Figure 2B:
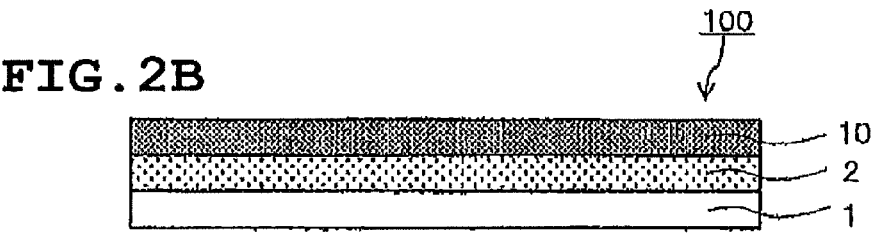
Figure 3A:
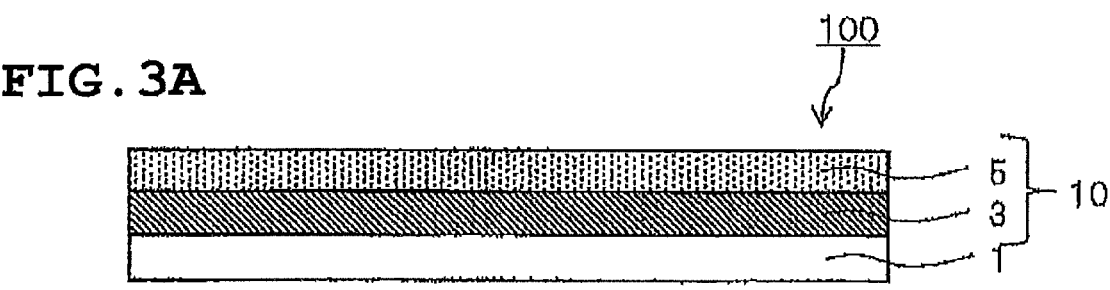
FIGS. 3A and 3B are sectional schematic views illustrating one example of a thermal transfer sheet according to the embodiment of the present disclosure.
Figure 3B:
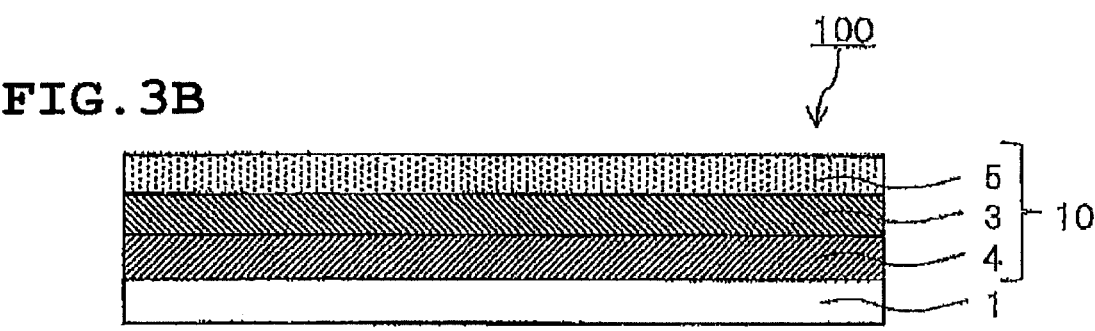

As shown in FIG. 1A, FIG. 2A, and FIG. 3, a thermal transfer sheet according to a first embodiment of the present disclosure (hereinafter referred to as the thermal transfer sheet of the first embodiment of the present disclosure) has a substrate 1 and a transfer layer 10 provided peelably from the substrate 1. The transfer layer 10 has a single-layer structure or layered structure including a protective layer 3. Note that FIG. 1A, FIG. 2A, and FIG. 3 are schematic sectional views illustrating one example of the thermal transfer sheet of the first embodiment of the present disclosure and that a thermal transfer sheet 100 of an aspect illustrated in FIG. 1A has a configuration in which the transfer layer 10 of a single-layer structure consisting of the protective layer 3 is provided on the substrate 1. The thermal transfer sheet 100 of an aspect illustrated in FIG. 2 has a release layer 2 provided between the substrate 1 and the transfer layer 10 in the thermal transfer sheet 100 illustrated in FIG. 1A. In the thermal transfer sheet 100 of an aspect illustrated in FIG. 3A, the transfer layer 10 has a layered structure in which the protective layer 3 and an adhesive layer 5 are layered in this order from the side of the substrate 1, and in the thermal transfer sheet 100 of an aspect illustrated in FIG. 3B, the transfer layer 10 has a layered structure in which an peel layer 4, the protective layer 3, and the adhesive layer 5 are layered in this order.

In describing advantages of the thermal transfer sheet of the first embodiment of the present disclosure and a thermal transfer sheet of a second embodiment described below, the relationship between the initial breakage peeling-off force and occurrence of head untransfer will be described.

Figure 5:
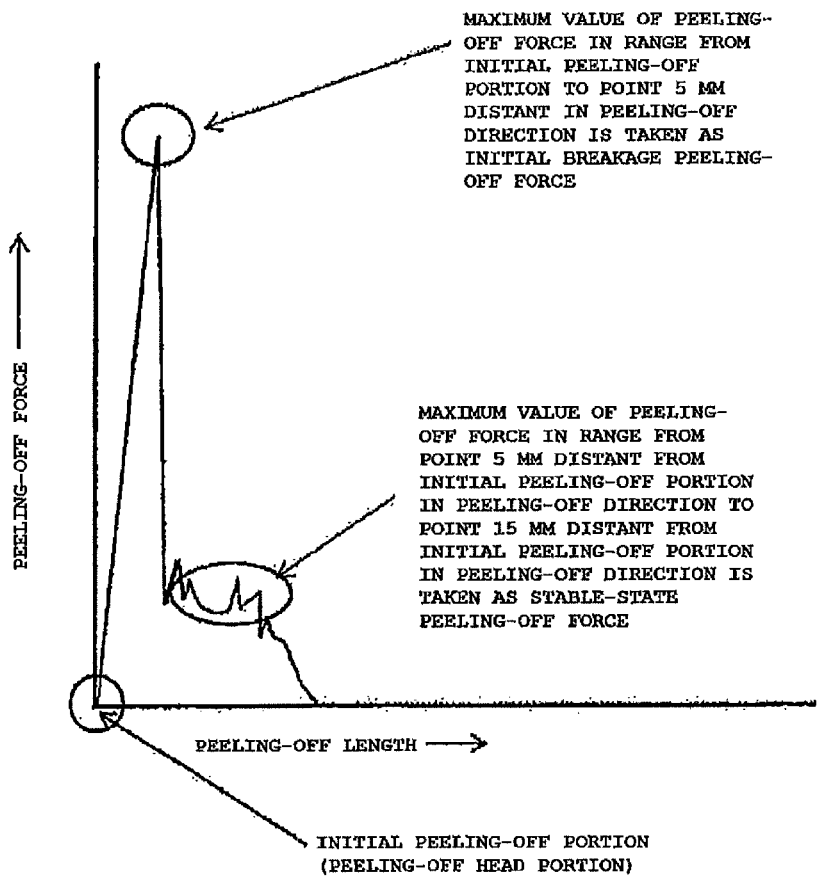
FIG. 5 is a drawing illustrating the relationship between the stable-state peeling-off force and the initial breakage peeling-off force.

The peeling-off force when a thermal transfer sheet in which a transfer layer is provided on a substrate is used to transfer the transfer layer onto a transfer receiving article, specifically, the peeling-off force when a transfer layer is fused or bonded onto a transfer receiving article and this transfer layer is peeled from the side of the substrate exhibits behavior illustrated in FIG. 5, and the peeling-off force when the head part of the transfer layer (peel start portion) is peeled from the side of the substrate (initial breakage peeling-off force) exhibits a larger value in comparison with the subsequent peeling-off force (stable-state peeling-off force). In other words, the head portion of the transfer layer, at which the peeling-off force increases, is unlikely to be accurately peeled from the side of the substrate. Thus, untransfer of the head portion (hereinafter referred to as head untransfer) is likely to occur, wherein the transfer layer, which originally should be transferred onto the side of the transfer receiving article and peeled from the side of the substrate of the thermal transfer sheet, remains on the side of the thermal transfer sheet without being peeled from the side of the substrate. Furthermore, the magnitude of the initial breakage peeling-off force has a close relevance to the strength of the transfer layer (the transfer layer may be replaced by the protective layer). The higher the strength of the transfer layer, the larger the initial breakage peeling-off force of the transfer layer. In other words, in the case where, in a thermal transfer sheet in which a transfer layer is provided on the substrate, the strength of the transfer layer is enhanced in order to impart sufficient durability to the transfer layer, head untransfer is likely to occur accordingly.

The peel property when the transfer layer is peeled depends on the peeling-off angle when the transfer layer is peeled from the side of the substrate of the thermal transfer sheet. In order to make the peel property of the transfer layer satisfactory, it is necessary to consider the peel property of the transfer layer at a desired peeling-off angle.

Figure 6A:
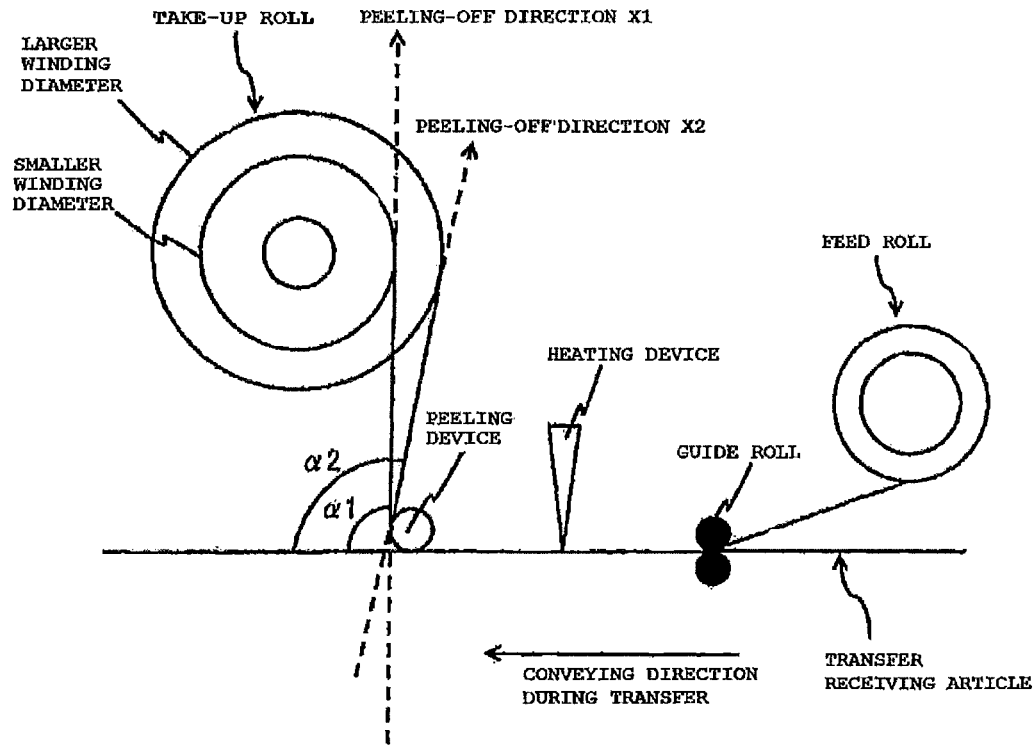
FIGS. 6A and 6B are schematic views illustrating the relationship between a winding diameter in a take-up roll and a peeling-off angle.
Figure 6B:
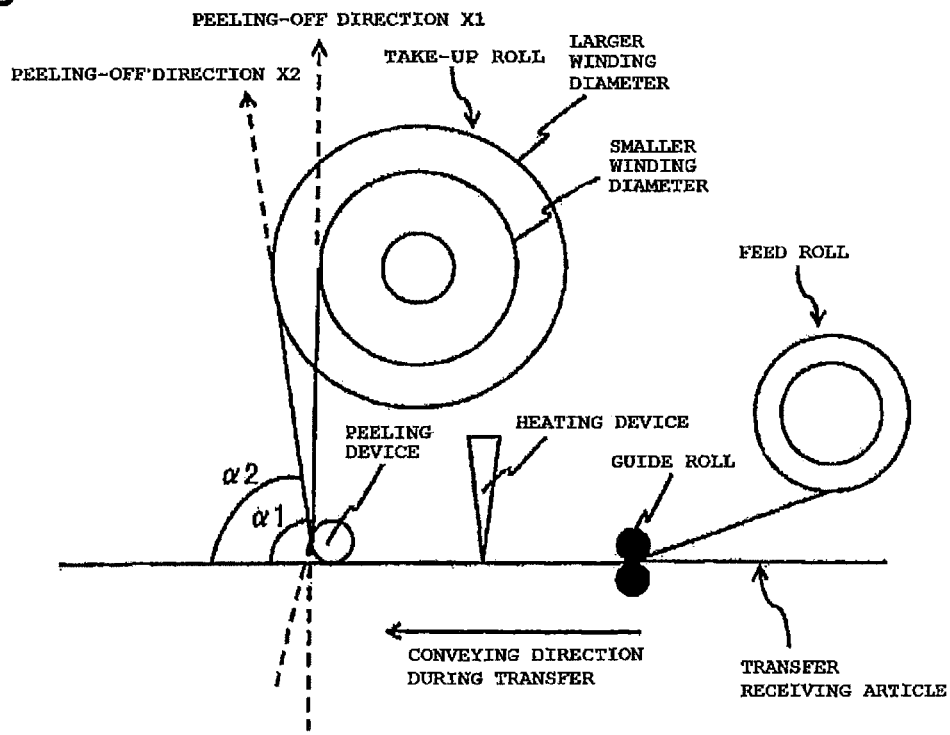

FIGS. 6A and 6B are schematic views for describing the peeling-off angle of the thermal transfer sheet, each having a different initial position of a take-up roll and a different take-up direction by the take-up roll. The schematic views of the figures have a feed roll that supplies a thermal transfer sheet (a thermal transfer sheet before the transfer layer is transferred), a heating device that fuses the transfer layer of the thermal transfer sheet fed from the feed roll and a transfer receiving article to each other, a peeling device that peels the transfer layer fused on the transfer receiving article from the side of the substrate of the thermal transfer sheet (e.g., a peel roll or peel plate), a take-up roll that takes up the thermal transfer sheet after the transfer layer is transferred (constituent members of the thermal transfer sheet other than the transfer layer), a guide roll that guides the thermal transfer sheet fed from the feed roll to a conveyance path, and the like. In the aspect illustrated in the figures, peel by the peeling device is completed to thereby provide a print in which the transfer layer is transferred onto the transfer receiving article.

In FIGS. 6A and B, the smaller winding diameter denotes the winding diameter of the take-up roll in the initial stage of peel of the transfer layer, and the larger winding diameter denotes the winding diameter of the take-up roll during progress of peel of the transfer layer. In the aspects illustrated in the figures, the peeling-off angle $\alpha 1$, which is the angle formed between the face of the transfer receiving article and the axis in the peel-off direction X1 during release (during transfer) is set to be 90°. In other words, the peeling-off angle $\alpha 1$ on the smaller winding diameter of the take-up roll is set to be 90°. Note that the peeling-off angle of 90° is a peeling-off angle at which the foil cutting property when the transfer layer is peeled is satisfactory and an occurrence of tailing can be inhibited. The foil cutting property of the transfer layer referred to herein represents the degree of inhibition of tailing when the transfer layer is transferred onto a transfer receiving article, and the case where the foil cutting property is satisfactory means that the occurrence of tailing can be inhibited. The tailing referred to herein means a phenomenon in which, when the transfer layer is transferred onto a transfer receiving article, the transfer layer is transferred so as to protrude to a non-transfer region side from a boundary between a transfer region and the non-transfer region of the transfer layer as a start point.

The peeling-off angle when the transfer layer is peeled from the side of the substrate of the thermal transfer sheet is determined by the angle formed between the face of the transfer receiving article and the axis in the peel-off direction (tension direction) during peel. Here, in the case where peel of the transfer layer (transfer of the transfer layer) is advanced from the side of the substrate of the thermal transfer sheet and the winding diameter of the take-up roll increases, the peel-off direction shifts from the peel-off direction X1 at the initial stage, and accordingly, the peeling-off angle also varies. For example, in the aspect illustrated in FIG. 6A, in the case where take-up by the take-up roll is advanced and the winding diameter of the take-up roll increases (in the case the larger winding diameter is taken), the peeling-off angle $\alpha 2$, which is the angle formed between the face of the transfer receiving article and the peel-off direction X2 during peel becomes larger than the peeling-off angle $\alpha 1$ at the initial stage of peel. In contrast, in the aspect illustrated in FIG. 6B, in the case where take-up by the take-up roll is advanced and the winding diameter of the take-up roll increases (in the case the larger winding diameter is taken), the peeling-off angle $\alpha 2$, which is the angle formed between the face of the transfer receiving article and the peel-off direction X2 during peel becomes smaller than the peeling-off angle $\alpha 1$ at the initial stage of peel.

Accordingly, in order to inhibit occurrence of head untransfer, only considering the initial breakage peeling-off force at a desired peeling-off angle (in the aspect illustrated, a peeling-off angle of 90°) is insufficient. In consideration of a variation in the peeling-off angle, it is necessary to set an initial breakage peeling-off force capable of inhibiting occurrence of head untransfer even at the peeling-off angle after varied.

Note that, in FIGS. 6A and 6B, the relationship between the winding diameter of the take-up roll that takes up the thermal transfer sheet after the transfer layer is peeled therefrom and the peeling-off angle is described, but the variation in the peeling-off angle may occur due to a factor other than this. For example, in the case where a peel roll is used as the peeling device, the peeling-off angle may depend on the size of the peel roll diameter. Alternatively, in accordance with the winding diameter of the feed roll and the tension applied on the thermal transfer sheet during transferring the transfer layer, the peeling-off angle may vary. Alternatively, the peeling-off angle may vary due to a factor other than these. Such a variation in the peeling-off angle is in the range of ±30° with respect to the reference axis, which is an axis having a peeling-off angle of 90° with respect to the face of a transfer receiving article during peel.

The thermal transfer sheet 100 of the first embodiment of the present disclosure, in which this respect is considered, satisfies the following conditions 1 and 2.

Condition 1: The transfer layer 10 has a single-layer structure or layered structure including a protective layer 3, and the protective layer 3 contains a cured product of an active ray-curable resin.

Condition 2: The initial breakage peeling-off force when the transfer layer 10 is peeled under conditions of a peeling-off temperature of 20° C. or more and 70° C. or less and a peeling-off angle of 60° or more is 1.97 mN/m or less.

According to the thermal transfer sheet 100 of the first embodiment of the present disclosure which satisfies the above conditions 1 and 2, it is possible to inhibit occurrence of head untransfer when the transfer layer 10 is peeled while imparting good durability to the transfer layer 10 including the protective layer 3.

Note that the reason why the peeling-off angle is specified to 60° in the condition 1 is that, in the case where the initial breakage peeling-off force when the transfer layer 10 is peeled under conditions of a peeling-off temperature of 20° C. or more and 70° C. or less and a peeling-off angle of 60° is 1.97 mN/m or less, even if the peeling-off angle is larger than 60°, the initial breakage peeling-off force is 1.97 mN/m or less. Specifically, the reason why is that, if the above conditions are satisfied, the initial breakage peeling-off force is 1.97 mN/m or less even at the upper limit peeling-off angle of 120°, at which a variation in the peeling-off angle is anticipated. Accordingly, the thermal transfer sheet 100 of the first embodiment of the present disclosure is only required to satisfy the condition 1 and to have an initial breakage peeling-off force when the transfer layer 10 is peeled under conditions of a peeling-off temperature of 20° C. or more and 70° C. or less and a peeling-off angle of 60° of 1.97 mN/m or less. Also, the thermal transfer sheet 100 of the first embodiment of the present disclosure is only required to satisfy the condition 1 and to have an initial breakage peeling-off force when the transfer layer 10 is peeled under conditions of a peeling-off temperature of 20° C. or more and 70° C. or less and a peeling-off angle of 60° or more and 120° or less is 1.97 mN/m or less.

Furthermore, according to the thermal transfer sheet 100 of the first embodiment of the present disclosure which satisfies the above conditions 1 and 2, it is possible to inhibit occurrence of head untransfer even in the case where the actual peeling-off angle varies from the specified peeling-off angle due to various factors exemplified above. The above occurrence of head untransfer can be inhibited by either peel modes: a hot peel mode and a cold peel mode. The hot peel mode referred to herein is a peel mode in which a thermal transfer sheet is applied with energy to melt or soften the transfer layer, and only the transfer layer transferred onto a transfer receiving article is peeled from the thermal transfer sheet before this transfer layer solidifies, and the cold peel mode means a peel mode in which only the transfer layer transferred onto a transfer receiving article is peeled from the thermal transfer sheet after the transfer layer has solidified.

(Method for Calculating Initial Breakage Peeling-Off Force 1)

The initial breakage peeling-off force in the thermal transfer sheet of the first embodiment of the present disclosure means a peeling-off force to be calculated by the following method.

(A) A thermal transfer sheet to be measured is cut into a predetermined width (hereinafter referred to as the width A). Note that the thermal transfer sheet to be measured includes a substrate and a transfer layer provided peelably from the substrate. Accordingly, the width of the transfer layer after cut is also the width A.

(B) The cut thermal transfer sheet to be measured is attached onto the stage of a peel analyzer (VPA-3, Kyowa Interface Science Inc.).

(C-1) The peeling-off angle in the peel analyzer is set to 60°, and the transfer layer is peeled from the side of the substrate of the thermal transfer sheet under conditions of a stage temperature: 20° C. (peeling-off temperature: 20° C.) and a peel rate: 1464 mm/min. The peeling-off force in the range from the initial peeling-off portion as the peel start position to a point 5 mm (5 mm exclusive) distant in the peel-off direction is measured with the load cell measurement unit attached to the peel analyzer. Then, the initial breakage peeling-off force at a peeling-off temperature of 20° C. can be calculated by dividing the peeling-off force having the maximum value among the peeling-off forces measured (maximum peeling-off force in the measurement range) by the length of the thermal transfer sheet in the width direction (width A).

(C-2) The initial breakage peeling-off force is calculated in the same manner also at a peeling-off temperature: 70° C., at which the stage temperature is adjusted to 70° C.

(C-3) The initial breakage peeling-off force is calculated in the same manner as described above also at peeling-off angles of 90° and 120°.

In any of the above (C-1) to (C-3), in the case where the value of the initial breakage peeling-off force is 1.97 mN/m or less, it can be determined that the initial breakage peeling-off force when the transfer layer is peeled satisfies the above condition 2.

In the thermal transfer sheet 100 of the first embodiment of the present disclosure, the initial breakage peeling-off force to be calculated by the above method for calculating the initial breakage peeling-off force is preferably 1.28 mN/m or less, more preferably 0.99 mN/m or less, under conditions of a peeling-off temperature of 20° C. or more and 40° C. or less and a peeling-off angle of 60°. According to the thermal transfer sheet 100 of this aspect, it is possible to further lower the dependency on the peeling-off angle when the transfer layer 10 is peeled by the cold peel mode, and it is possible to further effectively inhibit occurrence of head untransfer even in the case where the actual peeling-off angle varies from the specified peeling-off angle.

Also, the thermal transfer sheet 100 of the first embodiment of the present disclosure satisfies the above conditions 1 and 2, and the stable-state peeling-off force when the transfer layer 10 is peeled under conditions of a peeling-off temperature of 20° C. or more and 70° C. or less and a peeling-off angle of 60° or more is preferably 0.098 mN/m or more and 1.97 mN/m or less, more preferably 0.098 mN/m or more and 0.99 mN/m or less, particularly preferably 0.098 mN/m or more and 0.5 mN/m or less. According to the thermal transfer sheet 100 of this aspect, it is possible to have a further satisfactory foil cutting property and transfer the transfer layer 10 onto a transfer receiving article while inhibiting head untransfer.

(Method for Calculating Stable-State Peeling-Off Force 1)

The stable-state peeling-off force referred to herein is a peeling-off force to be measured in a measurement range from a point 5 mm distant from the initial peeling-off portion in the peel-off direction (see FIGS. 5 and 7) to a point 15 mm distant from the initial peeling-off portion in the peel-off direction, that is, a measurement range from a point 5 mm distant from the initial peeling-off portion in the peel-off direction as the start point to a point 10 mm distant from this start point in the peel-off direction (peeling-off length: 10 mm), in the method for calculating an initial breakage peeling-off force described above, and means a value obtained by dividing the peeling-off force having the maximum value among the peeling-off forces measured (maximum peeling-off force in the measurement range) by the length of the thermal transfer sheet in the width direction (width A). In other words, in the above Method for calculating initial breakage peeling-off force 1, the phrase "the peeling-off force in the range from the initial peeling-off portion to a point 5 mm (5 mm exclusive) distant in the peel-off direction" may be replaced by "the peeling-off force in a range from a point 5 mm distant from the initial peeling-off portion in the peel-off direction to a point 15 mm distant from the initial peeling-off portion in the peel-off direction".

Additionally, the thermal transfer sheet 100 of the first embodiment of the present disclosure satisfies the above conditions 1 and 2, and the scratch hardness (a sapphire needle having a tip radius of 0.1 mm is used) when the face located on the side of the substrate 1 of the transfer layer 10 is measured by a method in compliance with JIS-K-5600-5-5 is preferably 200 g or more, more preferably 210 g or more. Hereinbelow, the scratch hardness (a sapphire needle having a tip radius of 0.1 mm is used) when the face located on the side of the substrate 1 of the transfer layer 10 is measured by a method in compliance with JIS-K-5600-5-5 may be abbreviated as the scratch hardness of the face located on the side of the substrate 1 of the transfer layer 10.

The scratch hardness of the face located on the side of the substrate 1 of the transfer layer 10 can be measured by transferring the transfer layer 10 on a transfer receiving article. For measurement of the scratch hardness, a surface property tester (HEIDON TYPE: 14, Shinto Scientific Co., Ltd.) was used. The same applies to a thermal transfer sheet 100 of a second embodiment of the present disclosure mentioned below.

Hereinbelow, each constituent of the thermal transfer sheet 100 of the first embodiment of the present disclosure will be concretely described.

(Substrate)

The substrate 1 has the transfer layer 10 constituting the thermal transfer sheet 100 of the first embodiment of the present disclosure or an optional layer (e.g., a release layer 2) to be provided between the substrate 1 and the transfer layer 10. There is no particular limitation with respect to the material of the substrate 1, but it is preferred for the material to have heat resistance sufficient to endure the thermal energy (e.g., a thermal head, heat roller, or hot stamp machine) when the transfer layer 10 is transferred (fused or bonded) onto a transfer receiving article and to have mechanical strength sufficient to support the transfer layer 10 and solvent resistance. Examples of the material of the substrate 1 include polyesters such as polyethylene terephthalate, polybutylene terephthalate, polyethylene naphthalate, polyethylene terephthalate-isophthalate copolymers, terephthalic acid-cyclohexanedimethanol-ethylene glycol copolymers, and polyethylene terephthalate/polyethylene naphthalate coextruded films, polyamides such as nylon 6 and nylon 66, polyolefins such as polyethylene, polypropylene, and polymethylpentene, vinyl resins such as polyvinyl chloride, acryl resins such as polyacrylate, poly(meth)acrylate, and polymethyl(meth)acrylate, imide resins such as polyimide and polyether imide, engineering resins such as polyarylate, polysulfone, polyether sulfone, polyphenylene ether, polyphenylene sulfide (PPS), polyaramid, polyether ketone, polyether nitrile, polyether ether ketone, and polyether sulfite, polycarbonate, polystyrenes such as polystyrene, high impact polystyrene, acrylonitrile-styrene copolymers (AS resins), and acrylonitrile-butadiene-styrene copolymers (ABS resins), and celluloses such as cellophane, cellulose acetate, and nitrocellulose.

The substrate 1 may be a copolymer or a mixed product (including an alloy) mainly based on the resins exemplified above, or a laminate composed of a plurality of layers. The substrate also may be a stretched film or an unstretched film. For the purpose of improving the strength, films stretched in a uniaxial direction or biaxial direction are preferably used. The substrate 1 can be used in the form of a film, sheet, or board composed of at least one layer of these resins. Among the substrates composed of the resins exemplified above, polyester films such as polyethylene terephthalate and polyethylene naphthalate are suitably used due to their excellent thermal resistance and mechanical strength. Among these, polyethylene terephthalate films are more preferable.

For preventing blocking, it is possible to impart asperities to the surface of the substrate 1 as required. Examples of procedures to form asperities on the surface of the substrate 1 include matting agent-kneading processing, sand blast processing, hairline processing, matte coating processing, and chemical etching processing. The matting agent-kneading processing is a processing method for forming a substrate from a resin into which an inorganic material, or an organic material is kneaded. The matte coating processing is a processing method for imparting asperities to a substrate surface by coating the substrate surface with a coating agent containing an organic material or an inorganic material.

There is no particular limitation with respect to the thickness of the substrate 1, and the thickness is generally in the range of 0.5 μm or more and 100 μm or less. The thickness is preferably 0.5 μm or more and 50 μm or less, more preferably 4 μm or more and 25 μm or less. By allowing the substrate to have a preferable thickness, it is possible to sufficiently transmit the energy to the side of the transfer layer 10 when the transfer layer 10 is transferred from the thermal transfer sheet 100, to thereby make a further improvement in the transferability when the transfer layer 10 is transferred. It is also possible to enhance the mechanical strength of the substrate 1 to thereby sufficiently support the transfer layer 10.

The face located on the side of the transfer layer 10 of the substrate 1 may be subjected to easily-adhesive treatment, in advance, such as corona discharge treatment, plasma treatment, ozone treatment, flame treatment, primer (also referred to as an anchor coat, an adhesion promoter, or an easy-adhesion agent) coating treatment, preheating treatment, dust removing treatment, vapor deposition treatment, alkaline treatment, and addition of an antistatic layer. Additives such as a filling agent, a plasticizer, a colorant, and an antistatic agent may be also added to the substrate 1 as required.

(Transfer Layer)

As shown in FIG. 1A, FIG. 2A, and FIG. 3, the transfer layer 10 is provided directly or indirectly, via another layer, on the substrate 1.

(Protective Layer)

The transfer layer 10 has a single-layer structure consisting of a protective layer 3 or a layered structure including the protective layer 3. In the thermal transfer sheet 100 of the first embodiment of the present disclosure, the protective layer 3 constituting the transfer layer 10 contains a cured product of various curable resins (condition 1 described above). In other words, the protective layer 3 contains a resin obtained by irradiating an active ray-curable resin with an active ray. The protective layer 3 contains a cured product of an active ray-curable resin.

The active ray-curable resin referred to herein means a precursor or a composition before irradiated with an active ray. The active ray referred to herein also means a radioactive ray which is allowed to chemically act on an active ray-curable resin to promote polymerization. Specific examples include visible light rays, ultraviolet rays, X rays, electron beams, α rays, β rays, and γ rays. Hereinbelow, the active ray-curable resin, which forms a cured product of an active ray-curable resin, will be described.

The active ray-curable resin as an example includes, as polymerization components, a composition and the like prepared by appropriately mixing a polymer, a prepolymer, an oligomer and/or a monomer having a polymerizable unsaturated bond such as a (meth)acryloyl group and a (meth)acryloyloxy group or an epoxy group in the molecule.

The active ray-curable resin as an example includes a polyfunctional (meth)acrylate as a polymerization component. As the polyfunctional (meth)acrylate, a polyfunctional (meth)acrylate having 5 or more and 15 or less functional groups is preferable, and a polyfunctional (meth)acrylate having 6 or more and 15 or less functional groups is more preferable. The active ray-curable resin as another example includes a urethane (meth)acrylate and preferably includes a polyfunctional urethane (meth)acrylate, as a polymerization component. As the polyfunctional urethane (meth)acrylate, a polyfunctional urethane (meth)acrylate having 5 or more and 15 or less functional groups is preferable, and a polyfunctional urethane (meth)acrylate having 6 or more and 15 or less functional groups is more preferable.

The (meth)acrylates referred to herein include acrylates and methacrylates, (meth)acrylic acids include acrylic acid and methacrylic acid, and (meth)acrylic acid esters include acrylic acids ester and methacrylic acid esters.

There is not particular limitation with respect to the content of the cured product of the active ray-curable resin based on the total mass of the protective layer 3. The content is preferably 5% by mass or more and 80% by mass or less, more preferably 5% by mass or more and 70% by mass or less, even more preferably 10% by mass or more and 50% by mass or less.

The protective layer 3 also preferably contains a cured product of a urethane (meth)acrylate, particularly, a cured product of a polyfunctional urethane (meth)acrylate in the content described above, as the cured product of the active ray-curable resin.

From the viewpoint of combining the solvent resistance and the bendability of the protective layer, the protective layer 3 preferably contains a cured product of (i) a polyfunctional urethane (meth)acrylate having 5 or more and 15 or less functional groups, particularly 6 or more and 15 or less functional groups and (ii) either one or both of a polyfunctional urethane (meth)acrylate having 2 or more and 4 or less functional groups and a (meth)acrylate having 2 or more and 5 or less functional groups. Alternatively, the protective layer 3 preferably contains (iii) a cured product of a polyfunctional urethane (meth)acrylate having 5 or more and 15 or less functional groups, particularly 6 or more and 15 or less functional groups and (iv) either one or both of a cured product of a polyfunctional urethane (meth)acrylate having 2 or more and 4 or less functional groups and a cured product of a (meth)acrylate having 2 or more and 5 or less functional groups. The content of the component derived from (ii) the polyfunctional urethane (meth)acrylate having 2 or more and 4 or less functional groups and the (meth)acrylate having 2 or more and 5 or less functional groups described above is preferably 5% by mass or more and 80% by mass or less, more preferably 10% by mass or more and 70% by mass or less, based on the total mass of the protective layer 3. The same applies to (iv) the cured product of a polyfunctional urethane (meth)acrylate having 2 or more and 4 or less functional groups and the cured product of a (meth)acrylate having 2 or more and 5 or less functional groups described above.

Additionally, as the polyfunctional urethane (meth)acrylate as a polymerization component, one having a weight average molecular weight of 400 or more and 20000 or less is preferable, and one having a weight average molecular weight of 500 or more and 10000 or less is more preferable. By using a urethane (meth)acrylate having a weight average molecular weight within the above preferable range as the urethane (meth)acrylate, it is possible to further improve the abrasion resistance and foil cutting property of the protective layer 3. For a similar reason, the weight average molecular weight of the (meth)acrylate having 2 or more and 5 or less functional groups is preferably 200 or more and 5000 or less. Note that the "weight average molecular weight" herein means a value measured by gel permeation chromatography using polystyrene as the standard substance and can be measured by a method in compliance with JIS-K-7252-1 (2008).

The active ray-curable resin as an example also include an unsaturated bond-containing (meth)acrylate copolymer (hereinafter also referred to as an unsaturated bond-containing acrylic copolymer in some cases) as a polymerization component. Examples of the unsaturated bond-containing (meth)acrylate copolymer include polyester (meth)acrylate, epoxy (meth)acrylate, melamine (meth)acrylate, and triazine (meth)acrylate.

Additionally, as the unsaturated bond-containing acrylic copolymer as a polymerization component, one having an acid value of 5 mgKOH/g or more and 500 mgKOH/g or less is preferable, and one having an acid value of 10 mgKOH/g or more and 150 mgKOH/g or less is more preferable. By using an unsaturated bond-containing acrylic copolymer having an acid value within the above preferable range as the unsaturated bond-containing acrylic copolymer, it is possible to enhance the surface strength of the protective layer 3. The acid value of the polymer can be appropriately adjusted by adjusting the ratio of monomer components constituting the polymer.

Additionally, as the unsaturated bond-containing acrylic copolymer, one having a weight average molecular weight of 3000 or more and 100000 or less is preferable, and one having a weight average molecular weight of 10000 or more and 80000 or less is more preferable. By using an unsaturated bond-containing acrylic copolymer having a weight average molecular weight within the above preferable range as the unsaturated bond-containing acrylic copolymer, it is possible to impart higher chemical durability such as thermal resistance and chemical resistance and physical durability such as scratch strength to the protective layer 3. It is also possible to inhibit gelling reaction during storage of a coating liquid for protective layer for forming a protective layer and to improve the storage stability of the coating liquid for protective layer.

The unsaturated bond-containing acrylic copolymer is preferably contained in the range of 10% by mass or more and 80% by mass or less, more preferably contained in the range of 20% by mass or more and 70% by mass or less, even more preferably contained in the range of 20% by mass or more and 50% by mass or less, in the active ray-curable resin.

The active ray-curable resin may also include, as a polymerization component, an oligomer and/or monomer of (meth)acrylic acid, styrene, vinyl acetate, hydroxyethyl vinyl ether, ethylene glycol divinyl ether, pentaerythritol trivinyl ether, (meth)acrylamide, N-hydroxymethyl (meth)acrylamide, N-vinylformamide, acrylonitrile, or the like, in addition to the unsaturated bond-containing acrylic copolymer. The active ray-curable resin may also include a prepolymer, oligomer and/or monomer as follows.

Examples of the prepolymer include polyester (meth)acrylates obtained by introducing (meth)acrylic acid into a polyester obtained by bonding a polybasic acid such as adipic acid, trimellitic acid, maleic acid, phthalic acid, terephthalic acid, himic acid, malonic acid, succinic acid, glutaric acid, itaconic acid, pyromellitic acid, fumaric acid, glutaric acid, pimelic acid, sebacic acid, dodecanoic acid, or tetrahydrophthalic acid with a polyhydric alcohol such as ethylene glycol, propylene glycol, diethylene glycol, propylene oxide, 1,4-butanediol, triethylene glycol, tetraethylene glycol, polyethylene glycol, glycerin, trimethylolpropane, pentaerythritol, sorbitol, 1,6-hexanediol, or 1,2,6-hexanetriol; epoxy (meth)acrylates obtained by introducing (meth)acrylic acid into an epoxy resin such as bisphenol A-epichlorohydrin-(meth)acrylic acid and phenol novolac-epichlorohydrin-(meth)acrylic acid; urethane(meth)acrylates obtained by introducing (meth)acrylic acid into polyurethane such as ethylene glycol-adipic acid-tolylene diisocyanate-2-hydroxyethyl acrylate, polyethylene glycol-tolylene diisocyanate-2-hydroxyethyl acrylate, hydroxyethyl phthalyl methacrylate-xylene diisocyanate, 1,2-polybutadiene glycol-tolylene diisocyanate-2-hydroxyethyl acrylate, and trimethylolpropane-propylene glycol-tolylene diisocyanate-2-hydroxyethyl acrylate; silicone resin acrylates such as polysiloxane (meth)acrylate and polysiloxane-diisocyanate-2-hydroxyethyl (meth)acrylate, and additionally, alkyd-modified (meth)acrylates obtained by introducing a (meth)acryloyl group into an oil-modified alkyd resin, and spiran resin acrylates.

Examples of the monomer or oligomer include monofunctional acrylic acid esters such as 2-ethylhexyl acrylate, 2-hydroxypropyl acrylate, glycerol acrylate, tetrahydrofurfuryl acrylate, phenoxyethyl acrylate, nonylphenoxyethyl acrylate, tetrahydrofurfuryloxyethyl acrylate, tetrahydrofurfuryloxyhexanolide acrylate, acrylates of ε-caprolactone adducts of 1,3-dioxane alcohol, and 1,3-dioxolane acrylate.

Examples thereof include bifunctional acrylic acid esters such as ethylene glycol diacrylate, triethylene glycol diacrylate, pentaerythritol diacrylate, hydroquinone diacrylate, resorcin diacrylate, hexanediol diacrylate, neopentyl glycol diacrylate, tripropylene glycol diacrylate, diacrylate of neopentyl glycol hydroxypivalate, diacrylate of neopentyl glycol adipate, diacrylates of ε-caprolactone adducts of neopentyl hydroxypivalate glycol, 2-(2-hydroxy-1,1-dimethylethyl)-5-hydroxymethyl-5-ethyl-1,3-dioxane diacrylate, tricyclodecanedimethylol acrylate, ε-caprolactone adducts of tricyclodecanedimethylol acrylate, and diacrylate of diglycidyl ether of 1,6-hexanediol; polyfunctional acrylic acid esters such as trimethylolpropane triacrylate, ditrimethylolpropane tetraacrylate, trimethylolethane triacrylate, pentaerythritol triacrylate, pentaerythritol tetraacrylate, dipentaerythritol tetraacrylate, dipentaerythritol pentaacrylate, dipentaerythritol hexaacrylate, ε-caprolactone adducts of dipentaerythritol hexaacrylate, pyrogallol triacrylate, propionic acid-dipentaerythritol triacrylate, propionic acid-dipentaerythritol tetraacrylate, and hydroxypivalyl aldehyde-modified dimethylolpropane triacrylate; phosphazene monomers, triethylene glycol, EO-modified isocyanurate diacrylate, EO-modified isocyanurate triacrylate, dimethyltricyclodecane diacrylate, trimethylolpropane acrylic acid benzoic acid esters, and alkylene glycol-type acrylic acid-modified and urethane-modified acrylates. Methacrylic acid, itaconic acid, crotonic acid, maleic acid esters, or the like obtained by replacing the acrylate by methacrylate, itaconate, crotonate, or maleate also may be used.

The protective layer 3 may contain one cured product of the active ray-cured resin singly or may contain two or more cured products of the active ray-cured resin. The protective layer 3 may contain another resin together with the cured product of the active ray-curable resin. Another resin may be a cured resin cured with a curing agent or the like or may be an uncured resin. The same applies to a protective layer 3 in the transfer layer 10 of the second embodiment mentioned below.

The protective layer 3 of a preferable aspect contains a filler having a volume average particle size of 0.1 μm or more and 2 μm or less. Hereinbelow, the filler having a volume average particle size of 0.1 μm or more and 2 μm or less is referred to as a first filler. The volume average particle size of the filler referred to herein is a value determined by measurement using a grain size distribution/particle size distribution analyzer (Nanotrac grain size distribution analyzer, Nikkiso Co., Ltd.) in compliance with JIS-Z-8819-2 (2001).

According to the protective layer 3 containing the first filler, it is possible to inhibit occurrence of head untransfer more effectively.

There is no particular limitation with respect to the component of the first filler, and examples of the filler include organic fillers, inorganic fillers, and organic-inorganic hybrid type fillers. The filler may be a powder or a sol-type one, but a powder filler is preferably used because of its wide solvent-selectivity when a coating liquid for protective layer is prepared.

Examples of the powder organic filler can include acryl particles such as uncrosslinked acryl particles and crosslinked acryl particles, polyamide particles, fluorine particles, polyethylene wax, and silicone particles. Examples of the powder inorganic filler include aluminum particles, zirconia particles, calcium carbonate particles, silica particles, and metal oxide particles such as titanium oxide and zinc oxide particles. Examples of the filler of organic-inorganic hybrid type include ones prepared by hybridizing an acryl resin with silica particles. Additionally, examples of the sol-type filler include silica sol-type and organosol-type fillers. It is also possible to use particles surface-treated using a silane coupling agent such as γ-aminopropyltriethoxysilane, γ-methacryloxypropyltrimethoxysilane, or the like. One of these fillers may be used singly, or two or more of these may be used in combination. Among these, silica particles are suitable.

There is also no limitation with respect to the shape of the first filler, and examples of the shape include spherical, polygonal, acicular, feathery, and amorphous shapes.

The content of the first filler is preferably 2% by mass or more and 30% by mass or less, more preferably 6% by mass or more and 30% by mass or less, even more preferably 6% by mass or more and 20% by mass or less, particularly preferably 8% by mass or more and 20% by mass or less, based on the total mass of the protective layer 3. It is possible to inhibit occurrence of head untransfer further effectively by setting the content of the first filler to the preferable content described above. It is also possible to make the foil cutting property of the transfer layer further satisfactory.

The protective layer 3 of the preferable aspect also contains a filler having a volume average particle size of 40 nm or less. Hereinbelow, the filler having a volume average particle size of 40 nm or less is referred to as a second filler. There is no limitation with respect to the lower limit of the volume average particle size of the second filler, and example is of the order of 1 nm.

According to the protective layer 3 containing the second filler, it is possible to make the durability of the transfer layer 10 further satisfactory. The protective layer 3 of a particularly preferable aspect contains the first filler and the second filler.

The second filler is different from the first filler described above in that the volume average particle size is 40 nm or less, and except for this difference, it is possible to appropriately select and use the first filler components described above.

The content of the second filler is preferably 5% by mass or more and 60% by mass or less, more preferably 10% by mass or more and 50% by mass or less, still more preferably 20% by mass or more and 40% by mass or less, based on the total mass of the protective layer 3. It is possible to make the durability of the protective layer 3 further satisfactory by setting the content of the second filler to the above preferable content. Accordingly, it is possible to impart sufficient durability to a print to be obtained by transferring the transfer layer 10 including the protective layer 3 onto a transfer receiving article.

The protective layer 3 may contain one filler or two or more fillers, as the first filler and the second filler. Alternatively, the protective layer 3 may contain a filler having a volume average particle size different from that of the first filler and the second filler.

There is no particular limitation with respect to the thickness of the protective layer 3, and the thickness is preferably 1 μm or more and 15 μm or less, preferably 2 μm or more and 6 μm or less. It is possible to make the foil cutting property satisfactory by setting the thickness of the protective layer 3 within this range. It is also possible to inhibit occurrence of defective transfer such as picking and chipping during transfer of the transfer layer 10.

There is not particular limitation with respect to the method for forming the protective layer 3, and the protective layer 3 can be formed by preparing a coating liquid for protective layer containing an active ray-curable resin and optional components, applying this coating liquid onto the substrate 1 or an optional layer provided on the substrate 1 (e.g., the release layer 2), drying the liquid to form a coating film of a protective layer, and irradiating this coating film with an active ray to crosslink and cure the polymerization components such as the above polymerizable copolymer. When ultraviolet irradiation is applied as active ray irradiation, conventionally known ultraviolet irradiation apparatuses can be used. For example, various apparatuses such as high pressure mercury lamps, low pressure mercury lamps, carbon arcs, xenon arcs, metal halide lamps, non-electrode ultraviolet lamps, and LEDs can be used without limitation. Alternatively, when an electron beam is applied as active ray irradiation, a high energy-type electron beam irradiation apparatus that applies an electronic beam at an energy of 100 keV or more and 300 keV or less, a low energy-type electron beam irradiation apparatus that applies an electronic beam at an energy of 100 keV or less, or the like can be used. In terms of the irradiation mode, either of a scanning-type irradiation apparatus or a curtain-type irradiation apparatus may be used. There is no particular limitation on the method for applying the coating liquid for protective layer, and any conventionally known application method can be appropriately selected and used. Examples of the application method include a gravure printing method, a screen printing method, and a reverse roll coating method using a gravure printing plate. Application methods other than these methods also may be used. The same applies to methods for applying various coating liquids described below. Examples of the drying method include methods of removing the solvent by hot air drying.

(Adhesive Layer)

As shown in FIGS. 3A and 3B, the transfer layer 10 may have a layered structure in which an adhesive layer 5 is provided on the protective layer 3. According to the thermal transfer sheet 100 of this aspect, it is possible to make adhesion between the transfer layer 10 and a transfer receiving article 50 satisfactory when the transfer layer 10 is transferred onto the transfer receiving article 50, due to the presence of the adhesive layer 5. FIG. 3 is a schematic sectional view illustrating one example of the thermal transfer sheet of the first embodiment of the present disclosure. In each view, an optional layer such as a primer layer or the like also may be located between the layers constituting the transfer layer 10.

The adhesive layer contains a component having an adhesive property. Examples of the component having an adhesive property include ionomer resins, acid-modified polyolefins, ethylene-(meta)acrylic acid copolymers such as ethylene-(meth)ethylacrylate copolymers, acrylic acid ester copolymers such as ethylene-(meth)acrylic acid ester copolymers, polyurethanes, polyolefins such as α-olefin-maleic anhydride, polyesters, acryl resins, epoxy resins, urea resins, melamine resins, phenol resins, vinyl acetate, vinyl resins such as vinyl chloride-vinyl acetate copolymers, cyano acrylate, acrylic acid esters, maleic acid resins, polyvinyl butyral, alkyd resins, polyethylene oxides, phenol resins, urea resins, melamine-alkyd resins, cellulose resins, polyurethane, polyvinyl ether, silicone resins, and rubber-type resins. It is also possible to use products obtained by curing these resins with a curing agent. As the curing agent, isocyanate compounds are common, but aliphatic amines, alicyclic amines, aromatic amines, acid anhydrides, and the like can be used.

Among the components exemplified above, vinyl resins, acryl resins, polyvinyl butyral, polyesters, ethylene-(meth) acrylic acid copolymers, and acrylic acid ester copolymers are preferable.

Additionally, a function as a receiving layer may be imparted to the adhesive layer 5. In the case where the adhesive layer 5 has a function of a receiving layer, a print having a thermal transfer image can be obtained by forming a thermal transfer image on the adhesive layer 5 having a function of a receiving layer using a thermal transfer sheet including a die layer and transferring the transfer layer 10 including the adhesive layer 5 on which the thermal transfer image has been formed onto a transfer receiving article. In the case where the adhesive layer 5 functions as a receiving layer, it is possible to use conventionally known resin materials which can easily receive thermally-transferable colorants such as subliming dyes or thermally-fusible inks. Examples of the materials include polyolefins such as polypropylene, halogenated resins such as polyvinyl chloride or polyvinylidene chloride, vinyl resins such as polyvinyl acetate, vinyl chloride-vinyl acetate copolymers, ethylene-vinyl acetate copolymers, or polyacrylic acid esters, polyesters such as polyethylene terephthalate or polybutylene terephthalate, copolymers of an olefin such as polystyrene, polyamide, ethylene, or propylene and another vinyl polymer, ionomers, or cellulose resins such as cellulose diacetate, and polycarbonate. Among these, a vinyl chloride-vinyl acetate copolymer or polyvinyl chloride is preferable, and a vinyl chloride-vinyl acetate copolymer is more preferable.

There is no particular limitation with respect to the method for forming the adhesive layer 5, and the adhesive layer 5 can be formed by dispersing or dissolving a component having an adhesive property and various additives to be added as required into a suitable solvent to prepare a coating liquid for adhesive layer, applying this coating liquid onto the protective layer 3, followed by drying. The thickness of the adhesive layer is preferably 0.1 μm or more and 10 μm or less, more preferably 0.5 μm or more and 10 μm or less, even more preferably 0.8 μm or more and 3 μm or less, particularly preferably 0.3 μm or more and 2 μm or less.

(Peel Layer)

As shown in FIG. 3B, among the layers constituting the transfer layer 10, the peel layer 4 may be located nearest from the side of the substrate 1. It is possible to make the transferability of the transfer layer 10 satisfactory by locating the peel layer 4 on the transfer interface of the transfer layer 10.

Examples of the components of the peel layer 4 include ethylene-vinyl acetate copolymers, vinyl chloride-vinyl acetate copolymers, maleic acid-modified vinyl chloride-vinyl acetate copolymers, polyamides, polyesters, polyethylene, ethylene-isobutyl acrylate copolymers, polyvinyl butyral, polyvinyl acetate and copolymers thereof, ionomer resins, acid-modified polyolefins, acryl resins, (meth)acryl resins, (meth)acrylic acid ester resins, ethylene-(meth) acrylic acid copolymers, ethylene-(meth)acrylic acid ester copolymers, polymethyl (meth)acrylate, cellulose resins, polyvinyl ethers, polyurethanes, polycarbonate, polypropylene, epoxy resins, phenol resins, vinyl resins, maleic acid resins, alkyd resins, polyethylene oxides, urea resins, melamine resins, melamine-alkyd resins, silicone resins, rubber-type resins, styrene-butadiene-styrene block copolymers (SBS), styrene-isoprene-styrene block copolymers (SIS), styrene-ethylene-butylene-styrene block copolymers (SEBS), and styrene-ethylene-propylene-styrene block copolymers (SEPS). For the peel layer 4, one of these components may be used singly, or two or more of these may be used in combination.

There is no particular limitation with respect to the method for forming the peel layer 4, and the peel layer 4 may be formed by dispersing or dissolving the components exemplified above and additives to be added as required into a suitable solvent to prepare a coating liquid for peel layer, applying this coating liquid onto the substrate 1 or an optional layer provided on the substrate 1, followed by drying. There is not particular limitation with respect to the thickness of the peel layer 4, and the thickness is preferably 1 μm or more and 15 μm or less.

(Release Layer)

As shown in FIG. 2, the release layer 2 may be provided between the substrate 1 and the transfer layer 10. The release layer is an optional constituent in the transfer sheet 100 of the first embodiment of the present disclosure, is a layer not constituting the transfer layer 10, and is a layer that remains on the side of the substrate 1 when the transfer layer 10 is transferred onto the transfer receiving article. It is possible to make the transferability of the transfer layer 10 satisfactory by providing the release layer between the substrate 1 and the transfer layer 10.

Examples of the components of the release layer 2 include waxes, silicone wax, silicone resins, silicone-modified resins, fluorine resins, fluorine-modified resins, polyvinyl alcohol, acryl resins, thermally crosslinkable epoxy-amino resins, thermally crosslinkable alkyd-amino resins, and polyesters. The release layer may be made from one resin or may be made from two or more resins. The release layer may be formed by using a crosslinking agent such as an isocyanate compound and a catalyst such as a tin-based catalyst and an aluminum-based catalyst, in addition to the resin having releasability.

Note that the thermal transfer sheet 100 of the first embodiment of the present disclosure satisfies the above condition 2 and accordingly, the stable-state peeling-off force of the transfer layer 10 tends to decrease. Thus, in the case where the release layer 2 is provided between the substrate 1 and the transfer layer 10, the release layer 2 preferably contains polyester. According to the thermal transfer sheet including the release layer 2 containing polyester of the first embodiment of the present disclosure, it is possible to make the stable-state peeling-off force when the transfer layer is transferred satisfactory. Thereby, it is possible to make the foil cutting property of the transfer layer more satisfactory to thereby inhibit occurrence of tailing more effectively. The content of the polyester is preferably 0.5% by mass or more and 5% by mass or less based on the total mass of the release layer 2.

The thickness of the release layer is generally 0.2 μm or more and 5 μm or less. As the method for forming the release layer, the release layer can be formed by dispersing or dissolving the above components into a suitable solvent to prepare a coating liquid for release layer, applying this coating liquid onto the substrate 1 or an optional layer provided on the substrate 1, followed by drying.

Then, devices for allowing the transfer layer 10 to include the protective layer 3 containing a cured product of the active ray-curable resin and to satisfy the above condition 2 will be described with reference to one example. Note that the thermal transfer sheet 100 of the first embodiment of the present disclosure is not limited to ones produced by devices exemplified below and is only required to satisfy the above conditions 1 and 2.

(First Device)

A first device is a device that causes the protective layer 3 to contain a filler having a predetermined volume average particle size. A specific example includes a device that causes the protective layer 3 to contain a filler having a volume average particle size of 0.1 μm or more.

(Second Device)

A second device is a device that adjusts the peak illuminance and accumulated exposure of an active ray when a cured product of the active ray-curable resin is obtained, in other words, when a coating liquid for protective layer containing the active ray-curable resin is applied and dried, and this coating film is irradiated with an active ray to obtain a cured product of the active ray-curable resin. Specific examples include (i) a device that provides a protective layer by irradiating an active ray-curable resin with an active ray under conditions of a peak illuminance of 1000 mW/cm$^2$ or less and an accumulated exposure of 400 mJ/cm$^2$ or less, and (ii) a device that provides a protective layer by irradiating an active ray-curable resin with an active ray twice or more, wherein the first active ray irradiation is conducted under conditions of a peak illuminance of 1000 mW/cm$^2$ or less, and an accumulated exposure of 200 mJ/cm$^2$ or less, and the second and later active ray irradiations are conducted under conditions of a peak illuminance of more than 1000 mW/cm$^2$ and an accumulated exposure of 200 mJ/cm$^2$ or less, such that the total of the accumulated exposure of the irradiations adds up to 400 mJ/cm$^2$. Alternatively, the second device can be combined with the above first device to satisfy the above second condition.

(Third Device)

A third device is a device that provides a release layer between the substrate 1 and the transfer layer 10. Examples of the third device include a device that causes the release layer to contain a silicone resin and a device that causes the release layer to contain a filler. The third device is one example of an auxiliary device for satisfying the above condition 2. The third device is preferably conducted in combination with the above first device or second device.

The silicone resin referred to herein means a compound having a siloxane bond in the molecular structure, and the concept thereof includes any of unmodified silicone resins, modified silicone resins, and silicone-modified resins. A silicone-modified resin can be prepared by copolymerization of a polysiloxane group-containing vinyl monomer with a vinyl monomer of another type, reaction of a thermoplastic resin with a reactive silicone resin, or the like.

Examples of the silicone-modified resin can include silicone-modified resins prepared by a method of block copolymerizing a thermoplastic resin with a polysiloxane group-containing vinyl monomer, by a method of graft copolymerizing a thermoplastic resin with a polysiloxane group-containing vinyl monomer, or by a method of allowing a thermoplastic resin react with a reactive silicone resin. Examples of the thermoplastic resin constituting the silicone-modified resin can include acryl resins, polyurethane, polyester, epoxy resins, polyvinyl acetals, polycarbonate, and polyimides.

The reactive silicone resin is a compound that has a polysiloxane structure as the main chain and also has a reactive functional group(s) that react(s) with a functional group of the thermoplastic resin at one end or both ends. Examples of the above reactive functional group can include an amino group, a hydroxyl group, an epoxy group, a vinyl group, and a carboxyl group.

Alternatively, the first device to the third device may be appropriately combined.

Thermal Transfer Sheet of Second Embodiment

Figure 1B:
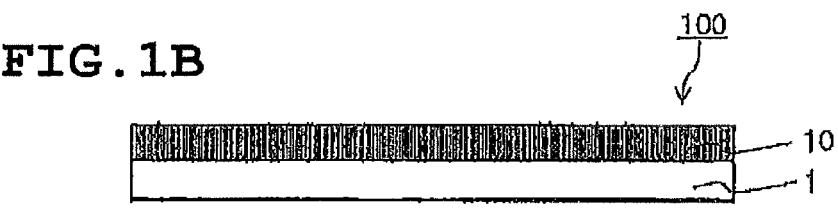

As shown in FIG. 1, FIG. 2, and FIG. 3, a thermal transfer sheet according to a second embodiment of the present disclosure (hereinafter referred to as the thermal transfer sheet of the second embodiment of the present disclosure) has a substrate 1 and a transfer layer 10 provided peelably from the substrate 1. The transfer layer 10 may have a single-layer structure or may have a layered structure in which two or more layers are layered. Note that FIG. 1, FIG. 2, and FIG. 3 are schematic sectional views illustrating one example of the thermal transfer sheet of the second embodiment of the present disclosure, and a thermal transfer sheet 100 of an aspect illustrated in FIG. 1B has a configuration in which the transfer layer 10 is provided on the substrate 1. The thermal transfer sheet 100 of an aspect illustrated in FIG. 2B has a configuration in which a release layer 2 is provided on the substrate 1 and the transfer layer 10 is provided on the release layer 2.

The thermal transfer sheet 100 of the second embodiment of the present disclosure having the configuration described above satisfies the following conditions 3 and 4.

(Condition 3): The initial breakage peeling-off force when the transfer layer 10 is peeled under conditions of a peeling-off temperature of 20° C. or more and 40° C. or less and a peeling-off angle of 90° is 5 mN/m or less.

(Condition 4): The scratch hardness (a sapphire needle having a tip radius of 0.1 mm is used) when the face located on the side of the substrate 1 of the transfer layer 10 is measured by a method in compliance with JIS-K-5600-5-5 is 200 g or more.

According to the thermal transfer sheet 100 of the second embodiment of the present disclosure satisfying the above condition 3, it is possible to inhibit head untransfer when the transfer layer 10 is peeled. The relationship between the head untransfer and the initial breakage peeling-off force is as mentioned above.

Figure 4:
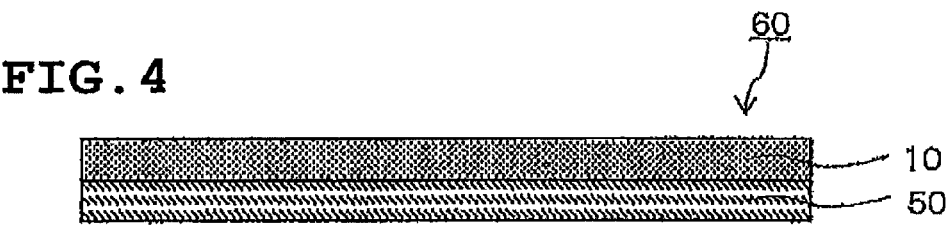
FIG. 4 is a schematic sectional view illustrating one example of a print obtained using the thermal transfer sheet according to the embodiment of the present disclosure.

Additionally, according to the thermal transfer sheet 100 of the second embodiment of the present disclosure satisfying the above condition 4, it is possible to impart sufficient durability to the transfer layer 10. Accordingly, it is possible to impart high durability to a print 60 obtained by transferring the transfer layer 10 onto a transfer receiving article (see FIG. 4). Note that the face located on the side of the substrate 1 of the transfer layer 10 will be the outermost surface when the transfer layer 10 is transferred onto the transfer receiving article 50.

According to the thermal transfer sheet 100 of the second embodiment of the present disclosure satisfying the above conditions 3 and 4, it is possible to transfer the transfer layer 10 having excellent durability, in a state where occurrence of head untransfer is inhibited, onto the transfer receiving article 50.

That is, in the thermal transfer sheet 100 of the second embodiment of the present disclosure, which has a configuration that satisfies the conditions 3 and 4, a combination of improvement of durability of the transfer layer and inhibition of head untransfer when the transfer layer is transferred is achieved.

Note that this also applies to a transfer layer 10 in which the transfer layer 10 satisfying the above condition 4 is replaced by a transfer layer 10 having the single-layer structure consisting of the protective layer 3 (see FIG. 1A) or the layered structure having the protective layer 3 (see FIGS. 3A and 3B) and the protective layer 3 is caused to contain a cured product of an active ray-curable resin. Hereinbelow, each constituent of the thermal transfer sheet 100 of the second embodiment of the present disclosure will be concretely described, with emphasis on differences from each constituent of the thermal transfer sheet 100 of the first embodiment.

(Substrate)

The substrate 1 has the transfer layer 10 constituting the thermal transfer sheet 100 of the second embodiment of the present disclosure or an optional layer (e.g., a release layer 2) provided between the substrate 1 and the transfer layer 10. There is no limitation with respect to the substrate, and the substrate described in the thermal transfer sheet 100 of the first embodiment described above can be appropriately selected and used.

Hereinbelow, the transfer layer 10 provided on the substrate 1 will be described with reference to the transfer layer of a first aspect and the transfer layer of a second aspect as examples. Hereinbelow, the reference to the transfer layer may include both the transfer layer of the first aspect and the transfer layer of the second aspect.

(Transfer Layer of First Aspect)

A transfer layer 10 of the first aspect has a scratch hardness (a sapphire needle having a tip radius of 0.1 mm is used) of 200 g or more when the face located on the side of the substrate 1 of the transfer layer 10 is measured by a method in compliance with JIS-K-5600-5-5. That is, the transfer layer 10 of the first aspect satisfies the above condition 4. A preferable transfer layer 10 of the first aspect has a scratch hardness of 250 g or more of the face located on the side of the substrate 1 of the transfer layer 10.

The transfer layer 10 of the first aspect may have a single-layer structure or may have a layered structure. In the case where the transfer layer 10 of the first aspect has a layered structure, among the layers constituting the transfer layer 10, the layer of which surface has a scratch hardness of 200 g or more is located nearest from the side of the substrate 1. Hereinbelow, the reference to a base layer means the layer located nearest from the side of the substrate 1 among the layers constituting the transfer layer 10. Note that, in the case where the transfer layer 10 of the first aspect has a single-layer structure, the transfer layer 10 itself will be the base layer.

In the transfer layer 10 of the first aspect as one example, the base layer contains a cured product of various curable resins. According to the transfer layer 10 of the first aspect in which the base layer contains a cured product of various curable resins, it is possible to adjust the scratch hardness of the face located on the side of the substrate 1 of the transfer layer 10 to 200 g or more by appropriately setting the content of the cured product of these various curable resins and the thickness of the base layer. Examples of the cured product of various curable resins can include cured products of a thermoplastic resin and cured products of an active ray-curable resin. The base layer may contain one of the cured products of these or may contain two or more cured products of these.

Examples of the thermoplastic resin forming cured products of the thermoplastic resin can include polyesters, polyacrylic acid esters, polyvinyl acetate, acryl-styrene copolymers, polyurethane, polyolefins such as polyethylene and polypropylene, polystyrene, polyvinyl chloride, polyethers, polyamides, polyimides, polyamideimides, polycarbonate, polyacrylamide, polyvinyl chloride, polyvinyl acetals such as polyvinyl butyral and polyvinyl acetoacetal, and silicone-modified forms of these. The transfer layer 10 of the first aspect may contain one cured product of the thermoplastic resin or may contains two or more cured products of the thermoplastic resin.

Examples of the curing agent for providing cured products of the thermoplastic resin described above can include isocyanate-type curing agents.

The cured products of the active ray-curable resin will be described in the transfer layer of the second aspect.

(Transfer Layer of Second Aspect)

The transfer layer 10 of the second aspect has a single-layer structure consisting of the protective layer 3 (see FIG. 1B) or a layered structure including the protective layer 3

(see FIG. 3A and FIG. 3B). The transfer layer 10 of the second aspect is not limited to the aspect shown and may have a configuration in which a release layer is provided between the substrate 1 and the transfer layer 10.

The protective layer 3 constituting the transfer layer 10 of the second aspect contains a cured product of an active ray-curable resin. In other words, the protective layer 3 contains a resin obtained by irradiating an active ray-curable resin with an active ray. According to the transfer layer 10 of the second aspect containing a cured product of an active ray-curable resin, it is possible to impart durability to a print obtained by transferring the transfer layer 10.

The transfer layer 10 of the second aspect further may satisfy the above condition 4. That is, the transfer layer 10 of the second aspect may have a configuration appropriately combined with the transfer layer 10 of the first aspect.

The active ray-curable resin can be appropriately selected from those described in the thermal transfer sheet of the first embodiment of the present disclosure, and thus, a detailed description is omitted here.

There is not particular limitation with respect to the content of the cured product of an active ray-curable resin based on the total mass of the protective layer 3 constituting the transfer layer 10 of the second aspect, but the content is preferably 30% by mass or more, more preferably 50% by mass or more. The protective layer 3 also preferably contains a cured product of a urethane (meth)acrylate, particularly, a cured product of a polyfunctional urethane (meth)acrylate in the above content, as the cured product of the active ray-curable resin. There is no particular limitation with respect to the upper limit value, but the value can be appropriately set depending on components to be optionally added and the like. One example thereof is 100% by mass.

The protective layer 3 constituting the transfer layer 10 of the second aspect may contain other components in addition to the cured product of an active ray-curable resin. Examples of the other components can include a filler. It is possible to improve the foil cutting property of the transfer layer 10 by causing the protective layer 3 to contain a filler.

There is no limitation with respect to the filler, and the filler is only required to be appropriately selected for use from the first filler and the second filler described in the thermal transfer sheet of the first embodiment of the present disclosure.

The protective layer 3 constituting the transfer layer 10 of the second aspect preferably contains a filler having a volume average particle size of 1 nm or more and 1 µm or less, more preferably contains a filler having a volume average particle size of 1 nm or more and 50 nm or less, even more preferably contains a filler having a volume average particle size of 7 nm or more and 25 nm or less. It is possible to further improve the transferability by causing the protective layer 3 constituting the transfer layer 10 of the second aspect to contain a filler having a volume average particle size within the range described above.

The content of the above filler based on the total mass of the protective layer 3 constituting the transfer layer 10 of the second aspect is preferably 10% by mass or more and 60% by mass or less, more preferably 10% by mass or more and 50% by mass or less, even more preferably 20% by mass or more and 40% by mass or less.

There is not particular limitation with respect to the thickness of the protective layer 3 constituting the transfer layer 10 of the second aspect, and the thickness is preferably 1 µm or more and 15 µm or less, preferably 2 µm or more and 6 µm or less. It is possible to further improve the foil cutting property by setting the thickness of the protective layer 3 constituting the transfer layer 10 of the second aspect within this range. It is also possible to inhibit occurrence of defective transfer such as picking and chipping during transfer of the transfer layer 10.

There is no limitation with respect to the method for forming the protective layer 3 constituting the transfer layer 10 of the second aspect, and the protective layer 3 can be formed using the method for forming the protective layer described in the thermal transfer sheet of the first embodiment of the present disclosure or the like.

(Adhesive Layer)

In the layered structure, the adhesive layer 5 also may be provided on the protective layer 3 (see FIG. 3A and FIG. 3B). According to the thermal transfer sheet 100 of this aspect, it is possible to make adhesion between the transfer layer 10 and the transfer receiving article 50 of the second aspect satisfactory when the transfer layer 10 is transferred onto the transfer receiving article 50, due to the presence of the adhesive layer 5.

The adhesive layer can be appropriately selected for use from the adhesive layer described in the thermal transfer sheet of the first embodiment of the present disclosure.

(Initial Breakage Peeling-Off Force of Transfer Layer)

The thermal transfer sheet 100 of the second embodiment of the present disclosure has an initial breakage peeling-off force of 5 mN/m or less when the transfer layer 10 is peeled from the side of the substrate 1 under conditions of a peeling-off temperature of 20° C. or more and 40° C. or less and a peeling-off angle of 90°. That is, the thermal transfer sheet 100 satisfies the above condition 3. According to the thermal transfer sheet of the second embodiment of the present disclosure, it is possible to transfer the transfer layer 10 of the first aspect and the second aspect onto the transfer receiving article 50 without causing head untransfer to occur or with head untransfer inhibited.

(Method for Calculating Initial Breakage Peeling-Off Force 2)

The initial breakage peeling-off force in the thermal transfer sheet of the second embodiment of the present disclosure means a peeling-off force to be calculated by the following method.

Figure 7:
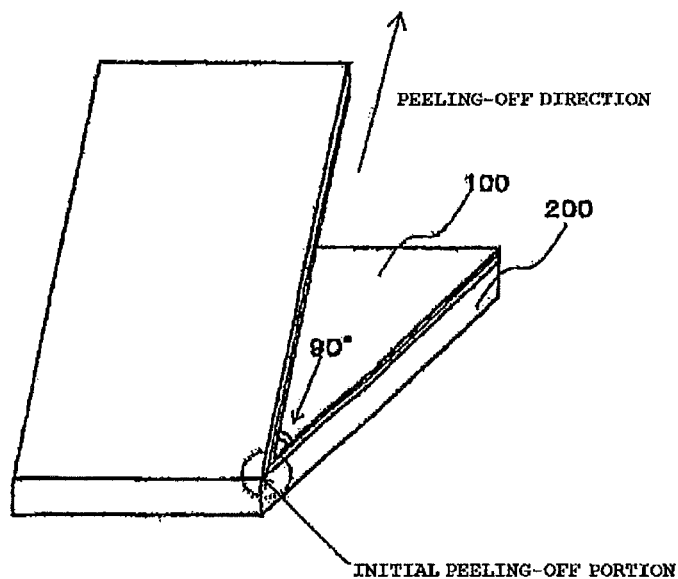
FIG. 7 is a schematic views illustrating one example of a method for measuring the stable-state peeling-off force and the initial breakage peeling-off force.

The thermal transfer sheet 100 including the substrate 1 and the transfer layer 10 provided on the substrate 1 is cut into a predetermined width (hereinafter referred to as the width A). Note that the width of the transfer layer 10 at this time is also the width A. Then, as shown in FIG. 7, the cut thermal transfer sheet 100 is bonded onto a hot stage 200 of which temperature is adjusted to 20° C. using transparent double-sided tape (NICETACK® NW-15, Nichiban Co., Ltd.) such that the surface of the hot stage 200 is opposed to the surface of the transfer layer 10. Then, the transfer layer 10 of the thermal transfer sheet bonded is peeled from the side of the substrate 1 of the thermal transfer sheet 100 under conditions of a peeling-off angle of 90° and a peel rate of 5 mm/sec., and the peeling-off force in the range from the initial peeling-off portion (see FIG. 5 and FIG. 7) to a point 5 mm (5 mm exclusive) distant in the peel-off direction is measured with a peeling-off force measurement device (Digital Force Gauge DPX-5, IMADA CO., LTD.). Then, the initial breakage peeling-off force at a peeling-off temperature of 20° C. can be calculated by dividing the peeling-off force having the maximum value among the peeling-off forces measured (maximum peeling-off force in the measurement range) by the length of the thermal transfer sheet in the width direction (width A). The initial breakage peeling-off force is calculated at peeling-off temperatures other than this in the same manner. The peeling-off force having the maximum value within the range of the peeling-off temperatures is taken as the initial breakage peeling-off force of the transfer layer 10 in the range of the peeling-off temperature of 20° C. or more and 40° C. or less. Note that the numerical value of the initial breakage peeling-off force measured as described above, which is calculated in the unit of g/cm, the unit of the numerical value to be calculated is converted to mN/m.

There is no particular limitation with respect to a device bringing the initial breakage peeling-off force of the transfer layer 10 within the range described above, and for example, a release layer may be provided between the substrate 1 and the transfer layer 10 so as to satisfy the above condition 3. Note that, in the case where the above condition 3 is satisfied without providing the release layer 2, providing a release layer is not required. Alternatively, as shown in FIG. 3B, the peel layer may be provided nearest from the substrate 1 among the layers constituting the transfer layer 10 so as to satisfy the above condition 3.

(Release Layer)

In the thermal transfer sheet 100 of the second embodiment of the present disclosure as one example for satisfying the above condition 3, the release layer 2, which directly contacts the transfer layer 10, is provided between the substrate 1 and the transfer layer 10, as shown in FIG. 2, and this release layer contains a silicone resin. According to the release layer 2 containing a silicone resin, it is possible to make adjustments satisfying the above condition 3 by appropriately setting the type, content, and the like of the silicone resin.

The silicone resin referred to herein means a compound having a siloxane bond in the molecular structure, and the concept thereof includes any of unmodified silicone resins, modified silicone resins, and silicone-modified resins. A silicone-modified resin can be prepared by copolymerization of a polysiloxane group-containing vinyl monomer with a vinyl monomer of another type, reaction of a thermoplastic resin with a reactive silicone resin, or the like.

Examples of the silicone-modified resin can include silicone-modified resins prepared by a method of block copolymerizing a thermoplastic resin with a polysiloxane group-containing vinyl monomer, by a method of graft copolymerizing a thermoplastic resin with a polysiloxane group-containing vinyl monomer, or by a method of reacting a thermoplastic resin with a reactive silicone resin. Examples of thermoplastic resin constituting the silicone-modified resin can include acryl resins, polyurethane, polyesters, epoxy resins, polyvinyl acetals, polycarbonate, and polyimides. Among these, a silicone-modified acryl resin can be suitably used.

The reactive silicone resin is a compound that has a polysiloxane structure as the main chain and also has a reactive functional group(s) that react(s) with a functional group of the thermoplastic resin at one end or both ends. Examples of the above reactive functional group can include an amino group, a hydroxyl group, an epoxy group, a vinyl group, and a carboxyl group.

As the silicone resin, a silsesquioxane can be suitably used. The release layer 2 of a preferable aspect contains a reaction product of a resin having a carboxyl group and a silsesquioxane having a functional group that can react with the carboxyl group. According to the release layer 2 of the preferable aspect, it is possible to impart solvent resistance to the release layer 2. The release layer 2 containing a silsesquioxane will be mentioned below.

Alternatively, the release layer 2 may contain a reaction product of a silsesquioxane having one functional group as the silsesquioxane and a resin having one different functional group that can react with the one functional group.

In addition to or instead of the above silicone resin, a peeling-off force adjusting agent may be used to adjust the initial breakage peeling-off force of the transfer layer to 5 mN/m or less.

Examples of the peeling-off force adjusting agent can include hydroxyl group-containing resins having a hydroxyl value of 3 mgKOH/g or more and 100 mgKOH/g or less, thermoplastic acryl resins, thermoplastic elastomers, rosin ester resins, polyesters, and thermoplastic resins having a glass transition temperature (Tg) of 30° C. or more and 130° C. or less.

Examples of the hydroxyl group-containing resin can include acryl resins containing a hydroxyl group, rosin resins containing a hydroxyl group, polyesters containing a hydroxyl group, polyvinyl acetals, polyvinyl alcohol, polyester polyols, polyether polyols, and urethane polyols.

As the hydroxyl group-containing resin described above, hydroxyl group-containing resins having a hydroxyl value of 3 mgKOH/g or more and 100 mgKOH/g or less are preferable. Hydroxyl group-containing resins having a glass transition temperature (Tg) of 30° C. or more and 130° C. or less are also preferable.

The hydroxyl value referred to herein means a value measured by a hydroxyl value method in compliance with JIS-K-0070 (1992). The glass transition temperature (Tg) referred to herein means a temperature determined in compliance with JIS-K-7121 (2012) and based on measurement of the change in the heat quantity by DSC (differential scanning calorimetry) (DSC method).

The release layer 2, as an example, contains 3% by mass or more and 45% by mass or less of the peeling-off force adjusting agent based on the total mass of the release layer 2.

The release layer 2 as an example to satisfy the above condition 3 contains a filler. According to the release layer 2 containing a filler, it is possible to adjust the initial breakage peeling-off force when the transfer layer 10 is transferred by appropriately setting the content of the filler.

More specifically, the higher the content of the filler contained in the release layer 2, the smaller tends to be the value of the initial breakage peeling-off force. Accordingly, it is possible to adjust the initial breakage peeling-off force when the transfer layer 10 is transferred so as to satisfy the above condition 3 by appropriately setting the content of the filler based on the total mass of the release layer 2. With attention focused on the volume average particle size of the filler, in the case where the content of the filler is supposed to be constant, the smaller the volume average particle size of the filler contained in the release layer 2, the larger the number of filler particles per unit area of the release layer 2. Then, as the number of filler particles per unit area of the release layer 2 increases, the gloss feel of a print obtained by transferring the transfer layer 10 in a direct contact with the release layer 2 onto a transfer receiving article tends to decrease. Accordingly, in order to improve the gloss feel to be imparted to the print, it is only required to provide the release layer 2 of which the volume average particle size of the filler is taken into consideration in addition to the content of the filler.

The release layer 2, as an example, contains 0.5% by mass or more and 1.5% by mass or less of a filler having a volume average particle size of 2 μm or more and 5 μm or less based on the total mass of the release layer 2. According to the release layer 2 of this aspect, it is possible to adjust the initial breakage peeling-off force when the transfer layer is transferred so as to satisfy the above condition 3, while inhibiting decrease in the gloss feel to be imparted to a print to be obtained by transferring the transfer layer onto a transfer receiving article. It is also possible to set the stable-state peeling-off force mentioned below within a preferable range. The filler can be appropriately selected for use from the fillers described in the protective layer 3 mentioned above.

Additionally, it is possible to adjust the initial breakage peeling-off force so as to satisfy the above condition 3 while inhibiting decrease in the gloss feel of a print to be obtained by transferring the transfer layer 10 onto the transfer receiving article 50, by setting the surface roughness (SRa) of the face located on the side of the transfer layer 10 of the release layer 2 to 0.05 µm or more and 0.08 µm or less, instead of or in addition to allowing the release layer 2 to contain the filler described above. It is also possible to set the stable-state peeling-off force mentioned below within a preferable range. As the measurement apparatus for the surface roughness (SRa), a three-dimensional surface roughness shape measuring apparatus (SURFCOM® 1400, TOKYO SEIMITSU CO., LTD.) was used.

There is not particular limitation with respect to the thickness of the release layer 2, and the thickness is preferably 0.3 µm or more and 2 µm or less, more preferably 0.5 µm or more and 1 µm or less.

Additionally, the glossiness (measurement angle: 20°) when the surface of the transfer layer 10 after transferred onto the transfer receiving article 50 is measured by a method in compliance with JIS-Z-8741 is preferably 55% or more. As the measurement apparatus for glossiness, a glossiness meter (VG2000, Nippon Denshoku Industries Co. Ltd.) was used.

The thermal transfer sheet 100 of the second embodiment of the present disclosure satisfies the above condition 4, and the stable-state peeling-off force when the transfer layer is peeled under conditions of a peeling-off temperature of 20° C. or more and 40° C. or less and a peeling-off angle of 90° is preferably 0.19 mN/m or more and 4 mN/m or less, more preferably 0.19 mN/m or more and 1 mN/m or less. According to the thermal transfer sheet 100 of this aspect, it is possible to transfer the transfer layer 10 onto a transfer receiving article with a further satisfactory foil cutting property while inhibiting head untransfer.

The stable-state peeling-off force referred to in the thermal transfer sheet of the second embodiment of the present disclosure is a peeling-off force measured in a measurement range from a point 5 mm distant from the initial peeling-off portion in the peel-off direction (see FIGS. 5 and 7) to a point 15 mm distant from the initial peeling-off portion in the peel-off direction, that is, a measurement range from a point 5 mm distant from the initial peeling-off portion in the peel-off direction as the start point to a point 10 mm distant from this start point in the peel-off direction (peeling-off length: 10 mm) in the above Method for calculating an initial breakage peeling-off force 2, and means a value obtained by dividing the peeling-off force having the maximum value among the peeling-off forces measured (maximum peeling-off force in the measurement range) by the length of the thermal transfer sheet in the width direction (width A). In other words, in the above method for calculating an initial breakage peeling-off force 2, the phrase "the peeling-off force in the range from the initial peeling-off portion to a point 5 mm (5 mm exclusive) distant from the initial peeling-off portion in the peel-off direction" may be replaced by "the peeling-off force in a range from a point 5 mm distant from the initial peeling-off portion in the peel-off direction to a point 15 mm distant from the initial peeling-off portion in the peel-off direction".

There is not particular limitation with respect to a device for bringing the stable-state peeling-off force into the above preferable range. It is possible to adjust the stable-state peeling-off force within the above preferable range by using the release layer 2 of the preferable aspect explained above.

<<Coating Liquid for Release Layer>>

Figure 8:
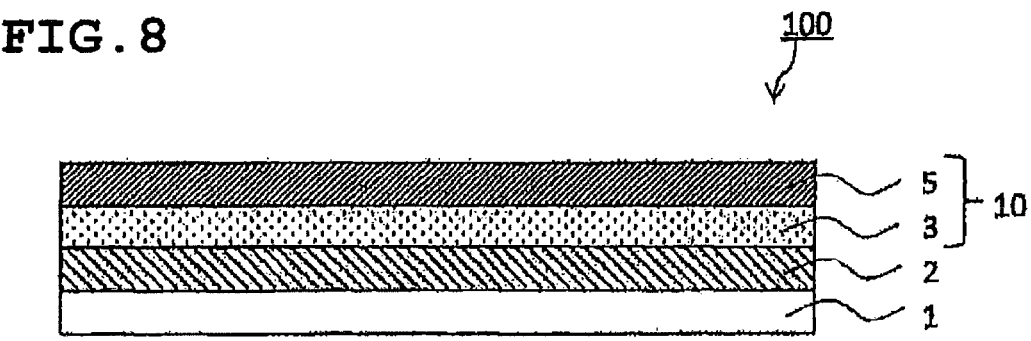
FIG. 8 is a sectional schematic view illustrating one example of a thermal transfer sheet according to the embodiment of the present disclosure.
Figure 9:
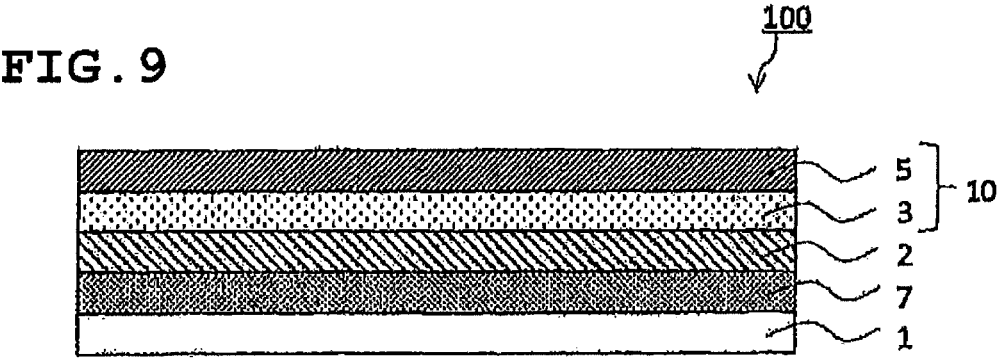
FIG. 9 is a sectional schematic view illustrating one example of the thermal transfer sheet according to the embodiment of the present disclosure.

Subsequently, a coating liquid for release layer according to the embodiment of the present disclosure (hereinafter also referred to as the coating liquid for release layer of the present disclosure in some cases) will be described. Note that the coating liquid for release layer of the present disclosure is a coating liquid for forming the release layer of the thermal transfer sheet. A thermal transfer sheet 100 including a release layer to be formed using the coating liquid for release layer of the present disclosure has a substrate 1, a release layer 2 provided on the substrate 1 (the upper surface of the substrate 1 in the aspect shown), and a transfer layer 10 provided on the release layer 2, as shown in FIG. 8 and FIG. 9. The transfer layer 10 of the aspect shown in FIG. 8 and FIG. 9 has a layered structure in which a protective layer 3 and an adhesive layer 5 are layered in this order from the side of the substrate 1 (on the side of the release layer 2), but the transfer layer 10 may has a single-layer structure as shown in FIGS. 2A and 2B.

The thermal transfer sheet 100 including the release layer to be formed using the coating liquid for release layer of the present disclosure is a thermal transfer sheet to be used for transferring the transfer layer 10 onto an optional object (hereinafter referred to as a transfer receiving article).

The coating liquid for release layer of the present disclosure for forming the release layer of the thermal transfer sheet contains a silsesquioxane. According to the coating liquid for release layer of the present disclosure containing a silsesquioxane, it is possible to stably form the release layer 2 having a small variation in the performance difference using the coating liquid. In other words, it is possible to inhibit occurrence of a variation in the releasability of the release layer to be formed. Specifically, it is possible to stably form the release layer 2 having a small variation in the performance difference without depending on the external environment when the release layer 2 is formed by applying the coating liquid for release layer onto the substrate. More specifically, when the release layer 2 is formed by applying the coating liquid for release layer onto the substrate 1 followed by drying, it is possible to inhibit occurrence of a variation in the releasability to be imparted to the release layer to be formed due to the influence of the moisture contained in the atmosphere. Thereby, it is possible to stably form the release layer 2 having a small variation in the performance difference. This acting effect is presumed to be caused by the skeletal structure of the silsesquioxane. Note that, in the case where a coating liquid that does not satisfy the requirement for the coating liquid for release layer of the present disclosure is used as the coating liquid for release layer, a variation tends to occur in the releasability of the release layer to be formed due to the influence of the moisture in the atmosphere, in comparison with the case where the release layer is formed using the coating liquid for release layer of the present disclosure. It is also possible to form a release layer having satisfactory solvent resistance using the coating liquid for release layer of the present disclosure (except for the case where the coating liquid for release layer is caused to contain a silsesquioxane and a resin having a carboxyl group having an acid value of 10 mgKOH/g or more mentioned below).

The silsesquioxane referred to herein means a siloxane compound of which main chain skeleton is a siloxane-type compound composed of a Si—O bond (the following formula 1) and which has 1.5 oxygen atoms in the unit composition. Note that the silsesquioxane also includes ones in which a different functional group is introduced to the organic group R in the following formula 1:

(RSiO$_{1.5}$)$_n$  (Formula 1)

wherein R is an organic group.

Examples of the skeletal structure of the silsesquioxane can include various skeletal structure such as a random-type structure, a cage-type structure, and a ladder-type structure, and any of the skeletal structures can be used. Among these, silsesquioxanes of the random-type or cage-type skeletal structure are preferable, and silsesquioxanes of the random-type are particularly preferable.

There is not particular limitation with respect to the mass of the silsesquioxane, and the content of the silsesquioxane is preferably 80% by mass or more and 100% by mass or less, more preferably 85% by mass or more and 95% by mass or less, based on the total mass of the coating liquid for release layer of the present disclosure (with the proviso that the mass of the solvent is excluded). Note that the content of the silsesquioxane is not limited thereto, in the case where the coating liquid for release layer of the present disclosure contains a silsesquioxane and additionally another resin that can react with the silsesquioxane.

The coating liquid for release layer of the present disclosure may contain a silsesquioxane singly or may contain two or more silsesquioxanes.

The coating liquid for release layer of the present disclosure may contain a silsesquioxane having one functional group and a resin having one different functional group that can react with the one functional group. According to the coating liquid of this aspect, it is possible to form the release layer 2 containing a reaction product of a silsesquioxane having one functional group and a resin having one different functional group that can react with the one functional group. Thus, according to the coating liquid of this aspect, it is possible to form the release layer 2 having releasability as well as an additional function due to the acting effect of the resin having one different functional group by using the coating liquid.

A preferable coating liquid for release layer of the present disclosure contains a resin having a carboxyl group, as the resin having one different functional group. In this case, it is only required to use a silsesquioxane having a functional group that can react with the resin having a carboxyl group, as the silsesquioxane. Accordingly, the release layer 2 of a preferable aspect contains a reaction product of a resin having a carboxyl group and a silsesquioxane.

According to the coating liquid for release layer of the present disclosure containing a resin having a carboxyl group and a silsesquioxane having a functional group that can react with the carboxyl group, it is possible to impart higher releasability to a release layer to be formed using the coating liquid.

Examples of the silsesquioxane having a functional group that can react with a resin having a carboxyl group can include silsesquioxanes having an epoxy group. Besides these, silsesquioxanes having a hydroxyl group, an amino group, or a mercapto group, for example, can be used.

Examples of the resin having a carboxyl group can include acrylic polymers. Examples of the acrylic polymer can include polymers of (meth)acrylic acid or derivatives thereof, polymers of (meth)acrylic acid ester or derivatives thereof, copolymers of (meth)acrylic acid and another monomer or derivatives thereof, and copolymers of (meth)acrylic acid ester and another monomer or derivatives thereof. Besides these, examples of the resin having a carboxyl group can include polyesters, polyurethanes, silicone resins, and rosin resin having a carboxyl group.

A coating liquid of a more preferable aspect contains a resin having an acid value of 10 mgKOH/g or more as the above resin having a carboxyl group. According to the coating liquid of this aspect, it is possible to impart higher releasability and additionally high solvent resistance to a release layer to be formed using the coating liquid. Accordingly, it is possible to inhibit the release layer to be formed using the coating liquid from being damaged by an organic solvent. Specifically, even in the case where a coating liquid for transfer layer containing an organic solvent is applied onto a release layer to be formed using a coating liquid for release layer of the present disclosure in order to form a thermal transfer sheet, it is possible to inhibit the release layer to be formed using a coating liquid for release layer of the present disclosure from being damaged by an organic solvent by imparting solvent resistance to the release layer. Accordingly, the release layer 2 of the preferable aspect contains a reaction product of a resin having a carboxyl group having an acid value of 10 mgKOH/g and a silsesquioxane. Note that the acid value referred to herein means the number of milligrams of potassium hydroxide necessary for neutralizing the acid component (e.g., carboxyl group) contained in 1 g of a polymer and can be measured by a method in compliance with JIS-K-2501 (2003). There is not particular limitation with respect to the upper limit of a preferable acid value, and one example thereof is 200 mgKOH/g.

In the case where the coating liquid for release layer of the present disclosure is a coating liquid containing a silsesquioxane having an epoxy group and a resin having a carboxyl group, the mass of the silsesquioxane having an epoxy group as an example is 10% by mass or more and 95% by mass or less, and the mass of the resin having a carboxyl group is 5% by mass or more and 90% by mass or less based on the total mass of the coating liquid (with the proviso that the mass of the solvent is excluded). In this case, based on the total mass of the reaction product of a resin having a carboxyl group and a silsesquioxane, the mass of the component derived from the silsesquioxane is 10% by mass or more and 95% by mass or less, and the mass of the component derived from the resin having a carboxyl group is 5% by mass or more and 90% by mass or less. As another example, the mass of the silsesquioxane having an epoxy group is 10% by mass or more and 40% by mass or less, and the mass of the resin having a carboxyl group is 60% by mass or more and 90% by mass or less. In the case where the coating liquid for release layer of the present disclosure contains a reaction catalyst to be mentioned below, the total mass of the silsesquioxane having an epoxy group and the resin having a carboxyl group is 80% by mass or more and 96% by mass or less, preferably 85% by mass or more and 91% by mass or less, based on the total mass of the coating liquid as an example (with the proviso that the mass of the solvent is excluded).

The coating liquid for release layer of the present disclosure preferably contains a reaction catalyst. There is no particular limitation with respect to the reaction catalyst, and the reaction catalyst is only required to be determined in accordance with the functional group possessed by the silsesquioxane contained in the coating liquid for release layer of the present disclosure or the functional group of the resin that reacts with the silsesquioxane, contained as required. For example, in the case where the coating liquid for release layer of the present disclosure is a coating liquid containing a silsesquioxane having an epoxy group and a resin having a carboxyl group, the coating liquid for release layer of the present disclosure contains, as the reaction catalyst, more preferably an organic metal compound (including a chelate (complex) of the organic metal compound), contains more preferably an organic zirconium chelator.

There is not particular limitation with respect to the content of the reaction catalyst, and the content is preferably 4% by mass or more and 20% by mass or less, more preferably 9% by mass or more and 15% by mass or less, based on the total mass of the coating liquid for release layer of the present disclosure (with the proviso that the mass of the solvent is excluded).

The coating liquid for release layer of the present disclosure also contains a solvent for dissolving or dispersing the silsesquioxane. There is not particular limitation with respect to the solvent, and the example thereof can include organic solvents such as methyl ethyl ketone, toluene, xylene, methyl isobutyl ketone, ethyl acetate, isopropyl alcohol, and ethanol, and water.

The coating liquid for release layer of the present disclosure may also contain optional components, in addition to a silsesquioxane, a resin that can react with the silsesquioxane, and a reaction catalyst. Examples of the optional components can include waxes, silicone wax, silicone resins, silicone-modified resins, fluorine resins, fluorine-modified resins, polyvinyl alcohol, acryl resins, rosin resins, polyesters, polyvinyl acetals such as polyvinyl butyral and polyvinyl acetoacetal, polyester polyol, polyether polyol, and urethane polyol (with the proviso that, among these resins, a silsesquioxane and a resin that can react with the silsesquioxane are excluded). The content of these optional components is preferably 10% by mass or less based on the total mass of the coating liquid for release layer of the present disclosure (with the proviso that the mass of the solvent is excluded).

The coating liquid for release layer of the present disclosure can be obtained by dispersing or dissolving a silsesquioxane, and a resin that can react with the silsesquioxane, and a reaction catalyst, which are added as required, and further, optional components into a suitable solvent.

Thermal Transfer Sheet of Third Embodiment

As shown in FIGS. 2A and 2B, FIG. 8, and FIG. 9, a thermal transfer sheet according to a third embodiment of the present disclosure (hereinafter referred to as the thermal transfer sheet of the third embodiment of the present disclosure) has a substrate 1, a release layer 2 provided on the substrate, and a transfer layer 10 provided on the release layer 2. The transfer layer 10 is provided peelably from the release layer 2.
(Release Layer)

In the thermal transfer sheet 100 of the third embodiment of the present disclosure, the release layer 2 contains a silsesquioxane. According to the thermal transfer sheet 100 of the third embodiment of the present disclosure containing this release layer 2, it is possible to impart stable releasability to the release layer 2.

Note that the silsesquioxane contained in the release layer 2 also includes ones in which a different functional group is introduced to the organic group R of the silsesquioxane of the above formula 1.

Figure 12A:
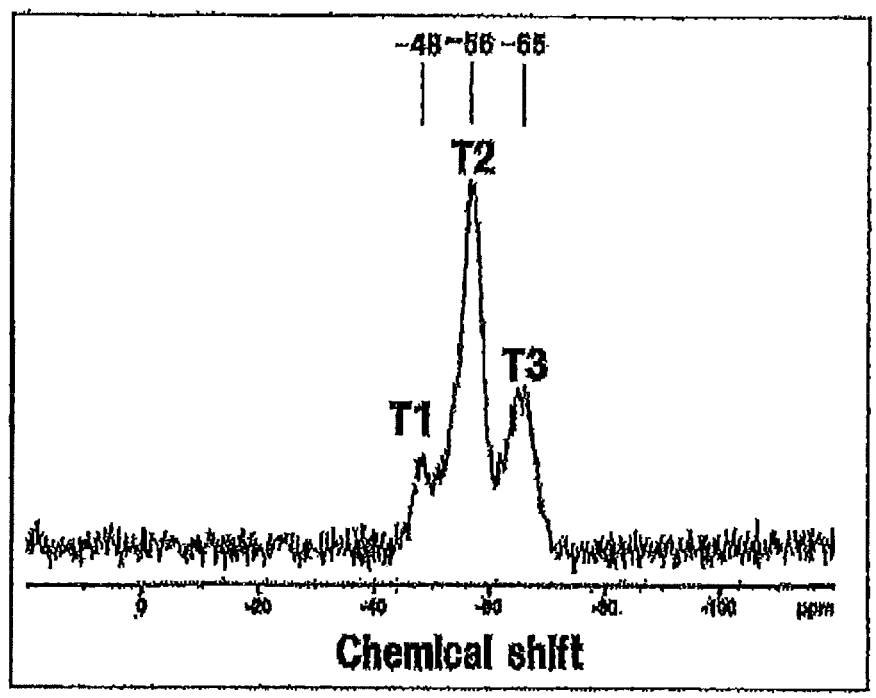
FIGS. 12A and 12B are one example of $^{29}$Si NMR measurement results of a release layer containing silsesquioxane.
Figure 12B:
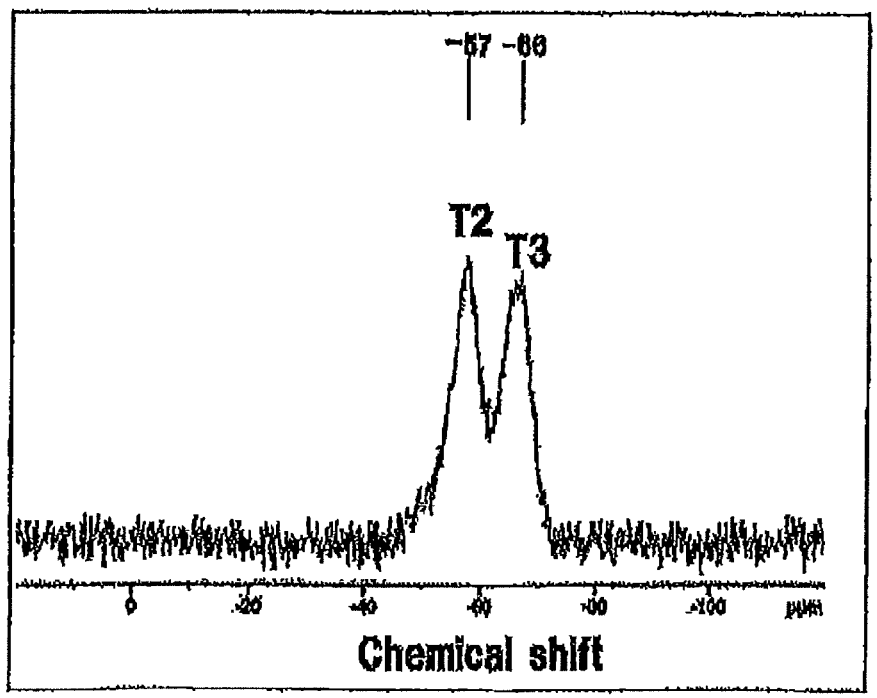

Whether the release layer contains a silsesquioxane or not can be identified by the following method.
Measuring Method:
$^{29}$Si cross polarization (CP)/magic-angle spinning (MAS) NMR
Measurement Conditions:
Apparatus name: BRUKER nuclear magnetic resonance apparatus (NMR) AVANCE III HD
Resonance frequency: 79.51 MHz
Repetition time: 4 sec.
Contact time: 3 msec.
Sample rotation number: 5 kHz Specifically, a sample is prepared by scraping off the release layer of a target thermal transfer sheet. When this sample is measured by the above measuring method under the above measuring conditions, whether the release layer contains a silsesquioxane or not can be identified by whether the peaks of the following T components derived from the silsesquioxane that appear in the chemical shift range of −45 ppm to −70 ppm can be confirmed or not. Peaks derived from silica ($SiO_2$) appear in the chemical shift range of −80 to −110 ppm. In this respect, it is possible to clearly distinguish whether the component contained in the release layer is silica or the silsesquioxane. Note that FIGS. 12A and 12B are one example of measurement results of a release layer containing a silsesquioxane measured by the above measurement method.

[Formula 1]

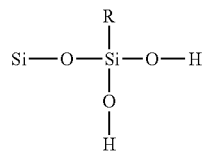

T1

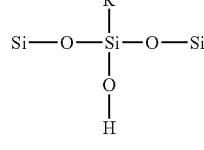

T2

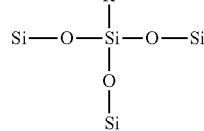

T3

The release layer 2 as an example contains a reaction product of a silsesquioxane having an epoxy group and a resin having a carboxyl group. According to the thermal transfer sheet 100 of this aspect, it is possible to further impart solvent resistance to the release layer 2. The release layer 2 containing such a reaction product can be obtained by applying a coating liquid containing a silsesquioxane having an epoxy group and a resin having a carboxyl group onto the substrate 1, followed by drying. In order to facilitate the reaction, the reaction catalyst described for the coating liquid for release layer of the present disclosure may be used.

Alternatively, the release layer 2 can be also obtained by preparing a reaction product obtained by allowing a silsesquioxane having an epoxy group to react with a resin having a carboxyl group in advance, applying a coating liquid containing this reaction product onto the substrate 1, followed by drying.

In a more preferable thermal transfer sheet 100 of the third embodiment of the present disclosure, the release layer 2 contains a reaction product of a silsesquioxane having an epoxy group and a resin containing a carboxyl group and having an acid value of 10 mgKOH/g or more. According to the thermal transfer sheet 100 comprising the release layer containing this reaction product, it is possible to further improve the solvent resistance to be imparted to the release layer 2.

In the above release layer 2, the content of the reaction product of the silsesquioxane having an epoxy group and the resin having a carboxyl group is preferably 75% by mass or more and 95% by mass or less, more preferably 80% by mass or more and 90% by mass or less, based on the total mass of the release layer 2.

The release layer 2 of the thermal transfer sheet of the third embodiment of the present disclosure can be formed with appropriate selection of the coating liquid for release layer described in the coating liquid for release layer of the present disclosure, and a detailed description is omitted here.

There is not particular limitation with respect to the thickness of the release layer 2, and the thickness is preferably 0.3 µm or more and 2 µm or less, more preferably 0.5 µm or more and 1 µm or less.

The release layer 2 can be obtained by applying the coating liquid for release layer of the present disclosure described above onto the substrate 1, followed by drying.
(Substrate)

The substrate 1 has the release layer 2 and the transfer layer 10 constituting the thermal transfer sheet 100 of the third embodiment of the present disclosure. There is no limitation with respect to the substrate, and the substrate described in the thermal transfer sheet 100 of the first embodiment described above can be appropriately selected and used.
(Transfer Layer)

As shown in FIG. 8 and FIG. 9, the transfer layer 10 is provided on the release layer 2. The transfer layer 10 is a layer to be peeled at the face on the side opposed to the substrate 1 of the transfer layer 10 as a peel interface, which layer moves onto a transfer receiving article during thermal transfer. Specifically, in the thermal transfer sheet 100 of the third embodiment of the present disclosure, the transfer layer 10 is provided on the release layer 2. The transfer layer 10 is peeled from the release layer 2 and moves onto a transfer receiving article during thermal transfer. The transfer layer 10 as one example has a layered structure in which the protective layer 3 and the adhesive layer 5 are layered in this order from the side of the substrate 1. Note that the transfer layer 10 may have a single-layer structure composed of one layer or may have a layered structure in which two or more layers are layered. The transfer layers 10 of the first embodiment and the second embodiment of the present disclosure also may be appropriately selected and used. Hereinbelow, a case in which the transfer layer 10 is a transfer layer in which the protective layer 3 and the adhesive layer 5 are layered in this order from the side of the substrate 1 will be mainly described.
(Protective Layer)

The protective layer 3 included in the transfer layer 10 as an example is a layer to impart durability to a print obtained by transferring the transfer layer 10 onto a transfer receiving article. Note that the protective layer 3 is located nearest from the substrate 1 among the layers constituting the transfer layer 10 and is located on the outermost surface in a print obtained by transferring the transfer layer 10 onto a transfer receiving article. That is, the thermal transfer sheet of this aspect has a structure in which the transfer layer 10 is peeled at the interface between the release layer 2 and the protective layer 3.

There is no particular limitation with respect to the protective layer 3, and protective layers conventionally known in the field of thermal transfer sheets and protective layer transfer sheets can be appropriately selected and used. Examples of the components constituting the protective layer 3 can include polyesters, polystyrene, acryl resins, polyurethane, acryl urethane, resins obtained by silicone-modifying each of these resins, and mixtures of each of these resins.

The protective layer 3 of a preferable aspect to impart durability to a print contains a cured product of an active ray-curable resin. In the thermal transfer sheet 100 of the third embodiment of the present disclosure, as the protective layer, the protective layers 3 of the first embodiment and the second embodiment of the present disclosure can be suitably used.
(Adhesive Layer)

As shown in FIG. 8 and FIG. 9, the adhesive layer 5 described in the thermal transfer sheet of the first embodiment of the present disclosure may be provided on the protective layer 3.

There can also be used a structure in which a receiving layer, instead of the adhesive layer 5, is provided on the protective layer 3 (not shown). The same applies to the thermal transfer sheets of the first embodiment and the second embodiment of the present disclosure. Examples of the materials for the receiving layer can include polyolefins such as polypropylene, halogenated resins such as polyvinyl chloride or polyvinylidene chloride, vinyl resins such as polyvinyl acetate, vinyl chloride-vinyl acetate copolymers, ethylene-vinyl acetate copolymers, or polyacrylic acid esters, polyesters such as polyethylene terephthalate or polybutylene terephthalate, copolymers of an olefin such as polystyrene, polyamide, ethylene, or propylene and another vinyl polymer, ionomers, or cellulose resins such as cellulose diacetate, polycarbonate, and solvent-based resins such as acryl resins. The thickness of the receiving layer is preferably 0.5 µm or more and 10 µm or less, more preferably 1 µm or more and 3 µm or less.

The transfer layer 10 can also have a single-layer structure composed of one layer. For example, in the case where a measure to improve the adhesion with the transfer layer 10 is taken on the side of a transfer receiving article, the transfer layer 10 may have a single-layer structure consisting of the protective layer 3. The transfer layer 10 may also has a single-layer structure consisting of an adhesive layer. The transfer layer 10 may also have a layered structure composed of the protective layer 3 and the receiving layer. The transfer layer 10 may also has a single-layer structure consisting of an adhesive layer. The transfer layer 10 may also has other structure than these. That is, in the thermal transfer sheet 100 of the third embodiment of the present disclosure is not limited in any way with respect to the transfer layer 10, and the transfer layer 10 is only required to be peeled at the interface with the release layer 2 and transferred onto a transfer receiving article.

In the preferable thermal transfer sheet 100 of the third embodiment of the present disclosure, the transfer layer 10 has a layered structure in which the protective layer 3 and the adhesive layer 5 described above are layered in this order, in order to impart sufficient durability to a print onto which the transfer layer 10 is transferred. The adhesive layer can also have a dye-receiving ability. Alternatively, the thermal transfer sheet 100 can also has a structure in which the transfer layer 10 has the layered structure in which the protective layer 3 of the preferable aspect and a receiving layer are layered in this order and an adhesive property is imparted to the receiving layer.

(Adhesion Layer)

In the case where the adhesion force between the substrate 1 and the release layer 2 is lower than the adhesion force between the release layer 2 and the transfer layer 10, an adhesion layer 7 (also referred to as an anchor coat layer or the like in some cases) may be provided between the substrate 1 and the release layer 2, as shown in FIG. 9, such that the adhesion force between the substrate 1 and the release layer 2 becomes higher than the adhesion force between the release layer 2 and the transfer layer 10. Note that the adhesion layer 7 is an optional constituent in the thermal transfer sheet 100 of the second embodiment. For example, in the case where the adhesion force between the substrate 1 and the release layer 2 is higher than the adhesion force between the release layer 2 and the transfer layer 10 by conducting an easily-adhesive treatment on the substrate 1, as described above, it is not particularly necessary to provide the adhesion layer 7. As components of the adhesion layer, it is only required that components that can make the adhesion force between the substrate 1 and the release layer 2 higher than the adhesion force between the release layer 2 and the transfer layer 10 are appropriately selected and used.

(Dye Layer)

In the thermal transfer sheet of the various embodiments described above, a dye layer (not shown) may be provided together with the transfer layer 10 in a frame-sequential manner. The dye layer may be a single dye layer or may be one in which a plurality of dye layers, for example, two or all of a yellow dye layer, a magenta dye layer, and a cyan dye layer, are provided in a frame-sequential manner. Additionally, the dye layer may be one in which a fusible layer and the like are provided together with these dye layers in a frame-sequential manner.

(Back Face Layer)

In the thermal transfer sheet of the various embodiments, it is possible to also provide a back face layer (not shown) aimed at improving the heat resistance, driving stability, and the like on the face on the opposite side of the face of the substrate 1 on which the transfer layer 10 is provided.

The back face layer may be formed by appropriately selecting resin(s) from the conventionally known thermoplastic resins and the like. Examples of such a thermoplastic resin can include polyesters, polyacrylic acid esters, polyvinyl acetate, styrene acrylate, polyurethane, polyolefins such as polyethylene and polypropylene, polystyrene, polyvinyl chloride, polyethers, polyamides, polyimides, polyamideimides, polycarbonate, polyacrylamide, polyvinyl chloride, polyvinyl acetals such as polyvinyl butyral and polyvinyl acetoacetal, and silicone-modified forms of these.

Additionally, the back face layer preferably contains various additives, for example, a peel agent such as a wax, a higher fatty acid amide, a phosphoric acid ester compound, metal soap, silicone oil, or a surfactant, an organic powder such as a fluorine-containing resin, and inorganic particles such as silica, clay, talc, or calcium carbonate, in order to improve the slipping property, particularly preferably contains at least one of a phosphoric acid ester or metal soap.

The back face layer can be formed by, for example, dispersing or dissolving the thermoplastic resin described above and various additives to be added as required into a suitable solvent to prepare a coating liquid for back face layer, applying this coating liquid onto the substrate 1, followed by drying. The thickness of the back face layer is preferably 0.1 µm or more and 5 µm or less, more preferably 0.3 µm or more and 2.0 µm or less, from the viewpoint of improvement in the heat resistance and the like.

Hereinabove, the thermal transfer sheet of the present disclosure has been concretely described with reference to the thermal transfer sheets of the first embodiment to the third embodiment, but the constituents described in the thermal transfer sheet of the various embodiments may be appropriately combined to form a thermal transfer sheet. The thermal transfer sheet of a preferable aspect fulfills the configuration of the thermal transfer sheets of two or more of the embodiments among the thermal transfer sheets of the first embodiment to the third embodiment. The thermal transfer sheet of a more preferable aspect fulfills the configurations of the thermal transfer sheets of the first embodiment to the third embodiment. Specifically, the thermal transfer sheet 100 of this configuration has a substrate 1, a release layer 2 provided on the substrate 1, and a transfer layer 10 provided on the release layer 2. The transfer layer 10 is provided peelably from the release layer 2, and the release layer 2 contains a silsesquioxane. The initial breakage peeling-off force when the transfer layer 10 is peeled under conditions of a peeling-off temperature of 20° C. or more and 40° C. or less and a peeling-off angle of 90° is 5 mN/m or less. The initial breakage peeling-off force when the transfer layer 10 is peeled under conditions of a peeling-off temperature of 20° C. or more and 70° C. or less and a peeling-off angle of 60° or more is 1.97 mN/m or less. The scratch hardness (a sapphire needle having a tip radius of 0.1 mm is used) when the face located on the side of the substrate 1 of the transfer layer 10 is measured by a method in compliance with JIS-K-5600-5-5 is 200 g or more.

According to the thermal transfer sheet of this aspect, it is possible to sufficiently inhibit occurrence of head untransfer when the transfer layer is transferred onto a transfer receiving article and impart sufficient durability to a print obtained by transferring the transfer layer onto the transfer receiving article. It is also possible to impart stable releasability to the release layer.

<Transfer of Transfer Layer>

Examples of the method for transferring the transfer layer 10 onto a transfer receiving article using the thermal transfer sheet 100 of each embodiment of the present disclosure described as above can include known methods such as hot stamping (foil stamping) with a thermal stamper, entire surface or stripe transfer with a heat roll, and thermal printers (also referred to as thermal transfer printers in some cases) with a thermal head (thermal printing head).

<Transfer Receiving Article>

Transfer receiving articles onto which the transfer layer 10 of the thermal transfer sheet is to be transferred are not limited in any way. Examples thereof can include plastic films such as IC cards and ID cards, conventionally known thermal transfer image-receiving sheets, plastic cards mainly composed of vinyl chloride, a vinyl chloride-vinyl acetate copolymer, or polycarbonate, plain paper, wood-free paper, natural fiber paper, coated paper, tracing paper, glass, metals, ceramics, woods, and fabrics. As the transfer receiving article, one having a predetermined image also can be used. The transfer receiving article may be colored or may have transparency. The transfer receiving article may be one composed of a single layer or may be one composed of a plurality of layers.

Examples of the plastic film include polyesters such as polyethylene terephthalate (PET), polybutylene terephthalate (PBT), polyethylene naphthalate (PEN), polyethylene terephthalate-isophthalate copolymers, terephthalic acid-cyclohexanedimethanol-ethylene glycol copolymers, and polyethylene terephthalate/polyethylene naphthalate coextruded films, polyamides such as nylon 6 and nylon 6,6, polyolefins such as polyethylene, polypropylene, and polymethylpentene, vinyl resin such as polyvinyl chloride, acryl resins such as poly(meth)acrylate and polymethyl (meth)acrylate, imide resins such as polyimide and polyether imide, engineering resins such as polyarylate, polysulfone, polyether sulfone, polyphenylene ether, polyphenylene sulfide (PPS), polyaramid, polyether ketone, polyether nitrile, polyether ether ketone, and polyether sulfite, styrene resins such as polystyrene, high impact polystyrene, acrylonitrile-styrene copolymers (AS resins), and acrylonitrile-butadiene-styrene copolymers (ABS resins), cellulose-based films such as cellophane, cellulose acetate, and nitrocellulose, and polycarbonate. The plastic film may be a copolymer resin or mixed product (including an alloy) mainly based on the resins described above.

Usually in IC cards, ID cards, and the like, designability and security are required. Thus, such cards in which a printed layer, a hologram layer, or the like is provided on the surface thereof in advance also can be used as transfer receiving articles.

<<Method for Producing Thermal Transfer Sheet>>

Hereinbelow, a method for producing the thermal transfer sheet according to the embodiment of the present disclosure (hereinafter also referred to as the production method of the present disclosure in some cases) will be described. The production method of the present disclosure comprises a step of forming a release layer on a substrate, and a step of forming a transfer layer on the release layer. Then, in the production method of the present disclosure, the step of forming a release layer is a step of applying the coating liquid for release layer of the present disclosure onto the substrate, followed by drying.

Note that the step of applying the coating liquid for release layer on the substrate, followed by drying includes not only a step of applying the coating liquid for release layer directly onto the substrate, followed by drying but also a step of applying the coating liquid for release layer indirectly onto the substrate, followed by drying, in other words, a step of applying the coating liquid for release layer onto a layer optionally provided on the substrate, followed by drying.

According to the production method of the present disclosure, it is possible to stably impart releasability to the release layer of the thermal transfer sheet to be produced by the production method. Additionally, it is possible to impart releasability and solvent resistance to the release layer by use of the coating liquid of the preferable aspect described above as the coating liquid for release layer of the present disclosure.

Particularly, even in the case where, after the step of forming a release layer, a coating liquid containing an organic solvent as the coating liquid for forming the transfer layer is used in the step of forming a transfer layer on the release layer, it is possible to inhibit the release layer from being damaged by the organic solvent contained in the coating liquid by imparting solvent resistance together with releasability to the release layer.

As the coating liquid for release layer to be used in the step of forming a release layer, the coating liquids described in the coating liquid for release layer of the present disclosure described above can be appropriately selected and used, and a detailed description is omitted here.

In the step of forming a transfer layer, a transfer layer of a single-layer structure may be formed by applying a first coating liquid for transfer layer onto the release layer, followed by drying. Alternatively, after a first transfer layer is formed by coating a first coating liquid for transfer layer on the release layer, followed by drying, a second transfer layer may be formed by applying a second coating liquid for transfer layer onto the first transfer layer, followed by drying. In other words, the step may be a step of forming a transfer layer of a single-layer structure or may be a step of forming a transfer layer of a layered structure.

In the case where a transfer layer of a layered structure is formed, a step of forming an optional layer, for example, a primer layer, between the transfer layers also may be included. The production method of the present disclosure may also include a step of forming an optional layer, for example, an adhesion layer, between the substrate and the release layer. The production method may also include a step of forming a back face layer on the face on the opposite side of the face of the substrate on which the release layer is formed.

EXAMPLES

Next, the present invention will be described more concretely with reference to examples and comparative examples. Hereinbelow, unless otherwise particularly specified, the expression of part(s) or % means that by mass, representing a mass (amount fed) not in terms of solid content.

Example 1-1

As a substrate, a PET (polyethylene terephthalate) film having a thickness of 25 μm was used. A coating liquid for peel layer having the following composition was applied onto one face of this substrate, and then dried to form a peel layer having a thickness of 0.5 μm. Subsequently, onto the peel layer, a coating liquid for protective layer 1 having the following composition was coated, and then dried. Then, a UV exposure machine (Fusion UV, F600V, LH10 lamp, H valve, cold-type reflector) was used to apply ultraviolet irradiation under conditions shown in the following table 1 to form a protective layer having a thickness of 4.5 μm. Then, a coating liquid for primer layer 1 having the following composition was applied onto the protective layer, and then dried to form a primer layer having a thickness of 0.8 μm. Then, a coating liquid for adhesive layer having the following composition was applied onto the primer layer, and then dried to form an adhesive layer having a thickness of 0.6 μm. Thus, a thermal transfer sheet of Example 1-1 was obtained, in which the transfer layer was provided on one face of the substrate. Note that the transfer layer of the thermal transfer sheet of Example 1-1 has a layered structure in which the peel layer, the protective layer, the primer layer, and the adhesive layer are layered in this order from the side of the substrate.

<Coating Liquid for Peel Layer>

| | |
|---|---|
| Acryl resin (DIANAL(R) BR-87, Mitsubishi Chemical Corporation) | 95 parts |
| Polyester (Vylon(R) 200, TOYOBO CO., LTD.) | 5 parts |

-continued

| | |
|---|---|
| Toluene | 200 parts |
| Methyl ethyl ketone | 200 parts |

<Coating Liquid for Protective Layer 1>

| | |
|---|---|
| Polyfunctional acrylate | 18 parts |
| (NK ester A-9300, Shin Nakamura Chemical Co., Ltd.) | |
| Urethane acrylate | 18 parts |
| (NK oligomer EA1020, Shin Nakamura Chemical Co., Ltd.) | |
| Urethane acrylate | 10 parts |
| (NK ester U-15HA, Shin Nakamura Chemical Co., Ltd.) | |
| Reactive binder (containing an unsaturated group) | 4 parts |
| (NK polymer C24T, Shin Nakamura Chemical Co., Ltd.) | |
| First filler (volume average particle size: 0.7 μm) | 10 parts |
| (XC99-A8808 manufactured by Momentive Performance Materials Japan LLC) | |
| Second filler (volume average particle size: 12 nm) | 34 parts |
| (MEK-AC2140Z, Nissan Chemical Industries, Ltd.) | |
| Surfactant (acrylic surfactant) | 1 part |
| (LF-1984, Kusumoto Chemicals, Ltd.) | |
| Photo-polymerization initiator | 5 parts |
| (Irgacure(R) 184, BASF Japan Ltd.) | |
| Toluene | 100 parts |
| Methyl ethyl ketone | 100 parts |

<Coating Liquid for Primer Layer 1>

| | |
|---|---|
| Polyester | 3.3 parts |
| (Vylon(R) 200, TOYOBO CO., LTD.) | |
| Vinyl chloride-vinyl acetate copolymer | 2.7 parts |
| (SOLBIN(R) CNL, Nissin Chemical Co., Ltd.) | |
| Polyisocyanate curing agent | 1.5 parts |
| (TAKENATE(R) D110N, Mitsui Chemicals, Inc.) | |
| Toluene | 3.3 parts |
| Methyl ethyl ketone | 6.7 parts |

<Coating Liquid for Adhesive Layer>

| | |
|---|---|
| Modified polyolefin | 31.5 parts |
| (Arrowbase(R) SQ1221NQ, Unitika Ltd.) | |
| (Meth)acryl resin (Tg: 76° C.) | 3.5 parts |
| (JURYMER(R) AT-613, Toagosei Co., Ltd.) | |
| Water | 36 parts |
| Isopropyl alcohol | 18 parts |

Example 1-2

A thermal transfer sheet of Example 1-2 was obtained exactly in the same manner as in Example 1-1 except that the formation conditions for the protective layer were replaced by the conditions shown in the following table 1.

Example 1-3

A thermal transfer sheet of Example 1-3 was obtained exactly in the same manner as in Example 1-1 except that the coating liquid for protective layer 1 was replaced by a coating liquid for protective layer 2 having the following composition and the formation conditions for the protective layer were replaced by the conditions shown in the following table 1.

<Coating Liquid for Protective Layer 2>

| | |
|---|---|
| Polyfunctional acrylate | 19 parts |
| (NK ester A-9300, Shin Nakamura Chemical Co., Ltd.) | |
| Urethane acrylate | 19 parts |
| (NK oligomer EA1020, Shin Nakamura Chemical Co., Ltd.) | |
| Urethane acrylate | 11 parts |
| (NK ester U-15HA, Shin Nakamura Chemical Co., Ltd.) | |
| Reactive binder (containing an unsaturated group) | 5 parts |
| (NK polymer C24T, Shin Nakamura Chemical Co., Ltd.) | |
| First filler (volume average particle size: 0.7 μm) | 5 parts |
| (XC99-A8808 manufactured by Momentive Performance Materials Japan LLC) | |
| Second filler (volume average particle size: 12 nm) | 34 parts |
| (MEK-AC2140Z, Nissan Chemical Industries, Ltd.) | |
| Surfactant (acrylic surfactant) | 1 part |
| (LF-1984, Kusumoto Chemicals, Ltd.) | |
| Photo-polymerization initiator | 5 parts |
| (Irgacure(R) 184, BASF Japan Ltd.) | |
| Toluene | 100 parts |
| Methyl ethyl ketone | 100 parts |

Example 1-4

A thermal transfer sheet of Example 1-4 was obtained exactly in the same manner as in Example 1-1 except that the coating liquid for protective layer 1 was replaced by a coating liquid for protective layer 3 having the following composition and the formation conditions for the protective layer were replaced by the conditions shown in the following table 1.

<Coating Liquid for Protective Layer 3>

| | |
|---|---|
| Polyfunctional acrylate | 16 parts |
| (NK ester A-9300, Shin Nakamura Chemical Co., Ltd.) | |
| Urethane acrylate | 16 parts |
| (NK oligomer EA1020, Shin Nakamura Chemical Co., Ltd.) | |
| Urethane acrylate | 9 parts |
| (NK ester U-15HA, Shin Nakamura Chemical Co., Ltd.) | |
| Reactive binder (containing an unsaturated group) | 4 parts |
| (NK polymer C24T, Shin Nakamura Chemical Co., Ltd.) | |
| First filler (volume average particle size: 0.7 μm) | 15 parts |
| (XC99-A8808 manufactured by Momentive Performance Materials Japan LLC) | |
| Second filler (volume average particle size: 12 nm) | 34 parts |
| (MEK-AC2140Z, Nissan Chemical Industries, Ltd.) | |
| Surfactant (acrylic surfactant) | 1 part |
| (LF-1984, Kusumoto Chemicals, Ltd.) | |
| Photo-polymerization initiator | 5 parts |
| (Irgacure(R) 184, BASF Japan Ltd.) | |
| Toluene | 100 parts |
| Methyl ethyl ketone | 100 parts |

Example 1-5

A thermal transfer sheet of Example 1-5 was obtained exactly in the same manner as in Example 1-1 except that the formation conditions for the protective layer were replaced by the conditions shown in the following table 1.

Example 1-6

As a substrate, a PET (polyethylene terephthalate) film having a thickness of 25 μm was used. A coating liquid for release layer 1 having the following composition was applied onto one face of this substrate, and then dried to form a release layer having a thickness of 0.6 μm. Subsequently, onto the release layer, the coating liquid for protective layer 1 having the above composition was applied and then dried. Then, a UV exposure machine (Fusion UV, F600V, LH10 lamp, H valve, cold-type reflector) was used to apply ultraviolet irradiation under conditions shown in the following table 1 to form a protective layer having a thickness of 4.5 µm. Then, the coating liquid for primer layer 1 having the above composition was applied onto the protective layer, and then dried to form a primer layer having a thickness of 0.8 µm. Then, the coating liquid for adhesive layer having the above composition was applied onto the primer layer, and then dried to form an adhesive layer having a thickness of 0.6 µm. Thus, a thermal transfer sheet of Example 1-6 was obtained, in which the transfer layer was provided on one face of the substrate. Note that the transfer layer of the thermal transfer sheet of Example 1-6 has a layered structure in which the protective layer, the primer layer, and the adhesive layer are layered in this order from the side of the substrate.

<Coating Liquid for Release Layer 1>

| | |
|---|---|
| Epoxy group-containing silsesquioxane (SQ502-8, Arakawa Chemical Industries, Ltd.) | 90 parts |
| Curing catalyst (Celtop(R) CAT-A, Daicel Corporation) | 8 parts |
| Polyester polyurethane (Vylon UR-1700, TOYOBO Co., Ltd.) | 2 parts |
| Toluene | 80 parts |
| Methyl ethyl ketone | 160 parts |

Example 1-7

A thermal transfer sheet of Example 1-7 was obtained exactly in the same manner as in Example 1-6 except that the coating liquid for release layer 1 was replaced by a coating liquid for release layer 2 having the following composition to form the release layer.

<Coating Liquid for Release Layer 2>

| | |
|---|---|
| Epoxy group-containing silsesquioxane (SQ502-8, Arakawa Chemical Industries, Ltd.) | 92 parts |
| Curing catalyst (Celtop(R) CAT-A, Daicel Corporation) | 8 parts |
| Toluene | 80 parts |
| Methyl ethyl ketone | 160 parts |

Example 1-8

A thermal transfer sheet of Example 1-8 was obtained exactly in the same manner as in Example 1-1 except that the coating liquid for protective layer 1 was replaced by a coating liquid for protective layer 4 having the following composition and the formation conditions for the protective layer were replaced by the conditions shown in the following table 1.

<Coating Liquid for Protective Layer 4>

| | |
|---|---|
| Polyfunctional acrylate (NK ester A-9300, Shin Nakamura Chemical Co., Ltd.) | 13 parts |
| Urethane acrylate (NK oligomer EA1020, Shin Nakamura Chemical Co., Ltd.) | 13 parts |
| Urethane acrylate (NK ester U-15HA, Shin Nakamura Chemical Co., Ltd.) | 7 parts |
| Reactive binder (containing an unsaturated group) (NK polymer C24T, Shin Nakamura Chemical Co., Ltd.) | 3 parts |
| First filler (volume average particle size: 0.7 µm) (XC99-A8808 manufactured by Momentive Performance Materials Japan LLC) | 25 parts |
| Second filler (volume average particle size: 12 nm) (MEK-AC2140Z, Nissan Chemical Industries, Ltd.) | 34 parts |
| Surfactant (acrylic surfactant) (LF-1984, Kusumoto Chemicals, Ltd.) | 1 part |
| Photo-polymerization initiator (Irgacure(R) 184, BASF Japan Ltd.) | 5 parts |
| Toluene | 100 parts |
| Methyl ethyl ketone | 100 parts |

Example 1-9

A thermal transfer sheet of Example 1-9 was obtained exactly in the same manner as in Example 1-1 except that the coating liquid for protective layer 1 was replaced by a coating liquid for protective layer 5 having the following composition and the formation conditions for the protective layer were replaced by the conditions shown in the following table 1.

<Coating Liquid for Protective Layer 5>

| | |
|---|---|
| Polyfunctional acrylate (NK ester A-9300, Shin Nakamura Chemical Co., Ltd.) | 19 parts |
| Urethane acrylate (NK oligomer EA1020, Shin Nakamura Chemical Co., Ltd.) | 19 parts |
| Urethane acrylate (NK ester U-15HA, Shin Nakamura Chemical Co., Ltd.) | 11 parts |
| Reactive binder (containing an unsaturated group) (NK polymer C24T, Shin Nakamura Chemical Co., Ltd.) | 5 parts |
| First filler (volume average particle size: 0.7 µm) (XC99-A8808 manufactured by Momentive Performance Materials Japan LLC) | 7 parts |
| Second filler (volume average particle size: 12 nm) (MEK-AC2140Z, Nissan Chemical Industries, Ltd.) | 34 parts |
| Surfactant (acrylic surfactant) (LF-1984, Kusumoto Chemicals, Ltd.) | 1 part |
| Photo-polymerization initiator (Irgacure(R) 184, BASF Japan Ltd.) | 5 parts |
| Toluene | 100 parts |
| Methyl ethyl ketone | 100 parts |

Comparative Example 1-1

A thermal transfer sheet of Comparative Example 1-1 was obtained exactly in the same manner as in Example 1-1 except that the coating liquid for protective layer 1 was replaced by a coating liquid for protective layer A having the following composition and the formation conditions for the protective layer were replaced by the conditions shown in the following table 1.

<Coating Liquid for Protective Layer A>

| | |
|---|---|
| Polyfunctional acrylate (NK ester A-9300, Shin Nakamura Chemical Co., Ltd.) | 21 parts |
| Urethane acrylate (NK oligomer EA1020, Shin Nakamura Chemical Co., Ltd.) | 21 parts |
| Urethane acrylate (NK ester U-15HA, Shin Nakamura Chemical Co., Ltd.) | 12 parts |
| Reactive binder (containing an unsaturated group) (NK polymer C24T, Shin Nakamura Chemical Co., Ltd.) | 5 parts |
| Second filler (volume average particle size: 12 nm) (MEK-AC2140Z, Nissan Chemical Industries, Ltd.) | 34 parts |
| Surfactant (acrylic surfactant) (LF-1984, Kusumoto Chemicals, Ltd.) | 1 part |
| Photo-polymerization initiator (Irgacure(R) 184, BASF Japan Ltd.) | 5 parts |
| Toluene | 100 parts |
| Methyl ethyl ketone | 100 parts |

Comparative Example 1-2

A thermal transfer sheet of Comparative Example 1-2 was obtained exactly in the same manner as in Example 1-1 except that the coating liquid for protective layer 1 was replaced by the coating liquid for protective layer A having the above composition and the formation conditions for the protective layer were replaced by the conditions shown in the following table 1.

Comparative Example 1-3

A thermal transfer sheet of Comparative Example 1-3 was obtained exactly in the same manner as in Example 1-1 except that the coating liquid for protective layer 1 was replaced by a coating liquid for protective layer B having the following composition and the formation conditions for the protective layer were replaced by the conditions shown in the following table 1.

<Coating Liquid for Protective Layer B>

| | |
|---|---|
| Polyfunctional acrylate | 33 parts |
| (NK ester A-9300, Shin Nakamura Chemical Co., Ltd.) | |
| Urethane acrylate | 33 parts |
| (NK oligomer EA1020, Shin Nakamura Chemical Co., Ltd.) | |
| Urethane acrylate | 19 parts |
| (NK ester U-15HA, Shin Nakamura Chemical Co., Ltd.) | |
| Reactive binder (containing an unsaturated group) | 8 parts |
| (NK polymer C24T, Shin Nakamura Chemical Co., Ltd.) | |
| Surfactant (acrylic surfactant) | 1 part |
| (LF-1984, Kusumoto Chemicals, Ltd.) | |
| Photo-polymerization initiator | 5 parts |
| (Irgacure(R) 184, BASF Japan Ltd.) | |
| Toluene | 100 parts |
| Methyl ethyl ketone | 100 parts |

Comparative Example 1-4

A thermal transfer sheet of Comparative Example 1-4 was obtained exactly in the same manner as in Example 1-1 except that the coating liquid for protective layer 1 was replaced by a coating liquid for protective layer C having the following composition and the formation conditions for the protective layer were replaced by the conditions shown in the following table 1.

<Coating Liquid for Protective Layer C>

| | |
|---|---|
| Polyfunctional acrylate | 30 parts |
| (NK ester A-9300, Shin Nakamura Chemical Co., Ltd.) | |
| Urethane acrylate | 30 parts |
| (NK oligomer EA1020, Shin Nakamura Chemical Co., Ltd.) | |
| Urethane acrylate | 17 parts |
| (NK ester U-15HA, Shin Nakamura Chemical Co., Ltd.) | |
| Reactive binder (containing an unsaturated group) | 7 parts |
| (NK polymer C24T, Shin Nakamura Chemical Co., Ltd.) | |
| First filler (volume average particle size: 0.7 μm) | 10 parts |
| (XC99-A8808 manufactured by Momentive Performance Materials Japan LLC) | |
| Surfactant (acrylic surfactant) | 1 part |
| (LF-1984, Kusumoto Chemicals, Ltd.) | |
| Photo-polymerization initiator | 5 parts |
| (Irgacure(R) 184, BASF Japan Ltd.) | |
| Toluene | 100 parts |
| Methyl ethyl ketone | 100 parts |

Comparative Example 1-5

A thermal transfer sheet of Comparative Example 1-5 was obtained exactly in the same manner as in Example 1-1 except that the coating liquid for protective layer 1 was replaced by a coating liquid for protective layer D having the following composition and the protective layer was formed without ultraviolet irradiation.

<Coating Liquid for Protective Layer D>

| | |
|---|---|
| Styrene—acrylic copolymer | 150 parts |
| (MUTICLE(R) PP320P, Mitsui Chemicals, Inc.) | |
| Polyvinyl alcohol | 100 parts |
| (C-318, DNP Fine Chemicals Co., Ltd.) | |
| Water | 25 parts |
| Solvent | 50 parts |
| (Solmix(R) A-11, Japan Alcohol Trading CO., LTD.) | |

TABLE 1

| | Coating liquid for protective layer | First UV irradiation | | Second UV irradiation | | Total |
| | | Peak illuminance (mW/cm$^2$) | Accumulated exposure (mJ/cm$^2$) | Peak illuminance (mW/cm$^2$) | Accumulated exposure (mJ/cm$^2$) | accumulated exposure (mJ/cm$^2$) |
|---|---|---|---|---|---|---|
| Example 1-1 | Coating liquid for protective layer 1 | 491 | 85 | 1623 | 136 | 221 |
| Example 1-2 | Coating liquid for protective layer 1 | 858 | 113 | 1623 | 110 | 223 |
| Example 1-3 | Coating liquid for protective layer 2 | 491 | 85 | 1623 | 136 | 221 |
| Example 1-4 | Coating liquid for protective layer 3 | 491 | 85 | 1623 | 136 | 221 |
| Example 1-5 | Coating liquid for protective layer 1 | 858 | 220 | — | — | 220 |
| Example 1-6 | Coating liquid for protective layer 1 | 491 | 85 | 1623 | 136 | 221 |
| Example 1-7 | Coating liquid for protective layer 1 | 491 | 85 | 1623 | 136 | 221 |

TABLE 1-continued

|  | Coating liquid for protective layer | First UV irradiation | | Second UV irradiation | | Total accumulated exposure (mJ/cm$^2$) |
|---|---|---|---|---|---|---|
|  |  | Peak illuminance (mW/cm$^2$) | Accumulated exposure (mJ/cm$^2$) | Peak illuminance (mW/cm$^2$) | Accumulated exposure (mJ/cm$^2$) |  |
| Example 1-8 | Coating liquid for protective layer 4 | 491 | 85 | 1623 | 136 | 221 |
| Example 1-9 | Coating liquid for protective layer 5 | 491 | 85 | 1623 | 136 | 221 |
| Comparative Example 1-1 | Coating liquid for protective layer A | 1735 | 110 | 1735 | 110 | 220 |
| Comparative Example 1-2 | Coating liquid for protective layer A | 491 | 85 | 1623 | 136 | 221 |
| Comparative Example 1-3 | Coating liquid for protective layer B | 491 | 85 | 1623 | 136 | 221 |
| Comparative Example 1-4 | Coating liquid for protective layer C | 491 | 85 | 1623 | 136 | 221 |
| Comparative Example 1-5 | Coating liquid for protective layer D | — | — | — | — | — |

(Measurement of Initial Breakage Peeling-Off Force)

The thermal transfer sheets of Examples 1-1 to 1-9 and Comparative Examples 1-1 to 1-5 were used to calculate the initial breakage peeling-off force at a peeling-off temperature of 30° C. and at each of peeling-off angles of 60°, 90°, and 120° and the initial breakage peeling-off force at a peeling-off temperature of 60° C. and at each of peeling-off angles of 60°, 90°, and 120°, using the method described in "Method for calculating initial breakage peeling-off force 1" described above. The calculation results are shown in Table 2.

(Measurement of Stable-State Peeling-Off Force)

The thermal transfer sheets of Examples 1-1 to 1-9 were used to calculate the stable-state peeling-off force at each of peeling-off temperature s of 30° C. and 60° C. and at a peeling-off angle of 90°, using the method described in "Method for calculating stable-state peeling-off force 1" described above. The calculation results are shown in Table 2.

(Preparation of Transfer Receiving Article)

Onto one face of a white PET (polyethylene terephthalate) film having a thickness of 188 μm, a coating liquid for cushion layer having the following composition was applied and then dried. Irradiation with an active ray using a mercury lamp (300 mJ/cm$^2$) for curing resulted in formation of a cushion layer having a thickness of 10 μm. Then, gelatin was applied onto the cushion layer, and then dried to form a barrier layer having a thickness of 0.7 μm. Then, a coating liquid for receiving layer having the following composition was coated onto the barrier layer, and then dried to form a receiving layer having a thickness of 2.45 μm. Then, a coating liquid for resin layer having the following composition was applied onto the receiving layer, and then dried to form a resin layer having a thickness of 0.4 μm. Then, under the following test printer conditions, using a thermal transfer sheet for image formation prepared below, a black solid image (image gray scale: 0/255) was formed on the resin layer to obtain a transfer receiving article.

<Coating Liquid for Cushion Layer>

| Urethane acrylate oligomer (NK Oligo UA-160TM, Shin Nakamura Chemical Co., Ltd.) | 50 parts |
|---|---|
| Acrylic acid ester polymer (VANARESIN GH-5270, Shin Nakamura Chemical Co., Ltd.) | 30 parts |
| Urethane acrylate oligomer (NK Oligo UA-1280T, Shin Nakamura Chemical Co., Ltd.) | 18 parts |
| Polymerization initiator (Irgacure(R) 127, BASF Japan Ltd.) | 2 parts |
| Methyl ethyl ketone | 100 parts |

<Coating Liquid for Receiving Layer>

| Polyvinyl butyral (S-LEC(R) BX-1, SEKISUI CHEMICAL CO., LTD.) | 6 parts |
|---|---|
| Metal ion-containing compound ($Ni^{2+}[C_7H_{15}COC(COOCH_3)=C(CH_3)O^-]_2$) | 4 parts |
| Methyl ethyl ketone | 80 parts |
| n-Butyl acetate | 10 parts |

<Coating Liquid for Resin Layer>

| Polypropylene wax emulsion (solid content: 30%) (Hitech E433N, TOHO Chemical Industry Co., Ltd.) | 33 parts |
|---|---|
| Water | 67 parts |

(Preparation of Thermal Transfer Sheet for Image Formation)

Onto a PET (polyethylene terephthalate) film having a thickness of 6 μm subjected to an easy-adhesive treatment in advance as a substrate, a coating liquid for back face layer having the following composition was applied so as to obtain a thickness of 1 μm in the dried state on one face of the substrate, and then dried to form a back face layer. Then, onto the other face of the substrate, a coating liquid for yellow dye layer, a coating liquid for magenta dye layer, and a coating liquid for cyan dye layer were each applied so as to obtain a thickness of 1.1 μm in the dried state in a frame-sequential manner, and then the coating liquids were dried to obtain a thermal transfer sheet for image formation.

<Coating Liquid for Back Face Layer>

| | |
|---|---|
| Polyvinyl butyral | 2 parts |
| (S-LEC(R) BX-1, SEKISUI CHEMICAL CO., LTD.) | |
| Polyisocyanate curing agent | 9.2 parts |
| (BURNOCK(R) D750, DIC Corporation) | |
| Phosphoric acid ester | 1.3 parts |
| (PLYSURF(R) A208S, DKS Co. Ltd.) | |
| Talc | 0.3 parts |
| (MICRO ACE(R) P-3, Nippon Talc Co., Ltd.) | |
| Methyl ethyl ketone | 43.6 parts |
| Toluene | 43.6 parts |

<Coating Liquid for Yellow Dye Layer>

| | |
|---|---|
| Pigment represented by the following chemical formula (Y-1) | 3 parts |
| Polyvinyl acetal | 5.5 parts |
| (S-LEC(R) KS-5, SEKISUI CHEMICAL CO., LTD.) | |
| Epoxy-modified acryl resin | 1 part |
| (RESEDA(R) GP-305, Toagosei Co., Ltd.) | |
| Urethane-modified silicone oil | 0.5 parts |
| (DAIALLOMER(R) SP2105, Dainichiseika Color & Chemicals Mfg. Co., Ltd.) | |
| Methyl ethyl ketone | 80 parts |
| Toluene | 10 parts |

[Formula 2]

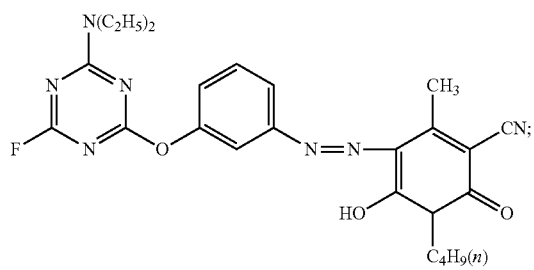

Y-1

<Coating Liquid for Magenta Dye Layer>

| | |
|---|---|
| Pigment represented by the following chemical formula (M-1) | 3 parts |
| Polyvinyl acetal | 5.5 parts |
| (S-LEC(R) KS-5, SEKISUI CHEMICAL CO., LTD.) | |
| Epoxy-modified acryl resin | 1 part |
| (RESEDA(R) GP-305, Toagosei Co., Ltd.) | |
| Urethane-modified silicone oil | 0.5 parts |
| (DAIALLOMER(R) SP2105, Dainichiseika Color & Chemicals Mfg. Co., Ltd.) | |
| Methyl ethyl ketone | 80 parts |
| Toluene | 10 parts |

[Formula 3]

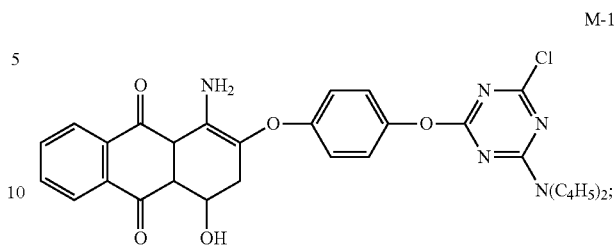

M-1

<Coating Liquid for Cyan Dye Layer>

| | |
|---|---|
| Pigment represented by the following chemical formula (C-1) | 3 parts |
| Polyvinyl acetal | 5.5 parts |
| (S-LEC(R) KS-5, SEKISUI CHEMICAL CO., LTD.) | |
| Epoxy-modified acryl resin | 1 part |
| (RESEDA(R) GP-305, Toagosei Co., Ltd.) | |
| Urethane-modified silicone oil | 0.5 parts |
| (DAIALLOMER(R) SP2105, Dainichiseika Color & Chemicals Mfg. Co., Ltd.) | |
| Methyl ethyl ketone | 80 parts |
| Toluene | 10 parts |

[Formula 4]

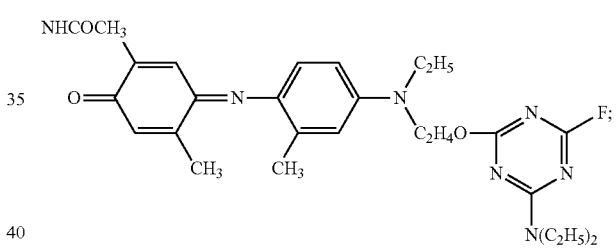

C-1

(Test Printer Conditions)

Thermal head: KEE-57-12GAN2-STA (KYOCERA Corporation)

Printing voltage: 25.5 (V)

Heater average resistance: 5545 (Ω)

Main scanning direction printing density: 300 (dpi)

Sub scanning direction printing density: 300 (dpi)

Line cycle: 2 (msec./line)

Printing start temperature: 30 (° C.)

(Preparation of Print)

The transfer receiving article prepared by the above method and the thermal transfer sheet of each of Examples 1-1 to 1-9 and Comparative Examples 1-1 to 1-5 were superposed on each other such that the resin layer of the transfer receiving article was in contact with the transfer layer of the thermal transfer sheet. A laminator (GL835PRO, Japan GBC) was used under conditions of upper and lower roll temperatures of 150° C., a lamination speed of 15.07 mm/sec., and a roll nip width of 1 mm to laminate the thermal transfer sheet of each of Examples and Comparative Examples onto the transfer receiving article. The transfer layer was peeled from the thermal transfer sheet laminated onto the transfer receiving article such that only the transfer layer remained on the side of the transfer receiving article to thereby prepare a print of each of Examples 1-1 to 1-9 and Comparative Examples 1-1 to 1-5, in which print the transfer layer of the thermal transfer sheet of each of Examples and Comparative Example was transferred onto the transfer receiving article.

(Measurement of Scratch Hardness)

The scratch hardness of the surface of each print of Examples 1-1 to 1-9 and Comparative Examples 1-1 to 1-5 prepared by the above method was measured by a method in compliance with JIS-K-5600-5-5 (a sapphire needle having a tip radius of 0.1 mm was used). The measurement results are shown in Table 2.

(Durability Evaluation)

The durability of the surface of each print of Examples 1-1 to 1-9 and Comparative Examples 1-1 to 1-5 prepared by the above method was conducted in compliance with ANSI-INCITS 322-2002, 5.9 Surface Abrasion by a Taber abrasion tester (No. 410, Toyo Seiki Seisaku-sho, Ltd.). The reflection density of an abraded portion was measured every 250 cycles by a spectrophotometer RD918 (X-Rite Inc., visual filter used). When the reflection density decreased to less than 50% based on the density before abrasion, abrasion was finished, and the durability was evaluated based on the following evaluation criteria. The evaluation results are shown in Table 2.

"Evaluation Criteria"

A: The number of cycles when the reflection density decreased to less than 50% is 2000 or more.

B: The number of cycles when the reflection density decreased to less than 50% is 1000 or more and less than 2000.

NG: The number of cycles when the reflection density decreased to less than 50% is less than 1000.

(Transferability Evaluation (Head Untransfer Evaluation))

The transfer layer of the thermal transfer sheet of each of Examples 1-1 to 1-9 and Comparative Examples 1-1 to 1-5 was fused on the transfer receiving article produced above using a heat roller of which surface temperature was set to 200° C. This transfer layer was peeled from the side of the substrate of the thermal transfer sheet using a peel roll (diameter: 5 mm) to obtain a print of each of Examples 1-1 to 1-9 and Comparative Examples 1-1 to 1-5, in which print the transfer layer of the thermal transfer sheet of each of Examples and Comparative Examples was transferred on the transfer receiving article. The peeling-off angle during peel using a peel roll was 60° and 90°, and the peel was conducted both at peeling-off temperatures of 30° C. and 60° C. Both the transfer rate and the peel rate were set to 1464 mm/min. The peeling-off temperature is a value determined by contactlessly measuring the surface of the transfer layer located in proximity the peel roll using a radiation thermometer.

"Evaluation Criteria"

A: An untransferred portion onto the transfer receiving article occurs at less than 0.5 mm from the transfer start end of the transfer layer.

B: An untransferred portion onto the transfer receiving article occurs at 0.5 mm or more and less than 1 mm from the transfer start end of the transfer layer.

NG: An untransferred portion onto the transfer receiving article occurs at 1 mm or more from the transfer start end of the transfer layer.

(Foil Cutting Property Evaluation (Tailing Evaluation))

The length of tailing in the rear end portion of the print obtained in the above evaluation of the transferability evaluation (head untransfer) was measured, and the tailing was evaluated based on the following evaluation criteria. The evaluation results are shown in Table 2. Note that the results of the foil cutting property evaluation are the same results irrespective of the peeling-off temperature and winding diameter.

"Evaluation Criteria"

A: The length of tailing is less than 0.5 mm.

B: The length of tailing is 0.5 mm or more and less than 1 mm.

NG: The length of tailing is 1 mm or more.

TABLE 2

| | Initial breakage peeling-off force (mN/m) | | | | | | Stable-state peeling-off force (mN/m) | | Scratch hardness (g) | Durability | Transferability | | | | Foil cutting property (tailing) |
|---|---|---|---|---|---|---|---|---|---|---|---|---|---|---|---|
| | 30° C. | | | 60° C. | | | 30° C. | 60° C. | | | 30° C. | | 60° C. | | |
| | 60° | 90° | 120° | 60° | 90° | 120° | 90° | 90° | | | 60° | 90° | 60° | 90° | |
| Example 1-1 | 0.715 | 0.311 | 0.216 | 1.237 | 0.343 | 0.226 | 0.245 | 0.221 | 250 | A | A | A | A | A | B |
| Example 1-2 | 0.736 | 0.288 | 0.184 | 1.166 | 0.386 | 0.173 | 0.236 | 0.221 | 250 | A | A | A | A | A | B |
| Example 1-3 | 1.343 | 0.692 | 0.188 | 1.770 | 0.775 | 0.201 | 0.265 | 0.235 | 250 | A | B | A | B | A | B |
| Example 1-4 | 0.664 | 0.228 | 0.115 | 1.053 | 0.353 | 0.112 | 0.216 | 0.206 | 230 | A | A | A | A | A | B |
| Example 1-5 | 0.922 | 0.304 | 0.196 | 1.461 | 0.402 | 0.196 | 0.235 | 0.216 | 250 | A | A | A | B | A | B |
| Example 1-6 | 1.105 | 0.489 | 0.214 | 1.261 | 0.719 | 0280 | 0.315 | 0.294 | 250 | A | A | A | A | A | A |
| Example 1-7 | 0.686 | 0.284 | 0.196 | 1.138 | 0.324 | 0.216 | 0.216 | 0.196 | 250 | A | A | A | A | A | B |
| Example 1-8 | 0.500 | 0.177 | 0.098 | 0.883 | 0.294 | 0.098 | 0.167 | 0.157 | 180 | B | A | A | A | A | B |
| Example 1-9 | 1.098 | 0.520 | 0.196 | 1.500 | 0.588 | 0.186 | 0.255 | 0.245 | 250 | A | B | A | B | A | B |
| Comparative Example 1-1 | 4.566 | 2.033 | 0.671 | 5.448 | 2.410 | 1.401 | — | — | 300 | A | NG | NG | NG | NG | — |
| Comparative Example 1-2 | 3.863 | 0.744 | 0.369 | 4.534 | 1.160 | 0.147 | — | — | 280 | A | NG | B | NG | NG | — |
| Comparative Example 1-3 | 12.455 | 6.700 | 3.717 | 14.034 | 8.954 | 5.286 | — | — | 250 | A | NG | NG | NG | NG | — |
| Comparative Example 1-4 | 6.276 | 3.099 | 2.324 | 8.356 | 5.502 | 3.609 | — | — | 230 | A | B | B | NG | NG | — |
| Comparative Example 1-5 | 1.167 | 0.785 | 0.510 | 1.236 | 0.932 | 0.716 | — | — | 130 | NG | A | A | A | A | — |

Example 2-1

As a substrate, a PET (polyethylene terephthalate) film having a thickness of 25 μm was used. The coating liquid for peel layer having the above composition was applied onto one face of this substrate, and then dried to form a peel layer having a thickness of 0.5 μm. Subsequently, onto the peel layer, a coating liquid for protective layer 6 having the following composition was applied and then dried. Then, a UV exposure machine (Fusion UV, F600V, LH10 lamp, H valve, cold-type reflector) was used to apply ultraviolet irradiation (exposure (220 mJ/cm$^2$)) to form a protective layer having a thickness of 4.5 μm. Then, the coating liquid for primer layer 1 having the above composition was applied onto the protective layer, and then dried to form a primer layer having a thickness of 0.8 μm. Then, the coating liquid for adhesive layer having the above composition was applied onto the primer layer, and then dried to form an adhesive layer having a thickness of 0.6 μm. Thus, a thermal transfer sheet of Example 2-1 was obtained, in which the transfer layer was provided on one face of the substrate. Note that the transfer layer of the thermal transfer sheet of Example 2-1 has a layered structure in which the peel layer, the protective layer, the primer layer, and the adhesive layer are layered in this order from the side of the substrate.

<Coating Liquid for Protective Layer 6>

| | |
|---|---|
| Polyfunctional acrylate | 20 parts |
| (NK ester A-9300, Shin Nakamura Chemical Co., Ltd.) | |
| Urethane acrylate | 20 parts |
| (NK oligomer EA1020, Shin Nakamura Chemical Co., Ltd.) | |
| Urethane acrylate | 10 parts |
| (NK ester U-15HA, Shin Nakamura Chemical Co., Ltd.) | |
| Reactive binder (containing an unsaturated group) | 5 parts |
| (NK polymer C241, Shin Nakamura Chemical Co., Ltd.) | |
| Filler (volume average particle size: 12 nm) | 40 parts |
| (MEK-AC2140Z, Nissan Chemical Industries, Ltd.) | |
| Surfactant (acrylic surfactant) | 0.1 part |
| (LF-1984, Kusumoto Chemicals, Ltd.) | |
| Toluene | 200 parts |
| Methyl ethyl ketone | 200 parts |

Example 2-2

As a substrate, a PET (polyethylene terephthalate) film having a thickness of 25 μm was used. A coating liquid for primer layer 2 having the following composition was applied onto one face of this substrate, and then dried to form a primer layer having a thickness of 0.5 μm. Then, a coating liquid for release layer 3 having the following composition was applied onto the primer layer, and then dried to form a release layer having a thickness of 0.6 μm. Subsequently, onto the release layer, the coating liquid for protective layer 6 having the above composition was applied and then dried. Then, a UV exposure machine (Fusion UV, F600V, LH10 lamp, H valve, cold-type reflector) was used to apply ultraviolet irradiation (exposure (220 mJ/cm$^2$)) to form a protective layer having a thickness of 4.5 μm. Then, the coating liquid for primer layer 1 having the above composition was applied onto the protective layer, and then dried to form a primer layer having a thickness of 0.8 μm. Then, the coating liquid for adhesive layer having the above composition was applied onto the primer layer, and then dried to form an adhesive layer having a thickness of 0.6 μm. Thus, a thermal transfer sheet of Example 2-2 was obtained, in which the transfer layer was provided on one face of the substrate. Note that the transfer layer of the thermal transfer sheet of Example 2-2 has a layered structure in which the protective layer, the primer layer, and the adhesive layer are layered in this order from the side of the substrate.

<Coating Liquid for Primer Layer 2>

| | |
|---|---|
| Aqueous polyurethane | 82 parts |
| (HYDRAN(R) AP-40N, DIC Corporation) | |
| Epoxy resin | 18 parts |
| (WATERSOL(R) WSA-950, DIC Corporation) | |
| Water | 450 parts |
| Solvent | 450 parts |
| (Solmix(R) A-11, Japan Alcohol Trading CO., LTD.) | |

<Coating Liquid for Release Layer 3>

| | |
|---|---|
| Epoxy group-containing silsesquioxane | 90 parts |
| (SQ502-8, Arakawa Chemical Industries, Ltd.) | |
| Curing catalyst | 8 parts |
| (Celtop(R) CAT-A, Daicel Corporation) | |
| Silicone resin filler (average particle size: 6.0 μm) | 2 parts |
| (Tospearl(R) 2000B, Momentive Performance Materials Japan LLC) | |
| Toluene | 80 parts |
| Methyl ethyl ketone | 160 parts |

Example 2-3

A thermal transfer sheet of Example 2-3 was obtained exactly in the same manner as in Example 2-2 except that the coating liquid for release layer 3 was replaced by a coating liquid for release layer 4 having the following composition to form the release layer.

<Coating Liquid for Release Layer 4>

| | |
|---|---|
| Epoxy group-containing silsesquioxane | 91.2 parts |
| (SQ502-8, Arakawa Chemical Industries, Ltd.) | |
| Curing catalyst | 8.2 parts |
| (Celtop(R) CAT-A, Daicel Corporation) | |
| Silicone resin filler (average particle size: 3.0 μm) | 0.6 parts |
| (Tospearl(R) 130, Momentive Performance Materials Japan LLC) | |
| Toluene | 80 parts |
| Methyl ethyl ketone | 160 parts |

Comparative Example 2-1

A thermal transfer sheet of Comparative Example 2-1 was obtained exactly in the same manner as in Example 2-2 except that the coating liquid for protective layer 6 was replaced by the coating liquid for protective layer D having the above composition to form the protective layer.

Comparative Example 2-2

A thermal transfer sheet of Comparative Example 2-2 was obtained exactly in the same manner as in Example 2-2 except that the coating liquid for release layer 3 was replaced by a coating liquid for release layer A having the following composition to form the release layer.

<Coating Liquid for Release Layer A>

| | |
|---|---|
| Epoxy group-containing silsesquioxane (SQ502-8, Arakawa Chemical Industries, Ltd.) | 91.3 parts |
| Curing catalyst (Celtop(R) CAT-A, Daicel Corporation) | 8.4 parts |
| Silicone resin filler (average particle size: 0.7 μm) (X-52-854, Shin-Etsu Chemical Co., Ltd.) | 0.3 parts |
| Toluene | 80 parts |
| Methyl ethyl ketone | 160 parts |

(Measurement of Surface Roughness (SRa))

With respect to the thermal transfer sheets of Examples 2-1 and 2-2 and Comparative Example 2-2, when these thermal transfer sheets are obtained, in the stage before the protective layer was formed on the release layer, the surface roughness (SRa) of the surface of the release layer was measured using a three-dimensional surface roughness shape measuring apparatus (SURFCOM® 1400, TOKYO SEIMITSU CO., LTD.). The measurement results are shown in Table 3.

(Measurement of Initial Breakage Peeling-Off Force)

The thermal transfer sheet of each of Examples and Comparative Examples was cut into a width of 65 mm. The cut thermal transfer sheet of each of Examples and Comparative Examples was bonded, using transparent double-sided tape (NICETACK® NW-15, Nichiban Co., Ltd.), onto a hot stage (HP2000, Shinto Scientific Co., Ltd.) of which temperature is adjusted to 20° C. such that the surface of the hot stage was opposed to the surface of the transfer layer. In the state where the temperature of the thermal transfer sheet was kept at 20° C., the transfer layer of the thermal transfer sheet bonded was peeled from the side of the substrate of the thermal transfer sheet under conditions of a peeling-off angle of 90° and a peel rate of 5 mm/sec, while the peeling-off force in the range from the initial peeling-off portion (see FIG. 7) as the start point to a point 5 mm (5 mm exclusive) distant from the start point was sequentially measured with a peeling-off force measurement device (Digital Force Gauge DPX-5, IMADA CO., LTD.). The value of the maximum peeling-off force in this measurement range was divided by the width of the thermal transfer sheet (65 mm) to calculate the initial breakage peeling-off force. The initial breakage peeling-off forces at 30° C. and 40° C. were calculated in the same manner. The calculation results of the initial breakage peeling-off force are shown in Table 1. Note that the above transparent double-sided tape bonds the hot stage and the thermal transfer sheet over a range of 15 mm from the initial peeling-off portion (see FIG. 7) as the start point in the peel-off direction.

(Measurement of Scratch Hardness)

The transfer receiving article prepared by the above method and the thermal transfer sheet of each of Examples 2-1 to 2-3 and Comparative Examples 2-1 and 2-2 were superposed on each other such that the resin layer of the transfer receiving article was in contact with the transfer layer of the thermal transfer sheet, and prints of Examples 2-1 to 2-3 and Comparative Examples 2-1 and 2-2 were prepared in the same manner as in Examples 1-1 to 1-9 and Comparative Examples 1-1 to 1-5 described above. The scratch hardness of the surface of each print of Examples and Comparative Examples prepared was measured by a method in compliance with JIS-K-5600-5-5 (a sapphire needle having a tip radius of 0.1 mm was used). The measurement results are shown in Table 3.

(Durability Evaluation)

Prints of Examples 2-1 to 2-3 and Comparative Examples 2-1 and 2-2 were prepared in the same manner as in Examples 1-1 to 1-9 and Comparative Examples 1-1 to 1-5 described above. The durability of the surface of the prepared print of each of Examples and Comparative Examples was measured in the same manner as in Examples 1-1 to 1-9 and Comparative Examples 1-1 to 1-5 described above, and the durability was evaluated based on evaluation criteria similar to those of Examples 1-1 to 1-9 and Comparative Examples 1-1 to 1-5 described above. The evaluation results are shown in Table 3.

(Transferability Evaluation (Head Untransfer Evaluation))

Prints of Examples 2-1 to 2-3 and Comparative Examples 2-1 and 2-2 were prepared in the same manner as in Examples 1-1 to 1-9 and Comparative Examples 1-1 to 1-5 described above. The situation of transfer of the transfer layer onto the transfer receiving article in the prepared print of each of Examples and Comparative Examples was checked, and transferability evaluation (head untransfer evaluation) was conducted based on the following evaluation criteria. The evaluation results are shown in Table 3.

"Evaluation Criteria"

A: An untransferred portion onto the transfer receiving article occurs at less than 0.5 mm from the transfer start end of the transfer layer.

B: An untransferred portion onto the transfer receiving article occurs at 0.5 mm or more and less than 1 mm from the transfer start end of the transfer layer.

NG: An untransferred portion onto the transfer receiving article occurs at 1 mm or more from the transfer start end of the transfer layer.

(Measurement of Glossiness)

Prints of Examples 2-1 to 2-3 and Comparative Examples 2-1 and 2-2 were prepared in the same manner as in Examples 1-1 to 1-9 and Comparative Examples 1-1 to 1-5 described above. The glossiness of the surface of the prepared print of each of Examples and Comparative Examples was measured using a glossiness meter (VG2000, Nippon Denshoku Industries Co. Ltd.) (measurement angle: 20°). The measurement results are shown in Table 3.

TABLE 3

| | Surface roughness | Initial breakage peeling-off force (mN/m) | | | Scratch hardness | | | |
|---|---|---|---|---|---|---|---|---|
| | SRa (μm) | 20° C. | 30° C. | 40° C. | (g) | Durability | Transferability | Glossiness |
| Example 2-1 | — | 4.12 | 4.41 | 4.71 | 280 | A | B | 83 |
| Example 2-2 | 0.091 | 1.77 | 1.96 | 2.16 | 300 | A | A | 42 |
| Example 2-3 | 0.064 | 3.24 | 3.43 | 3.73 | 300 | A | A | 66 |
| Comparative Example 2-1 | — | 0.78 | 0.98 | 1.18 | 130 | NG | A | 83 |
| Comparative Example 2-2 | 0.046 | 5.98 | 6.37 | 6.86 | 300 | A | NG | 78 |

Example 3-1

Using a polyethylene terephthalate (PET) film having a thickness of 12 μm as a substrate, a coating liquid for anchor coat layer having the following composition was applied onto one face of the substrate so as to obtain a thickness of 0.5 μm in the dried state, and then dried to form an anchor coat layer. A coating liquid for release layer 5 having the following composition was applied onto the anchor coat layer so as to obtain a thickness of 0.7 μm in the dried state, and then dried and matured in an oven at 60° C. for 84 hours to form a release layer. Onto the release layer, a coating liquid for protective layer 7 having the following composition was applied and then dried. Then, exposure (exposure (220 mJ/cm$^2$)) using a UV exposure machine so as to obtain a thickness of 4.5 μm after the exposure resulted in formation of a protective layer. Thus, a thermal transfer sheet of Example 3-1 was obtained in which the anchor coat layer, the release layer, and the protective layer as the transfer layer were layered in this order from the side of the substrate. Note that the UV exposure machine used was an output adjustable-type UV lamp system (DRS-10/12QN, Fusion UV Systems Japan K.K.).

<Coating Liquid for Anchor Coat Layer>

| | |
|---|---|
| Polyurethane (solid content: 35%) (AP-40N, DIC Corporation) | 7.2 parts |
| Epoxy-type curing agent (WATERSOL(R) WSA-950, DIC Corporation) | 0.5 parts |
| Solvent (Solmix(R) A-11, Japan Alcohol Trading CO., LTD.) | 9.8 parts |
| Water | 2.4 parts |

<Coating Liquid for Release Layer 5>

| | |
|---|---|
| Epoxy group-containing silsesquioxane (solid content: 72.6%) (SQ502-8, Arakawa Chemical Industries, Ltd.) | 5.8 parts |
| Aluminum catalyst (solid content: 10%) (Celtop(R) CAT-A, Daicel Corporation) | 3.8 parts |
| Toluene | 3.5 parts |
| Methyl ethyl ketone | 6.9 parts |

<Coating Liquid for Protective Layer 7>

| | |
|---|---|
| Trifunctional acrylate (NK ester A-9300, Shin Nakamura Chemical Co., Ltd.) | 1.4 parts |
| Bisphenol A-type epoxy acrylate (NK oligomer EA-1020, Shin Nakamura Chemical Co., Ltd.) | 1.4 parts |
| Pentadeca-functional urethane acrylate (NK ester U-15HA, Shin Nakamura Chemical Co., Ltd.) | 1.4 parts |
| Polymer acrylate (solid content: 50%) (NK ester C-24T, Shin Nakamura Chemical Co., Ltd.) | 0.7 parts |
| Filler (silica) (average particle size: 12 nm) (solid content: 50%) (MEK-AC2140Z, Nissan Chemical Industries, Ltd.) | 5.9 parts |
| Photo-polymerization initiator (Irgacure(R) 184, BASF Japan Ltd.) | 0.14 parts |
| Surface adjusting agent (solid content: 50%) (LF1984, Kusumoto Chemicals, Ltd.) | 0.14 parts |
| Toluene | 4.8 parts |
| Methyl ethyl ketone | 9.5 parts |

Example 3-2

A thermal transfer sheet of Example 3-2 was obtained exactly in the same manner as in Example 3-1 except that the coating liquid for release layer 5 was replaced by a coating liquid for release layer 6 having the following composition to form the release layer.

<Coating Liquid for Release Layer 6>

| | |
|---|---|
| Epoxy group-containing silsesquioxane (solid content: 72.6%) (SQ502-8, Arakawa Chemical Industries, Ltd.) | 5.8 parts |
| Aluminum catalyst (solid content: 10%) (Celtop(R) CAT-A, Daicel Corporation) | 3.8 parts |
| Toluene | 3.4 parts |
| Methyl ethyl ketone | 6.8 parts |
| Water | 0.2 parts |

Example 3-3

A thermal transfer sheet of Example 3-3 was obtained exactly in the same manner as in Example 3-1 except that the coating liquid for release layer 5 was replaced by a coating liquid for release layer 7 having the following composition to form the release layer.

<Coating Liquid for Release Layer 7>

| | |
|---|---|
| Epoxy group-containing silsesquioxane (solid content: 72.6%) (SQ502-8, Arakawa Chemical Industries, Ltd.) | 5.8 parts |
| Aluminum catalyst (solid content: 10%) (Celtop(R) CAT-A, Daicel Corporation) | 3.8 parts |
| Toluene | 3.3 parts |
| Methyl ethyl ketone | 6.6 parts |
| Water | 0.5 parts |

Example 3-4

A thermal transfer sheet of Example 3-4 was obtained exactly in the same manner as in Example 3-1 except that the coating liquid for release layer 5 was replaced by a coating liquid for release layer 8 having the following composition to form the release layer.

<Coating Liquid for Release Layer 8>

| | |
|---|---|
| Epoxy group-containing silsesquioxane (solid content: 72.6%) (SQ502-8, Arakawa Chemical Industries, Ltd.) | 5.8 parts |
| Aluminum catalyst (solid content: 10%) (Celtop(R) CAT-A, Daicel Corporation) | 3.8 parts |
| Toluene | 3.2 parts |
| Methyl ethyl ketone | 6.4 parts |
| Water | 0.8 parts |

Example 3-5

A thermal transfer sheet of Example 3-5 was obtained exactly in the same manner as in Example 3-1 except that the coating liquid for release layer 5 was replaced by a coating liquid for release layer 9 having the following composition to form the release layer.

<Coating Liquid for Release Layer 9>

| | |
|---|---|
| Epoxy group-containing silsesquioxane (solid content: 72.6%) (SQ502-8, Arakawa Chemical Industries, Ltd.) | 5.8 parts |

| | |
|---|---|
| Aluminum catalyst (solid content: 10%) (Celtop(R) CAT-A, Daicel Corporation) | 3.8 parts |
| Toluene | 3.1 parts |
| Methyl ethyl ketone | 6.2 parts |
| Water | 1.1 parts |

Example 3-6

A thermal transfer sheet of Example 3-6 was obtained exactly in the same manner as in Example 3-1 except that the coating liquid for release layer 5 was replaced by a coating liquid for release layer 10 having the following composition to form the release layer.

<Coating Liquid for Release Layer 10>

| | |
|---|---|
| Epoxy group-containing silsesquioxane (solid content: 72.6%) (SQ502-8, Arakawa Chemical Industries, Ltd.) | 5.6 parts |
| Polyester (acid value < 2 mgKOH/g) (Vylon(R) 226, TOYOBO CO., LTD.) | 0.1 parts |
| Aluminum catalyst (solid content: 10%) (Celtop(R) CAT-A, Daicel Corporation) | 3.8 parts |
| Toluene | 3.2 parts |
| Methyl ethyl ketone | 6.4 parts |
| Water | 0.8 parts |

Example 3-7

A thermal transfer sheet of Example 3-7 was obtained exactly in the same manner as in Example 3-1 except that the coating liquid for release layer 5 was replaced by a coating liquid for release layer 11 having the following composition to form the release layer.

<Coating Liquid for Release Layer 11>

| | |
|---|---|
| Epoxy group-containing silsesquioxane (solid content: 72.6%) (SQ502-8, Arakawa Chemical Industries, Ltd.) | 5.6 parts |
| Urethane-modified polyester (solid content: 30%) (acid value: 26 mgKOH/g) (Vylon(R) UR-1700, TOYOBO Co., Ltd.) | 0.1 parts |
| Aluminum catalyst (solid content: 10%) (Celtop(R) CAT-A, Daicel Corporation) | 3.8 parts |
| Toluene | 3.2 parts |
| Methyl ethyl ketone | 6.4 parts |
| Water | 0.8 parts |

Example 3-8

A thermal transfer sheet of Example 3-8 was obtained exactly in the same manner as in Example 3-1 except that the coating liquid for release layer 5 was replaced by a coating liquid for release layer 12 having the following composition to form the release layer.

<Coating Liquid for Release Layer 12>

| | |
|---|---|
| Epoxy group-containing silsesquioxane (solid content: 72.6%) (SQ502-8, Arakawa Chemical Industries, Ltd.) | 1.1 parts |
| Urethane-modified polyester (solid content: 40%) (acid value: 35 mgKOH/g) (Vylon(R) UR-3500, TOYOBO Co., Ltd.) | 8.2 parts |
| Zirconia catalyst (solid content: 45%) (ZC-540, Matsumoto Fine Chemical Co. Ltd.) | 1.1 parts |
| Acetyl acetone | 3.1 parts |
| Toluene | 2.2 parts |
| Methyl ethyl ketone | 4.3 parts |

Example 3-9

A thermal transfer sheet of Example 3-9 was obtained exactly in the same manner as in Example 3-1 except that the coating liquid for release layer 5 was replaced by a coating liquid for release layer 13 having the following composition to form the release layer.

<Coating Liquid for Release Layer 13>

| | |
|---|---|
| Epoxy group-containing silsesquioxane (solid content: 72.6%) (SQ502-8, Arakawa Chemical Industries, Ltd.) | 1.1 parts |
| Urethane-modified polyester (solid content: 40%) (acid value: 35 mgKOH/g) (Vylon(R) UR-3500, TOYOBO Co., Ltd.) | 8.2 parts |
| Zirconia catalyst (solid content: 45%) (ZC-540, Matsumoto Fine Chemical Co. Ltd.) | 1.1 parts |
| Acetyl acetone | 3.1 parts |
| Toluene | 2.1 parts |
| Methyl ethyl ketone | 4.2 parts |
| Water | 0.2 parts |

Example 3-10

A thermal transfer sheet of Example 3-10 was obtained exactly in the same manner as in Example 3-1 except that the coating liquid for release layer 5 was replaced by a coating liquid for release layer 14 having the following composition to form the release layer.

<Coating Liquid for Release Layer 14>

| | |
|---|---|
| Epoxy group-containing silsesquioxane (solid content: 72.6%) (SQ502-8, Arakawa Chemical Industries, Ltd.) | 1.1 parts |
| Urethane-modified polyester (solid content: 40%) (acid value: 35 mgKOH/g) (Vylon(R) UR-3500, TOYOBO Co., Ltd.) | 8.2 parts |
| Zirconia catalyst (solid content: 45%) (ZC-540, Matsumoto Fine Chemical Co. Ltd.) | 1.1 parts |
| Acetyl acetone | 3.1 parts |
| Toluene | 2 parts |
| Methyl ethyl ketone | 4 parts |
| Water | 0.5 parts |

Example 3-11

A thermal transfer sheet of Example 3-11 was obtained exactly in the same manner as in Example 3-1 except that the coating liquid for release layer 5 was replaced by a coating liquid for release layer 15 having the following composition to form the release layer.

<Coating Liquid for Release Layer 15>

| | |
|---|---|
| Epoxy group-containing silsesquioxane (solid content: 72.6%) (SQ502-8, Arakawa Chemical Industries, Ltd.) | 1.1 parts |
| Urethane-modified polyester (solid content: 40%) (acid value: 35 mgKOH/g) | 8.2 parts |

| | |
|---|---|
| (Vylon(R) UR-3500, TOYOBO Co., Ltd.) | |
| Zirconia catalyst (solid content: 45%) | 1.1 parts |
| (ZC-540, Matsumoto Fine Chemical Co. Ltd.) | |
| Acetyl acetone | 3.1 parts |
| Toluene | 1.9 parts |
| Methyl ethyl ketone | 3.8 parts |
| Water | 0.8 parts |

Comparative Example 3-1

A thermal transfer sheet of Comparative Example 3-1 was obtained exactly in the same manner as in Example 3-1 except that the coating liquid for release layer 5 was replaced by a coating liquid for release layer B having the following composition to form the release layer.

<Coating Liquid for Release Layer B>

| | |
|---|---|
| Epoxy group-containing silicone-modified acryl resin (solid content: 50%) (Celtop(R) 226, Daicel Corporation) | 8.4 parts |
| Aluminum catalyst (solid content: 10%) (Celtop(R) CAT-A, Daicel Corporation) | 3.8 parts |
| Toluene | 2.6 parts |
| Methyl ethyl ketone | 5.2 parts |

Comparative Example 3-2

A thermal transfer sheet of Comparative Example 3-2 was obtained exactly in the same manner as in Example 3-1 except that the coating liquid for release layer 5 was replaced by a coating liquid for release layer C having the following composition to form the release layer.

<Coating Liquid for Release Layer C>

| | |
|---|---|
| Epoxy group-containing silicone-modified acryl resin (solid content: 50%) (Celtop(R) 226, Daicel Corporation) | 8.4 parts |
| Aluminum catalyst (solid content: 10%) (Celtop(R) CAT-A, Daicel Corporation) | 3.8 parts |
| Toluene | 2.5 parts |
| Methyl ethyl ketone | 5.1 parts |
| Water | 0.2 parts |

Comparative Example 3-3

A thermal transfer sheet of Comparative Example 3-3 was obtained exactly in the same manner as in Example 3-1 except that the coating liquid for release layer 5 was replaced by a coating liquid for release layer D having the following composition to form the release layer.

<Coating Liquid for Release Layer D>

| | |
|---|---|
| Epoxy group-containing silicone-modified acryl resin (solid content: 50%) (Celtop(R) 226, Daicel Corporation) | 8.4 parts |
| Aluminum catalyst (solid content: 10%) (Celtop(R) CAT-A, Daicel Corporation) | 3.8 parts |
| Toluene | 2.4 parts |
| Methyl ethyl ketone | 4.8 parts |
| Water | 0.5 parts |

Comparative Example 3-4

A thermal transfer sheet of Comparative Example 3-4 was obtained exactly in the same manner as in Example 3-1 except that the coating liquid for release layer 5 was replaced by a coating liquid for release layer E having the following composition to form the release layer.

<Coating Liquid for Release Layer E>

| | |
|---|---|
| Epoxy group-containing silicone-modified acryl resin (solid content: 50%) (Celtop(R) 226, Daicel Corporation) | 8.4 parts |
| Aluminum catalyst (solid content: 10%) (Celtop(R) CAT-A, Daicel Corporation) | 3.8 parts |
| Toluene | 2.3 parts |
| Methyl ethyl ketone | 4.6 parts |
| Water | 0.8 parts |

(Stability Evaluation of Coating Liquid)

The coating liquids for release layer 6 to 11 and 13 to 15 and the coating liquids for release layer C to E were each prepared, stirred with a stirrer for five minutes, and then left to stand for five minutes. While water was removed from the formulation of the coating liquids for release layer 6 to 11 and 13 to 15 and the coating liquids for release layer C to E, and the coating liquids were separately prepared. Each coating liquid was stirred with a stirrer for five minutes, and then left to stand for five minutes. Each coating liquid after standing was visually checked. The state of the coating liquid due to presence or absence of addition of water was visually checked, and the stability of the coating liquid due to presence or absence of addition of water was evaluated based on the following evaluation criteria. Note that the coating liquids for release layer 6 to 11 and 13 to 15 and the coating liquids for release layer C to E respectively correspond to Examples 3-2 to 3-7 and 3-9 to 3-11 and Comparative Examples 3-2 to 3-4.

<Evaluation Criteria>

A: No change is caused by addition of water.

B: The state of the coating liquid is slightly changed by addition of water.

NG: The state of the coating liquid is markedly changed by addition of water.

(Solvent Resistance Evaluation)

In formation of the thermal transfer sheet of each of Examples and Comparative Examples, after formation of the release layer, the surface of the release layer was rubbed once with a cotton swab immersed in a solution prepared by mixing methyl ethyl ketone (MEK) and toluene at a mass ratio of 2:1. Then, the surface of the release layer was visually checked, and the solvent resistance was evaluated based on the following evaluation criteria. The evaluation results are shown in Table 4.

<Evaluation Criteria>

A: No damage of the surface of the release layer is observed.

B: Slight damage is observed on the release layer, but there is no problem in practical use.

NG: Observed is damage on the release layer, which results in a problem in practical uses.

(Peel Stability Evaluation (Evaluation of Performance Variation in Releasability))

Figure 10A:
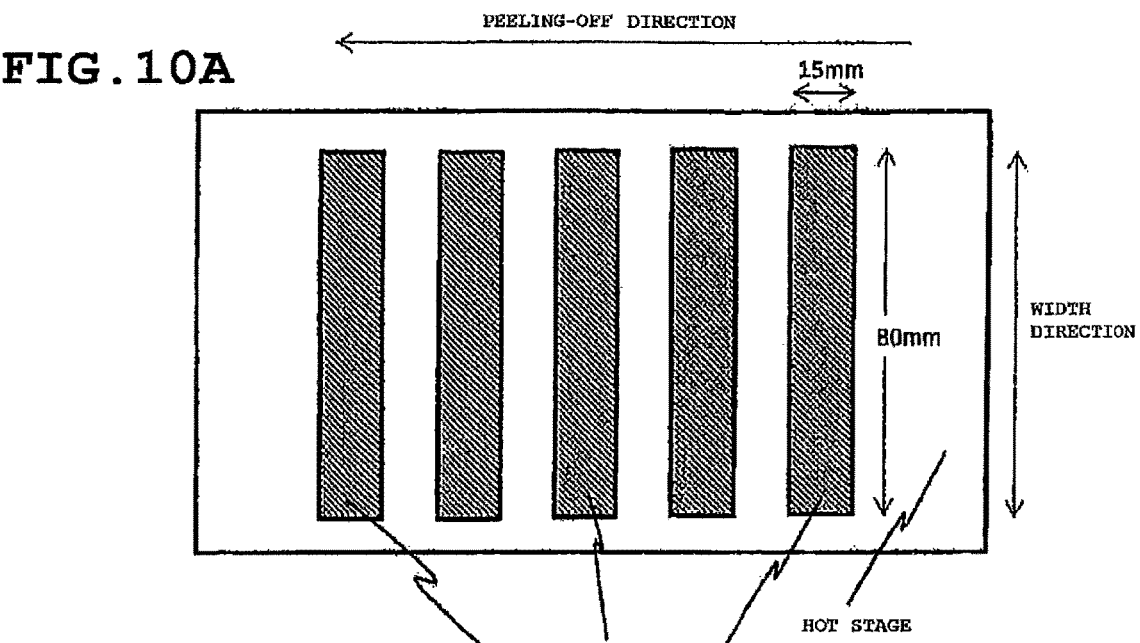
FIGS. 10A and 10B are arrangement views illustrating the relationship between a thermal transfer sheet and transparent double-sided tape used for measurement of the initial breakage peeling-off force.
Figure 10B:
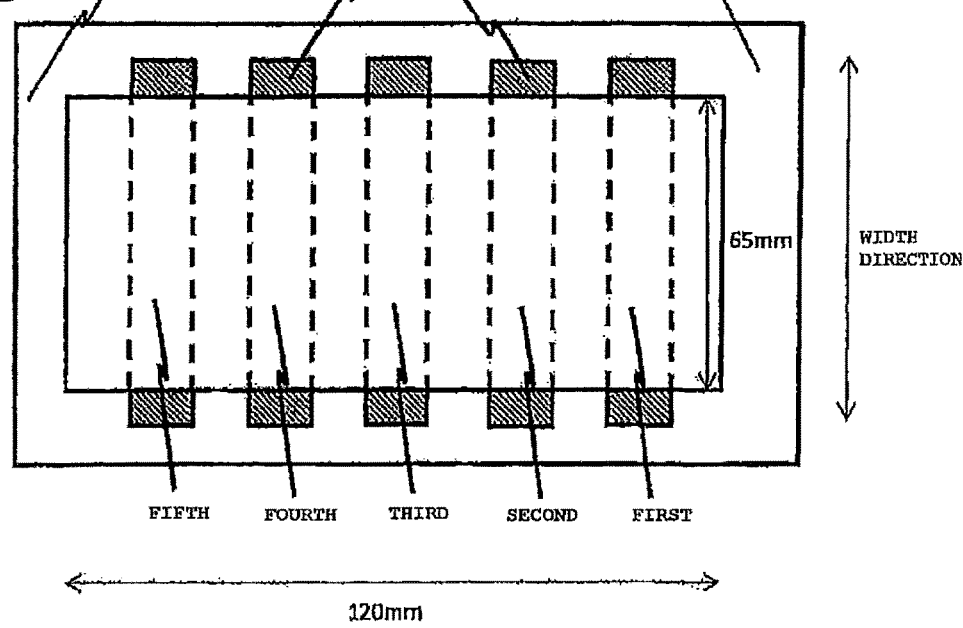
Figure 11A:
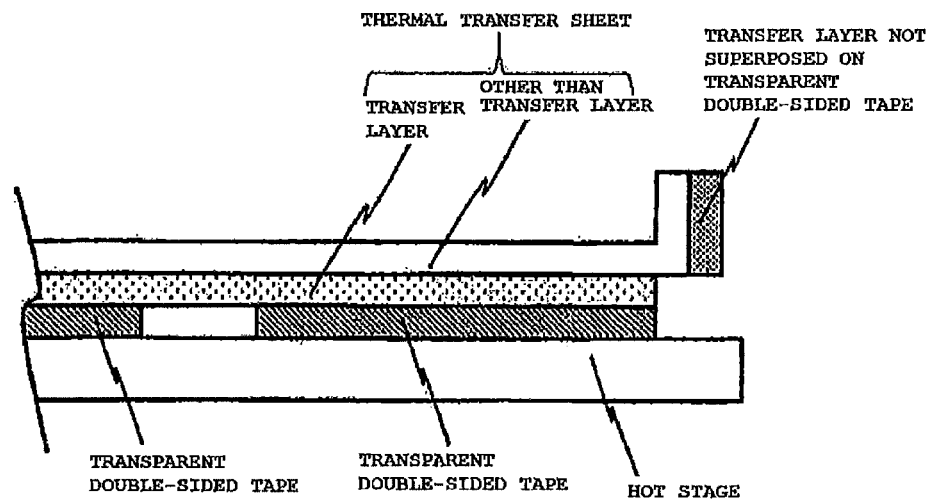
FIGS. 11A and 11B are process drawings illustrating a method for peeling a transfer layer.
Figure 11B:
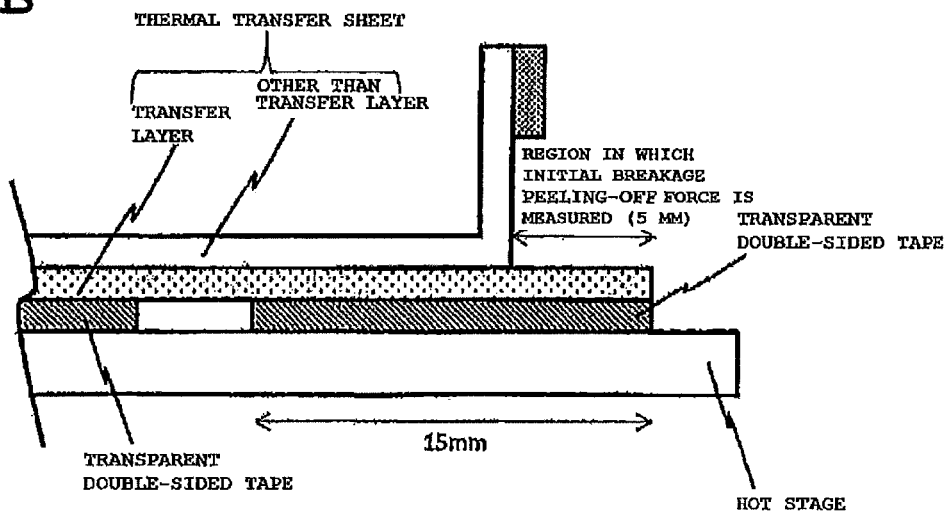
Figure 11C:
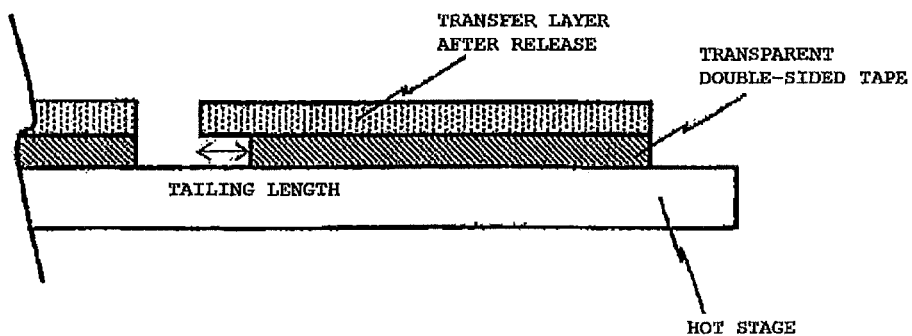
FIG. 11C is a view illustrating the tailing state after the transfer layer is peeled.

In order to measure the initial breakage peeling-off force five times, five pieces of transparent double-sided tape (NICETACK®NW-15) cut out to a size of 80 mm in length in the width direction and 15 mm in length in the peel-off direction were provided as shown in FIG. 10A. Then, the five pieces of the transparent double-sided tape provided were affixed onto a hot stage (HP2000, Shinto Scientific Co., Ltd.) of which temperature was adjusted to 70° C., at intervals of 7.5 mm in the peel-off direction. Then, as shown in FIG. 10B, the thermal transfer sheet of Example 3-1 shaped to a size of 65 mm in length in the width direction and 80 mm in length in the peel-off direction was superposed on the five pieces of the transparent double-sided tape so as to cover the pieces together to bond the transparent double-sided tape and the thermal transfer sheet of Example 3-1 to each other. The transparent double-sided tape and the thermal transfer sheet of Example 3-1 were bonded to each other such that the transparent double-sided tape was in contact with the transfer layer. In FIG. 10B, the regions of the thermal transfer sheet superposed on the transparent double-sided tape are regions of the transfer layer to be peeled (first to fifth portions surrounded by dotted lines). Then, in a state where the thermal transfer sheet of Example 3-1 was kept at 70° C., the thermal transfer sheet portion not superposed on the transparent double-sided tape was bent at 90°, at the boundary at the upstream end in the peel-off direction of the transparent double-sided tape as the start point, as shown in FIG. 11A. The transfer layer was peeled under conditions of a peeling-off angle of 90° against the face of the hot stage and a peel rate of 5 mm/sec. such that only the transfer layer remained on the transparent double-sided tape, as shown in FIG. 11B. The peeling-off force in the range from the upstream end in the peel-off direction of the transparent double-sided tape as the start point, at which peel was started, to a point 5 mm distant toward the downstream of the peel-off direction (0 mm to 5 mm when the start point at which peel is started was set to 0 mm) was measured with a digital force gauge (Digital Force Gauge ZTA-5N, IMADA CO., LTD.), and the value of the maximum peeling-off force in this measurement range was taken as the initial breakage peeling-off force. This measurement was conducted on each region to be peeled (first to fifth portions surrounded by dotted lines), and the standard deviation of the initial breakage peeling-off force measured by the above method (the standard deviation of the initial breakage peeling-off force measured at each region to be peeled) was calculated, and the peel stability was evaluated. The standard deviation for the thermal transfer sheets of Examples 3-2 to 3-11 and Comparative Example 3-1 to 3-4 was calculated in the same manner as for the thermal transfer sheet of Example 3-1. The standard deviation of the peeling-off force calculated and the evaluation results of the peel stability based on the following evaluation criteria are shown in Table 4. With a smaller standard deviation, a release layer having no variation in the performance can be formed. Additionally, the above peel was conducted on the thermal transfer sheet of each of Examples and Comparative Examples in the range from the start point, at which peel was started, to a point 15 mm distant in the peel-off direction, which point was the rear end of the length in the peel-off direction of the transparent double-sided tape (0 mm to 15 mm), that is, in the range from the upstream end in the peel-off direction of the transparent double-sided tape to the downstream end in the peel-off direction thereof, and the evaluation of tailing described below was conducted (see FIG. 11C). Note that peel in the range from a point 5 mm distant from the upstream end in the peel-off direction of the transparent double-sided tape as the start point to a point 15 mm distant from the start point (5 mm to 15 mm) was conducted using a fan-type tension gauge (deflection to one side: 50 g O-KT 0.5N, Oba Keiki Seisakusho Co., Ltd.) instead of the above digital force gauge (Digital Force Gauge ZTA-5N, IMADA CO., LTD.). FIG. 11C is a view for explaining the length of tailing, illustrating the state of the transfer layer remaining on the transparent double-sided tape after the peel of the regions to be peeled was finished.

<Evaluation Criteria>

A: The standard deviation of the peeling-off force is less than 2.

B: The standard deviation of the peeling-off force is 2 or more and less than 5.

NG: The standard deviation of the peeling-off force is 5 or more.

(Tailing Evaluation (Releasability Evaluation))

After peel conducted on each region to be peeled described above in the range from the upstream end in the peel-off direction of the transparent double-sided tape to the downstream end in the peel-off direction thereof (peel in the range from 0 mm to 15 mm), the transfer layer remaining on the hot stage side was visually checked, and the tailing was evaluated based on the following evaluation criteria. The evaluation of the tailing is based on the average of the above five tailing length. The evaluation results are shown in Table 4. The length of tailing means, when the transfer layer is transferred onto the transfer receiving article (transparent double-sided tape), the length of the transfer layer transferred so as to protrude to a non-transfer region side not superposed on the transparent double-sided tape from a boundary between a transfer region and the non-transfer region of the transfer layer (downstream end in the peel-off direction of the transparent double-sided tape as the rear end of the peel) as the start point (see FIG. 11C). The more satisfactory the releasability of the transfer layer, the shorter the tailing. That is, the transfer layer remains along the shape superposed on the transparent double-sided tape.

<Evaluation Criteria>

A: The length of tailing is 1 mm or less.

B: The length of tailing is more than 1 mm and 2 mm or less.

C: The length of tailing is more than 2 mm.

TABLE 4

| | | | peel stability | | |
|---|---|---|---|---|---|
| | Stability of coating liquid | Solvent resistance | Standard deviation | Evaluation | Tailing |
| Example 3-1 | Not evaluated | A | 0.6 | A | C |
| Example 3-2 | A | A | 1.2 | A | C |
| Example 3-3 | A | A | 1.9 | A | C |
| Example 3-4 | A | A | 1.9 | A | C |
| Example 3-5 | B | B | 2.2 | B | C |
| Example 3-6 | A | NG | 1.7 | A | B |
| Example 3-7 | A | A | 4.2 | B | B |
| Example 3-8 | Not evaluated | A | 1.9 | A | B |
| Example 3-9 | A | A | 2.0 | B | A |
| Example 3-10 | A | A | 0.8 | A | A |
| Example 3-11 | A | A | 2.2 | B | A |
| Comparative Example 3-1 | Not evaluated | A | 14.4 | NG | — |
| Comparative Example 3-2 | A | A | 18.4 | NG | — |
| Comparative Example 3-3 | B | B | 20.2 | NG | — |
| Comparative Example 3-4 | NG | NG | 23.0 | NG | — |

REFERENCE SIGNS LIST

1 Substrate
2 Release layer
3 Protective layer
4 peel layer
5 Adhesive layer
7 Adhesion layer
10 Transfer layer
100 Thermal transfer sheet
50 Transfer receiving article
60 Print

The invention claimed is:

1. A thermal transfer sheet having a substrate, a release layer provided on the substrate, and a transfer layer provided on the release layer,
   wherein the transfer layer is provided peelably from the release layer, and
   wherein the release layer has a reaction product of a silsesquioxane having an epoxy group and a resin having a carboxyl group.

2. The thermal transfer sheet according to claim 1, wherein an acid value of the resin having a carboxyl group is 10 mgKOH/g or more.

\* \* \* \* \*